(12) United States Patent
Huang et al.

(10) Patent No.: US 12,045,309 B1
(45) Date of Patent: *Jul. 23, 2024

(54) SYSTEMS AND METHODS FOR PERFORMING MATRIX MULTIPLICATION WITH A PLURALITY OF PROCESSING ELEMENTS

(71) Applicant: Recogni Inc., San Jose, CA (US)

(72) Inventors: Jian hui Huang, Los Altos, CA (US); Gary S. Goldman, Los Altos, CA (US)

(73) Assignee: Recogni Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,615

(22) Filed: Nov. 29, 2023

(51) Int. Cl.
G06F 17/16 (2006.01)
G06F 7/544 (2006.01)

(52) U.S. Cl.
CPC ............ *G06F 17/16* (2013.01); *G06F 7/5443* (2013.01)

(58) Field of Classification Search
CPC .......... G06F 7/5443; G06F 17/16; G06F 9/3893–3897; G06F 12/0207
See application file for complete search history.

(56) References Cited

U.S. PATENT DOCUMENTS

| | | | |
|---|---|---|---|
| 8,924,455 B1 | 12/2014 | Barman et al. | |
| 10,025,755 B2 | 7/2018 | Saber et al. | |
| 10,339,201 B1 | 7/2019 | Ling et al. | |
| 10,387,122 B1 | 8/2019 | Olsen | |
| 10,698,974 B2 | 6/2020 | Phelps et al. | |
| 10,713,214 B1 | 7/2020 | Shalev et al. | |
| 10,838,910 B2 | 11/2020 | Zhang et al. | |
| 10,915,297 B1 | 2/2021 | Halutz et al. | |
| 10,929,746 B2 | 2/2021 | Litvak et al. | |
| 11,328,037 B2 | 5/2022 | Yinger et al. | |
| 11,599,181 B1 | 3/2023 | Nair et al. | |
| 2018/0173676 A1 | 6/2018 | Tsai et al. | |
| 2019/0026078 A1* | 1/2019 | Bannon | G06F 7/50 |
| 2019/0171448 A1* | 6/2019 | Chen | G06F 9/30036 |
| 2019/0228285 A1 | 7/2019 | Zhang et al. | |
| 2020/0012012 A1 | 1/2020 | Smith | |
| 2020/0026745 A1 | 1/2020 | Pillai et al. | |
| 2020/0034148 A1 | 1/2020 | Sumbul et al. | |
| 2020/0233803 A1 | 7/2020 | Vengallur et al. | |
| 2020/0341772 A1 | 10/2020 | Chilappagari et al. | |
| 2021/0073171 A1 | 3/2021 | Master et al. | |

(Continued)

OTHER PUBLICATIONS

Notice of Allowance mailed Feb. 5, 2024, for U.S. Appl. No. 18/523,627, filed Nov. 29, 2023, 9 pgs.

(Continued)

*Primary Examiner* — Matthew D Sandifer
(74) *Attorney, Agent, or Firm* — Ascenda Law Group, PC

(57) ABSTRACT

In a system with control logic and a processing element array, two modes of operation may be provided. In the first mode of operation, the control logic may configure the system to perform matrix multiplication or 1×1 convolution. In the second mode of operation, the control logic may configure the system to perform 3×3 convolution. The processing element array may include an array of processing elements. Each of the processing elements may be configured to compute the dot product of two vectors in a single clock cycle, and further may accumulate the dot products that are sequentially computed over time.

16 Claims, 46 Drawing Sheets

(56) References Cited

U.S. PATENT DOCUMENTS

| | | |
|---|---|---|
| 2021/0103550 A1* | 4/2021 | Appu ..................... G06T 1/20 |
| 2021/0357734 A1 | 11/2021 | Mahale et al. |
| 2021/0406030 A1 | 12/2021 | Chilappagari et al. |
| 2022/0035890 A1* | 2/2022 | Liu ..................... G06F 7/523 |
| 2022/0147804 A1* | 5/2022 | Guan ..................... G06F 7/50 |
| 2022/0309124 A1* | 9/2022 | Mei ..................... G06N 3/048 |
| 2022/0374495 A1 | 11/2022 | Huang et al. |
| 2022/0405571 A1* | 12/2022 | Darvish Rouhani ... G06F 17/16 |
| 2023/0061711 A1 | 3/2023 | Botimer et al. |
| 2023/0153616 A1 | 5/2023 | Ain-Kedem et al. |

OTHER PUBLICATIONS

Notice of Allowance mailed Feb. 15, 2024, for U.S. Appl. No. 18/523,632, filed Nov. 29, 2023, 14 pgs.

\* cited by examiner $$A * B = C$$

$$\begin{bmatrix} \alpha_1^T \\ \vdots \\ \alpha_m^T \end{bmatrix} * \begin{bmatrix} \beta_1 & \cdots & \beta_q \end{bmatrix} = \begin{bmatrix} \alpha_1^T \beta_1 & \cdots & \alpha_m^T \beta_1 \\ \vdots & \ddots & \vdots \\ \alpha_1^T \beta_q & \cdots & \alpha_m^T \beta_q \end{bmatrix}$$

Fig. 10

SYSTEMS AND METHODS FOR PERFORMING MATRIX MULTIPLICATION WITH A PLURALITY OF PROCESSING ELEMENTS

FIELD OF THE INVENTION

The present invention relates to the operations of matrix multiplication, 1×1 convolution and 3×3 convolution, and more specifically relates to a multi-mode architecture for unifying the previously stated operations.

BACKGROUND

Convolution and matrix multiplication serve as fundamental building blocks in contemporary artificial intelligence (AI) algorithms. For instance, the transformer architecture, extensively employed in large language models (LLMs), greatly relies on matrix multiplication and 1×1 convolution. Similarly, object detection in autonomous driving greatly relies on 3×3 convolutions.

SUMMARY OF THE INVENTION

In accordance with one embodiment of the invention, two modes of operation may be provided in a system with control logic and a processing element array. In the first mode of operation, the control logic may configure the system to perform matrix multiplication or 1×1 convolution. In the second mode of operation, the control logic may configure the system to perform 3×3 convolution. The processing element array may include an array of processing elements. Each of the processing elements may be configured to compute the dot product of two vectors in a single clock cycle, and further may accumulate the dot products that are sequentially computed over time.

In one embodiment, a system for performing matrix multiplication or 1×1 convolution may include a first buffer configured to receive a first array of values from a first memory, a second buffer configured to receive a second array of values from a second memory, and a first multiplexor configure to select a first or second row from the first array. A first processing element may be configured to receive the first row from the first multiplexor and a first column of the second array, and multiply the first row with the first column so as to compute a first dot product. A second processing element may be configured to receive the first row from the first multiplexor and a second column of the second array, and multiply the first row with the second column so as to compute a second dot product. The first processing element may be configured to receive the second row from the first multiplexor, and multiply the second row and the first column to form a third dot product. The second processing element may be configured to receive the second row from the first multiplexor, and multiply the second row and the second column so as to compute a fourth dot product. The first and second dot products may be computed in a first clock cycle, while the third and fourth dot products may be computed in a second clock cycle immediately following the first clock cycle.

In one embodiment, a method for performing matrix multiplication or 1×1 convolution may include storing a first array from a first memory in a first buffer and storing a second array from a second memory in the second buffer. A first multiplexor may select a first row of the first array from the first buffer, and transmit that row to a first and second processing element. The first processing element may receive a first column of the second array, and the second processing element may receive a second column of the second array. The first processing element may multiply the first row and the first column so as to compute a first dot product. The second processing element may multiply the first row and the second column so as to compute a second dot product. The first multiplexor may select a second row of the first array from the first buffer, and transmit such row to the first and second processing elements. The first processing element may multiply the second row and the first column so as to compute a third dot product, and the second processing element may multiply the second row and the second column so as to compute a fourth dot product. The first and second dot products may be computed in a first clock cycle, while the third and fourth dot products may be computed in a second clock cycle immediately following the first clock cycle.

In one embodiment, a system for performing matrix multiplication, 1×1 convolution or 3×3 convolution may include first and second memories, first and second buffers, first and second processing elements, control logic, and a controller for selecting a first or second mode of operation.

In the first mode of operation:
  The first buffer may be configured to store a first array of values from the first memory.
  The second buffer may be configured to store a second array of values from the second memory.
  The control logic may be configured to communicate a first row of the first array from the first buffer to the first and second processing elements, communicate a first column of the second array from the second buffer to the first processing element, and communicate a second column of the second array from the second buffer to the second processing element.
  The first processing element may be configured to multiply the first row of the first array and the first column of the second array so as to compute a first dot product.
  The second processing element may be configured to multiply the first row of the first array and the second column of the second array so as to compute a second dot product.
  The control logic may be further configured to communicate a second row of the first array from the first buffer to the first and second processing elements.
  The first processing element may be configured to multiply the second row of the first array and the first column of the second array so as to compute a third dot product.
  The second processing element may be configured to multiply the second row of the first array and the second column of the second array so as to compute a fourth dot product.
  Further, the first and second dot products may be computed in a first clock cycle of the first mode of operation, and the third and fourth dot products may be computed in a second clock cycle of the first mode of operation immediately following the first clock cycle of the first mode of operation.

In the second mode of operation:
  The first buffer may be configured to store a third array of values from the first memory.
  The second buffer may be configured to store a fourth array of values from the second memory, including the values $$\begin{bmatrix} a_{2,1} & a_{2,2} & a_{2,3} & a_{2,4} \\ a_{3,1} & a_{3,2} & a_{3,3} & a_{3,4} \\ a_{4,1} & a_{4,2} & a_{4,3} & a_{4,4} \end{bmatrix}.$$

The control logic may be further configured to communicate a first row of the third array from the first buffer to the first and second processing elements, communicate a first portion of the fourth array including the values $$\begin{bmatrix} a_{2,1} & a_{2,2} & a_{2,3} \\ a_{3,1} & a_{3,2} & a_{3,3} \\ a_{4,1} & a_{4,2} & a_{4,3} \end{bmatrix}$$

from the second buffer to the first processing element, and communicate a second portion of the fourth array including the values $$\begin{bmatrix} a_{2,2} & a_{2,3} & a_{2,4} \\ a_{3,2} & a_{3,3} & a_{3,4} \\ a_{4,2} & a_{4,3} & a_{4,4} \end{bmatrix}$$

from the second buffer to the second processing element.
The first processing element may be configured to compute a fifth dot product between values included in the first row of the third array and values included in the first portion of the fourth array.
The second processing element may be configured to compute a sixth dot product between the values included in the first row of the third array and values included in the second portion of the fourth array.
The second buffer may be configured to store a fifth array of values from the second memory, including values and the values $$\begin{bmatrix} a_{2,1} & a_{2,2} & a_{2,3} & a_{2,4} \\ a_{3,1} & a_{3,2} & a_{3,3} & a_{3,4} \end{bmatrix}.$$

The control logic may be further configured to communicate a first portion of the fifth array including the values $$\begin{bmatrix} a_{1,1} & a_{1,2} & a_{1,3} \\ a_{2,1} & a_{2,2} & a_{2,3} \\ a_{3,1} & a_{3,2} & a_{3,3} \end{bmatrix}$$

from the second buffer to the first processing element; and communicate a second portion of the fifth array including the values $$\begin{bmatrix} a_{1,2} & a_{1,3} & a_{1,4} \\ a_{2,2} & a_{2,3} & a_{2,4} \\ a_{3,2} & a_{3,3} & a_{3,4} \end{bmatrix}$$

from the second buffer to the second processing element.
The first processing element may be configured to compute a seventh dot product between values included in the first row of the third array and values included in the first portion of the fifth array.

The second processing element may be configured to compute an eighth dot product between the values included in the first row of the third array and values included in the second portion of the fifth array.
Further, the fifth and sixth dot products may be computed in a first clock cycle of the second mode of operation, and the seventh and eighth dot products may be computed in a second clock cycle of the second mode of operation immediately following the first clock cycle of the second mode of operation.

In one embodiment, a method for performing matrix multiplication, 1×1 convolution or 3×3 convolution may include, in a first mode of operation:
  storing, in a first buffer, a first array of values from a first memory;
  storing, in a second buffer, a second array of values from a second memory;
  communicating, by a control logic, a first row of the first array from the first buffer to the first and second processing elements;
  communicating, by the control logic, a first column of the second array from the second buffer to the first processing element;
  communicating, by the control logic, a second column of the second array from the second buffer to the second processing element;
  computing, by a first processing element, a first dot product between values included in the first row of the first array and values included in the first column of the second array;
  computing, by a second processing element, a second dot product between the values included in the first row of the first array and values included in the second column of the second array;
  communicating, by the control logic, a second row of the first array from the first buffer to the first and second processing elements;
  computing, by the first processing element, a third dot product between values included in the second row of the first array and the values included in the first column of the second array; and
  computing, by the second processing element, a fourth dot product between the values included in the second row of the first array and the values included in the second column of the second array.
The first and second dot products may be computed in a first clock cycle of the first mode of operation, and the third and fourth dot products may be computed in a second clock cycle of the first mode of operation immediately following the first clock cycle of the first mode of operation.
  In a second mode of operation, the method may include:
  storing, in the first buffer, a third array of values from the first memory; storing, in the second buffer, a fourth array of values from the second memory, including values $$\begin{bmatrix} a_{2,1} & a_{2,2} & a_{2,3} & a_{2,4} \\ a_{3,1} & a_{3,2} & a_{3,3} & a_{3,4} \\ a_{4,1} & a_{4,2} & a_{4,3} & a_{4,4} \end{bmatrix};$$

communicating, by the control logic, a first row of the third array from the first buffer to the first and second processing elements;
  communicating, by the control logic, a first portion of the fourth array including the values $$\begin{bmatrix} a_{2,1} & a_{2,2} & a_{2,3} \\ a_{3,1} & a_{3,2} & a_{3,3} \\ a_{4,1} & a_{4,2} & a_{4,3} \end{bmatrix}$$

from the second buffer to the first processing element;
communicating, by the control logic, a second portion of the fourth array including the values $$\begin{bmatrix} a_{2,2} & a_{2,3} & a_{2,4} \\ a_{3,2} & a_{3,3} & a_{3,4} \\ a_{4,2} & a_{4,3} & a_{4,4} \end{bmatrix}$$

from the second buffer to the second processing element;
computing, by the first processing element, a fifth dot product between values included in the first row of the third array and values included in the first portion of the fourth array;
computing, by the second processing element, a sixth dot product between the values included in the first row of the third array and values included in the second portion of the fourth array;
storing, in the second buffer, a fifth array of values from the second memory, including values
[$a_{1,1}\ a_{1,2}\ a_{1,3}\ a_{1,4}$]
and the values $$\begin{bmatrix} a_{2,1} & a_{2,2} & a_{2,3} & a_{2,4} \\ a_{3,1} & a_{3,2} & a_{3,3} & a_{3,4} \end{bmatrix};$$

communicating, by the control logic, a first portion of the fifth array including the values $$\begin{bmatrix} a_{1,1} & a_{1,2} & a_{1,3} \\ a_{2,1} & a_{2,2} & a_{2,3} \\ a_{3,1} & a_{3,2} & a_{3,3} \end{bmatrix}$$

from the second buffer to the first processing element;
communicating, by the control logic, a second portion of the fifth array including the values $$\begin{bmatrix} a_{1,2} & a_{1,3} & a_{1,4} \\ a_{2,2} & a_{2,3} & a_{2,4} \\ a_{3,2} & a_{3,3} & a_{3,4} \end{bmatrix}$$

from the second buffer to the second processing element;
computing by the first processing element a seventh dot product between values included in the first row of the third array and values included in the first portion of the fifth array; and
computing by the second processing element an eighth dot product between the values included in the first row of the third array and values included in the second portion of the fifth array.

The fifth and sixth dot products may be computed in the first clock cycle of the second mode of operation, and the seventh and eighth dot products may be computed in the second clock cycle of the second mode of operation immediately following the first clock cycle of the second mode of operation.

In one embodiment, a system for performing matrix multiplication, 1×1 convolution or 3×3 convolution may include first and second memories; first, second and third processing elements; means for communicating data from the first memory to the first, second and third processing elements; and means for communicating data from the second memory to the first, second and third processing elements in one of a first or second configuration. In the first configuration (e.g., for 3×3 convolution), first, second and third groups of values (e.g., activation values) from the second memory may be transmitted to the first, second and third processing elements, respectively, and three values (e.g., activation values) may be shared between the first, second and third groups of values from the second memory. In the second configuration (e.g., for matrix multiplication or 1×1 convolution), fourth, fifth and sixth groups of values (e.g., each group corresponding to a partial column from a matrix in the case of matrix multiplication; or corresponding to activation values in the case of 1×1 convolution) from the second memory may be transmitted to the first, second and third processing elements, respectively. The first processing element may be configured to manipulate (e.g., compute a dot product between) the data from the first memory (e.g., which may be weights in the case of 3×3 or 1×1 convolution, or a partial row of a matrix in the case of matrix multiplication) with the first or fourth groups of values from the second memory. The second processing element may be configured to manipulate (e.g., compute a dot product between) the data from the first memory with the second or fifth groups of values from the second memory. Similarly, the third processing element may be configured to manipulate (e.g., compute a dot product between) the data from the first memory with the third or sixth groups of values from the second memory.

In one embodiment, a method for performing matrix multiplication, 1×1 convolution or 3×3 convolution may include communicating data (e.g., which may be weights in the case of 3×3 or 1×1 convolution, or a partial row of a matrix in the case of matrix multiplication) from a first memory to first, second and third processing elements, and a controller selecting one of a first or second configuration of an integrated circuit for transmitting data from a second memory to the first, second and third processing elements. The integrated circuit may be controllable to operate in the first configuration (e.g., for 3×3 convolution) and be controllable to operate in the second configuration (e.g., for matrix multiplication or 1×1 convolution). In the first configuration, first, second and third groups of values from the second memory (e.g., activation values) may be transmitted to the first, second and third processing elements, respectively, and three values (e.g., activation values) may be shared between the first, second and third groups of values from the second memory. In the second configuration (e.g., for matrix multiplication or 1×1 convolution), fourth, fifth and sixth groups of values (e.g., each group corresponding to a partial column from a matrix in the case of matrix multiplication; or corresponding to activation values in the case of 1×1 convolution) from the second memory may be transmitted to the first, second and third processing elements, respectively. The first processing element may manipulate (e.g., compute a dot product between) the data from the first memory with the first or fourth groups of values from the second memory. The second processing element may manipulate (e.g., compute a dot product between) the data from the first memory with the second or fifth groups of values from the second memory. Similarly, the third processing element may manipulate (e.g., compute a dot product between) the data from the first memory with the third or sixth groups of values from the second memory.

These and other embodiments of the invention are more fully described in association with the drawings below.

BRIEF DESCRIPTION OF THE DRAWINGS

FIGS. 6A-6I depict a sequence of timesteps to explain the computation of 1×1 convolution using the system of FIG. 1 (or more specifically, the logic schematic of FIG. 5), in accordance with one embodiment of the invention.

FIG. 10 depicts mathematical equations which explain the decomposition of matrix multiplication into a plurality of dot products.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/ steps.

FIG. 10 depicts mathematical equations which explain the decomposition of matrix multiplication into a plurality of dot products. In the example of FIG. 10, matrix A has dimensions m×n and matrix B has dimensions n×q. The multiplication of matrix A with matrix B yields matrix C with dimensions m×q. Matrix A can be represented as a column of row vectors, $\alpha_1^T, \ldots, \alpha_m^T$, and matrix B can be represented as a row of column vectors $\beta_1, \ldots, \beta_q$. Based on principles from linear algebra, each of the elements of matrix C can be computed as a dot product (also called an "inner product") of a row vector from matrix A with a column vector from matrix B. Specifically, $c_{i,j}$ can be computed as $\beta_i^T \beta_j$.

Figure 11:
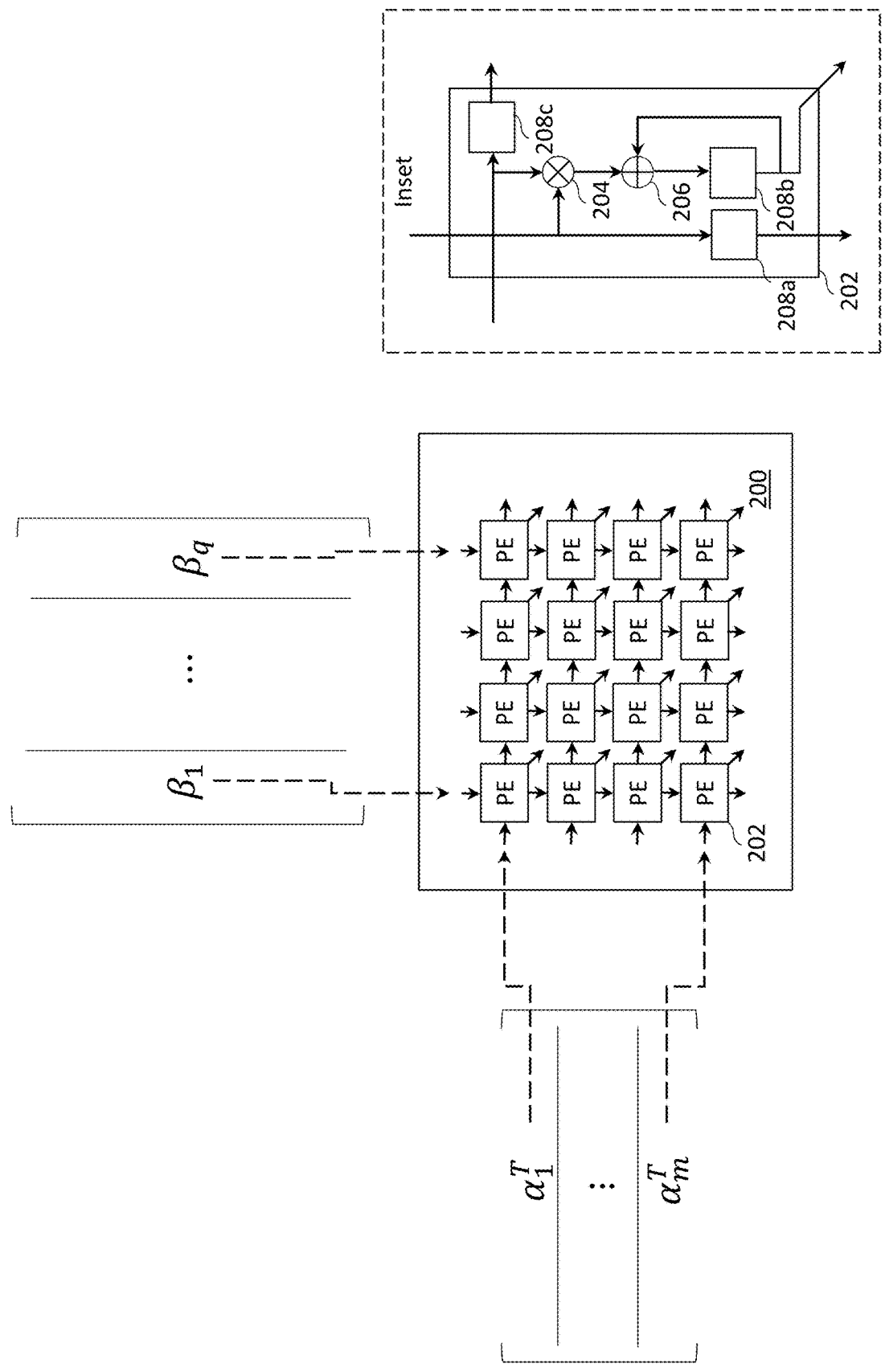
FIG. 11 depicts a hardware architecture for multiplying two matrices.

FIG. 11 depicts a hardware architecture with a systolic array 200 for multiplying matrix A with matrix B. The systolic array 200 is formed by an array of processing elements (PEs) 202. Shown in the inset is the internal structure of one of the processing elements. Each row of matrix A, $\alpha_i^T$, is propagated along a corresponding row of processing elements 202 in an element-by-element manner. Specifically, respective storage elements 208c from each row of processing elements 202 form a linear shift register, which is used to horizontally right-shift a row of matrix A every clock cycle. Similarly, each column of matrix B, $\beta_j$, is propagated along a corresponding column of processing elements 202 in an element-by-element manner. Specifically, respective storage elements 208a from each column of processing elements 202 form a linear shift register, which is used to vertically down-shift a column of matrix B every clock cycle. Each of the processing elements 202 contains a multiply-accumulate unit (MAC unit) for computing a dot product of a row vector from matrix A with a column vector from matrix B over n clock cycles. The MAC unit includes multiplier 204 and an accumulator formed by adder 206 and storage element 208b. After n clock cycles, the dot product of a row vector from matrix A and a column vector from matrix B may be read from storage element 208b. The operation of systolic array 200 is known in the art, and will not be described in further detail for the sake of conciseness.

Figure 1:
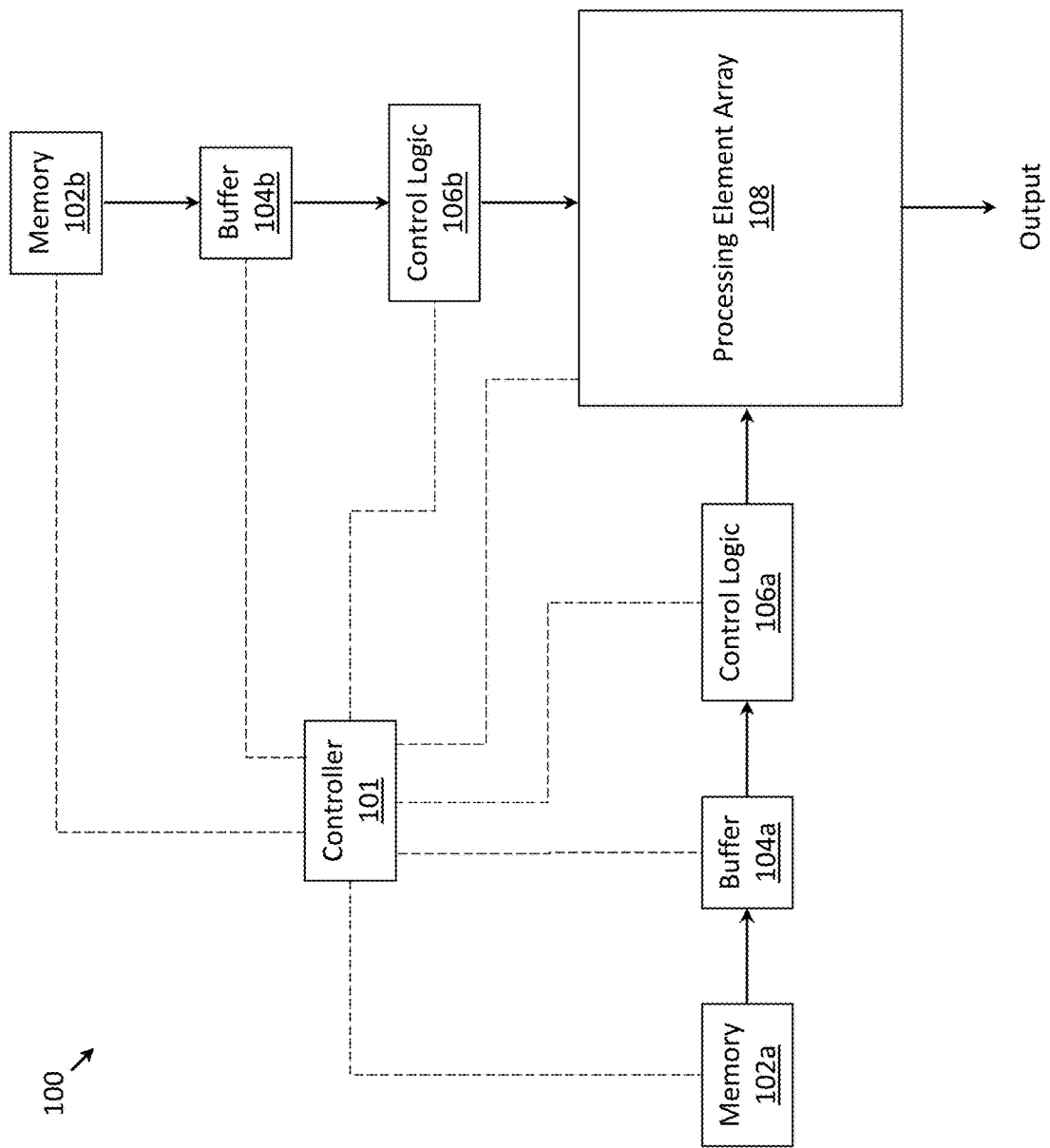
FIG. 1 depicts a block diagram of a system which unifies the operations of matrix multiplication, 1×1 convolution and 3×3 convolution, in accordance with one embodiment of the invention.

FIG. 1 depicts a block diagram of a system 100 (e.g., instantiated as an integrated circuit) which unifies the operations of matrix multiplication, 1×1 convolution and 3×3 convolution. To clarify, system 100 does not perform the operations of matrix multiplication, 1×1 convolution and 3×3 convolution at the same time. Rather, system 100 is configurable to perform matrix multiplication in one time period, perform 1×1 convolution in another time period, and perform 3×3 convolution in another time period. While a general central processing unit (CPU) arguably can be configured to perform matrix multiplication in one time period, perform 1×1 convolution in another time period, and perform 3×3 convolution in another time period, a CPU is not optimized in terms of the metrics of speed or low power design to carry out these three types of computations. As is known in the art, a CPU carries a lot of overhead which allows it to be configured to not only perform these three types of computations, but practically any type of operations that can be encoded in software. On the other hand, system 100 is specifically optimized to perform these three types of computations, in terms of the metrics of speed and low power design.

System 100 may include buffer 104a to store an array (or portion) of data from memory 102a and control logic 106a to selectively provide one or more rows of buffer 104a to processing element array 108. Likewise, system 100 may include buffer 104b to store an array (or portion) of data from memory 102b and control logic 106b to selectively provide one or more columns of buffer 104b to processing element array 108. Stated differently, control logic 106a and 106b may be disposed in the respective "read paths" of buffers 104a and 104b, respectively (i.e., read path referring to the path that receives the data from a buffer). As will be more completely explained below, there may also be control logic disposed in the respective "write paths" to buffers 104a and 104b (i.e., write path referring to the path that communicates data to a buffer). For simplicity of depiction, such "write path" control logic is incorporated into the respective buffers 104a and 104b, rather than being depicted as separate modules in FIG. 1.

It should be understood that the terminology of "rows" and "columns" refers to the manner in which data is logically organized in the respective buffers and does not necessarily refer to the physical arrangement of data within the respective buffers. Further, it is intended for memory 102a and memory 102b to be two logically separate memories (meaning that memory 102a is used to store one type of data, while memory 102b is used to store another type of data), although such depiction does not limit how memory 102a and memory 102b are physically constructed. In one embodiment, memory 102a and memory 102b may be formed by the same memory chip, while in another embodiment, memory 102a and memory 102b may be constructed using separate memory chips.

Controller 101 may control memory 102a, buffer 104a, control logic 106a, memory 102b, buffer 104b, control logic 106b and processing element array 108. Specifically, controller 101 may control the data that is stored in memory 102a, the data that is read from memory 102a into buffer 104a, the rows of buffer 104a that are selectively provided from buffer 104a into the processing element array 108, the data that is stored in memory 102b, the data that is read from memory 102b into buffer 104b, the columns of buffer 104b that are selectively provided from buffer 104b into the processing element array 108, and the operation of processing element array 108. Based on the control signals provided by controller 101 and the data stored in memory 102a and 102b, the output of processing element array 108 may be the product of two matrices, the result of 1×1 convolution or the result of 3×3 convolution, as will be explained in detail below.

Figure 2A:
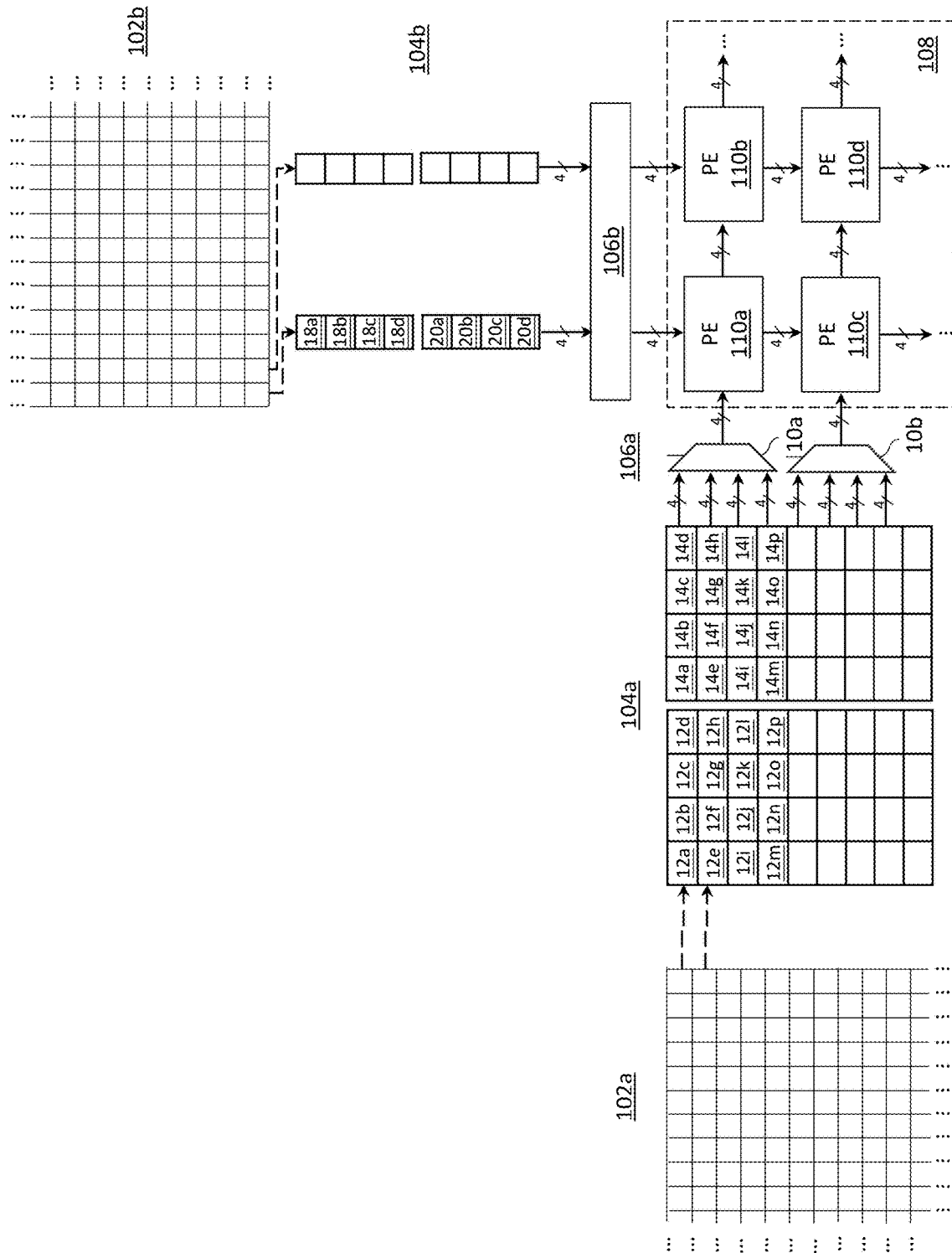
FIG. 2A depicts a logic schematic of the system depicted in FIG. 1, in accordance with one embodiment of the invention.

FIG. 2A depicts a logic schematic of the system 100 depicted in FIG. 1. Memory 102a is abstractly depicted as a grid, with each "box" configured to store a data value. In the example depicted in FIG. 2A, buffer 104a is "double buffered," meaning that data may be read from buffer 104a at the same time that data is written to buffer 104a. Further in the example, buffer 104a is partitioned into two portions (e.g., left and right portions) to more easily explain the concept that data may be read from one portion while data is being written to the other portion. In the simplified example of FIG. 2A, each half of the buffer 104a includes four columns of storage elements. In a preferred embodiment (not depicted), each half of the buffer 104a includes nine columns of storage elements. It should be understood that the concepts of the invention hold true regardless of the exact number of columns within each portion of the buffer 104a.

Figure 2B:
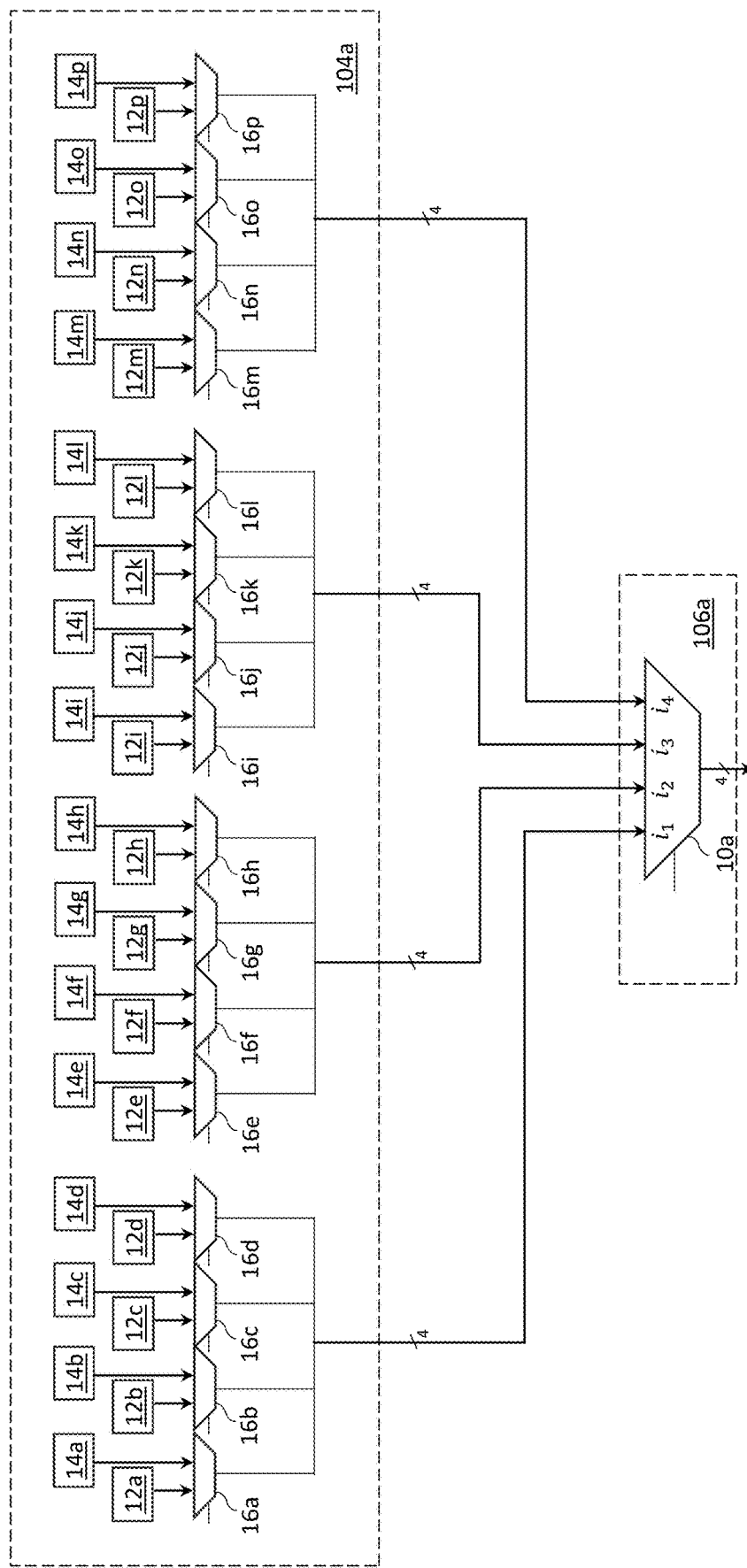
FIG. 2B depicts a logic schematic of a portion of the buffer and control logic (depicted in FIG. 2A) for handling the data provided to the rows of the processing elements, in accordance with one embodiment of the invention.

The read path of buffer 104a is shown in more detail in FIG. 2B, in which a plurality of two-input multiplexors may be used to select the portion of the buffer 104a (e.g., left or right) that data is read from. In the example of FIG. 2B, with the respective left inputs of the two-input multiplexors 16a-16p selected, the left portion of the buffer 104a may be read, whereas with the respective right inputs of the two-input multiplexors 16a-16p selected, the right portion of the buffer 104a may be read. Specifically, multiplexors 16a-16d may be used to select between storage elements 12a-12d or storage elements 14a-14d; multiplexors 16e-16h may be used to select between storage elements 12e-12h or storage elements 14e-14h; multiplexors 16i-16l may be used to select between storage elements 12i-12l or storage elements 14i-14l; and multiplexors 16m-16p may be used to select between storage elements 12m-12p or storage elements 14m-14p.

For clarity, it is noted that a "row" of the buffer 104a is intended to refer to a row of the buffer 104a within the "read portion" of buffer 104a. As the "read portion" of buffer 104a may switch back and forth between the left and right halves of the buffer 104a, so too will the notion of a "row" of the buffer 104a. For example, the top-most row of buffer 104a may correspond to storage elements 12a-12d when the left half of buffer 104a is being read, while the top-most row of buffer 104a may correspond to storage elements 14a-14d when the right half of buffer 104a is being read.

Returning to FIG. 2A, control logic 106a may include a plurality of multiplexors 10a, 10b, each associated with a row group of the buffer. In the example of FIG. 2A, multiplexor 10a is associated with the upper four rows of buffer 104a, and multiplexor 10b is associated with the next four rows of buffer 104a. In the simplified example of FIG. 2A, only two multiplexors 10a, 10b are depicted, but it is understood that the concepts of the invention hold true regardless of the exact number of multiplexors that are used to select rows from respective row groups of buffer 104a.

In a preferred embodiment, the number of rows within each of the row groups is equal to the number of elements in a row of the buffer 104a. In the depicted example, each row of the buffer 104a has four elements, so each row group has four rows. In the examples to follow, it should become clearer why this is so. In a preferred embodiment (not depicted), each row group includes nine rows. It should be understood that the concepts of the invention hold true regardless of the exact number of rows within a row group.

Each of the multiplexors 10a, 10b is configured to provide one of the rows from a respective row group to the processing element array 108. As shown in the example of FIG. 2B, selection of input it of the multiplexor 10a returns the output from storage elements 12a-12d or 14a-14d, depending on the read portion of buffer 104a; selection of input $i_2$ of the multiplexor 10a returns the output from storage elements 12e-12h or 14e-14h, depending on the read portion of buffer 104a; selection of input $i_3$ of the multiplexor 10a returns the output from storage elements 12i-12l or 14i-14l, depending on the read portion of buffer 104a; and selection of input $i_4$ of the multiplexor 10a returns the output from storage elements 12m-12p or 14m-14p, depending on the read portion of buffer 104a.

Returning to FIG. 2A, memory 102b is also abstractly depicted as a grid, with each "box" configured to store a data value. In the example depicted in FIG. 2A, buffer 104b is also double buffered. In the example, buffer 104b is partitioned into two portions (e.g., top and bottom portions) to more easily explain the concept that data may be read from one portion while data is being written to the other portion. In the simplified example of FIG. 2A, each half of the buffer 104b includes four rows. In a preferred embodiment (not depicted), each half of the buffer 104b includes nine rows. It should be understood that the concepts of the invention hold true regardless of the exact number of rows within each portion of the buffer 104b.

Figure 2C:
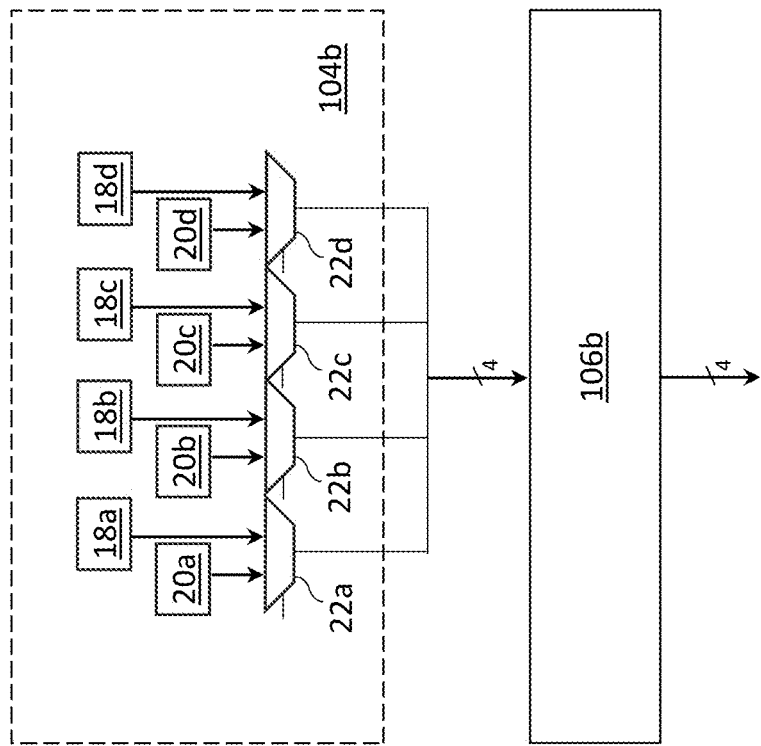
FIG. 2C depicts a logic schematic of a portion of the buffer and control logic (depicted in FIG. 2A) for handling the data provided to the columns of the processing elements, in accordance with one embodiment of the invention.

The read path of buffer 104b is shown in more detail in FIG. 2C, in which a plurality of two-input multiplexors may be used to select which portion of the buffer 104b (e.g., top or bottom) to read from. In the example of FIG. 2C, with the respective left inputs of the two-input multiplexors 22a-22d selected, the storage elements 20a-20d may be read (within the bottom portion of the buffer 104b), whereas with the respective right inputs of the two-input multiplexors 22a-22d selected, the storage elements 18a-18d may be read (within the top portion of the buffer 104b).

For clarity, it is noted that a "column" of the buffer 104b is intended to refer to a column of the buffer 104b within the "read portion" of buffer 104b. As the "read portion" of buffer 104a may switch back and forth between the top and bottom halves of the buffer 104b, so too will the notion of a "column" of the buffer 104b. For example, the left-most column of buffer 104b may correspond to storage elements 18a-18d when the top half of buffer 104b is being read, while the left-most column of buffer 104b may correspond to storage elements 20a-20d when the bottom half of buffer 104b is being read.

Figure 9A:
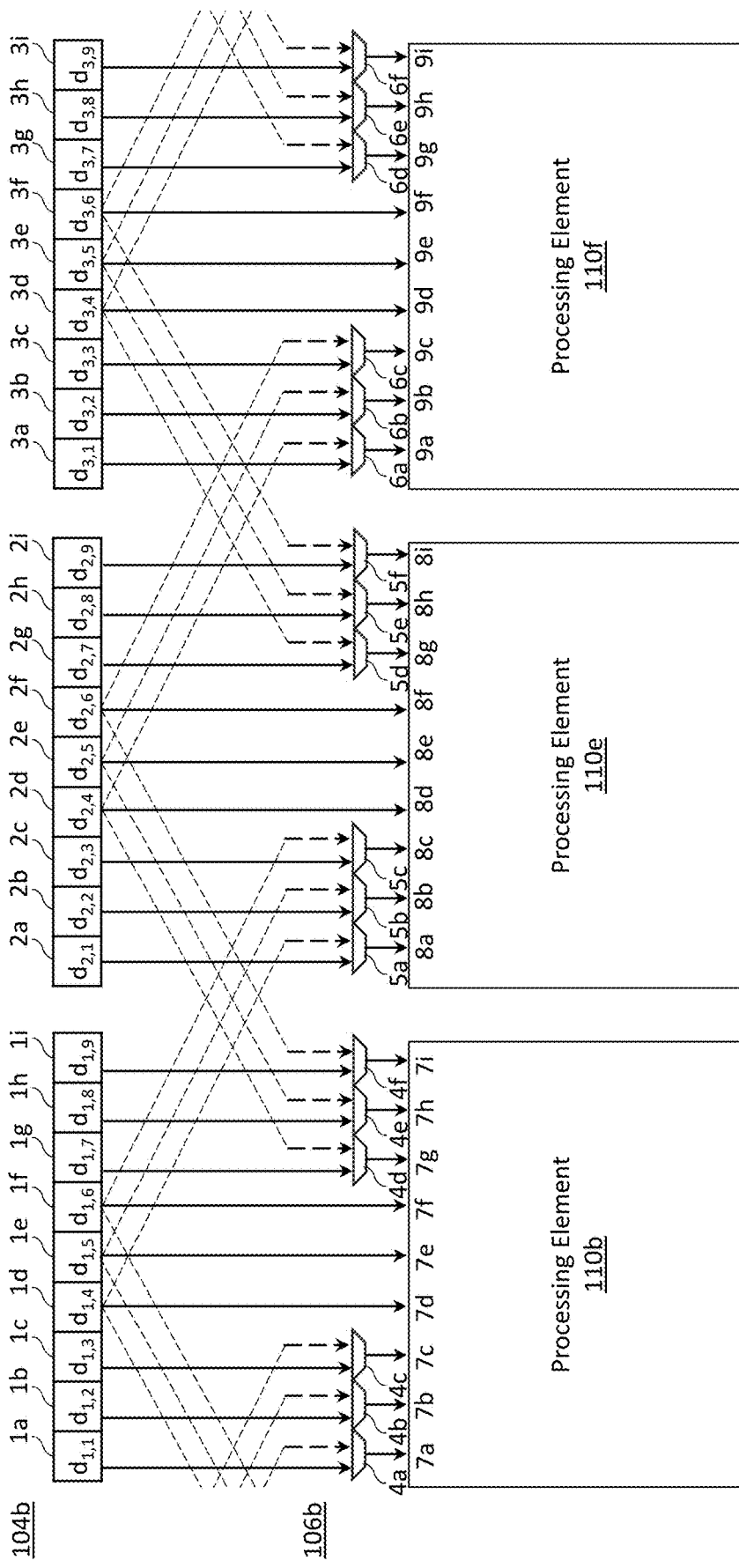
FIGS. 9A and 9B depict a logic schematic of the data buffer and control logic for providing the data to the respective columns of processing elements, in accordance with one embodiment of the invention.

The control logic 106b is more complex and will be progressively explained hereinbelow. It is noted that various embodiments of control logic 106b are depicted in FIGS. 9A, 9C, 9D and 9F, and those details are most easily understood only after the figures prior to FIG. 9A are discussed. Further, it is noted that the write path to buffer 104b has not been discussed to this point, and these details will be better understood in association with FIGS. 7B, 9B and 9E.

Figure 2D:
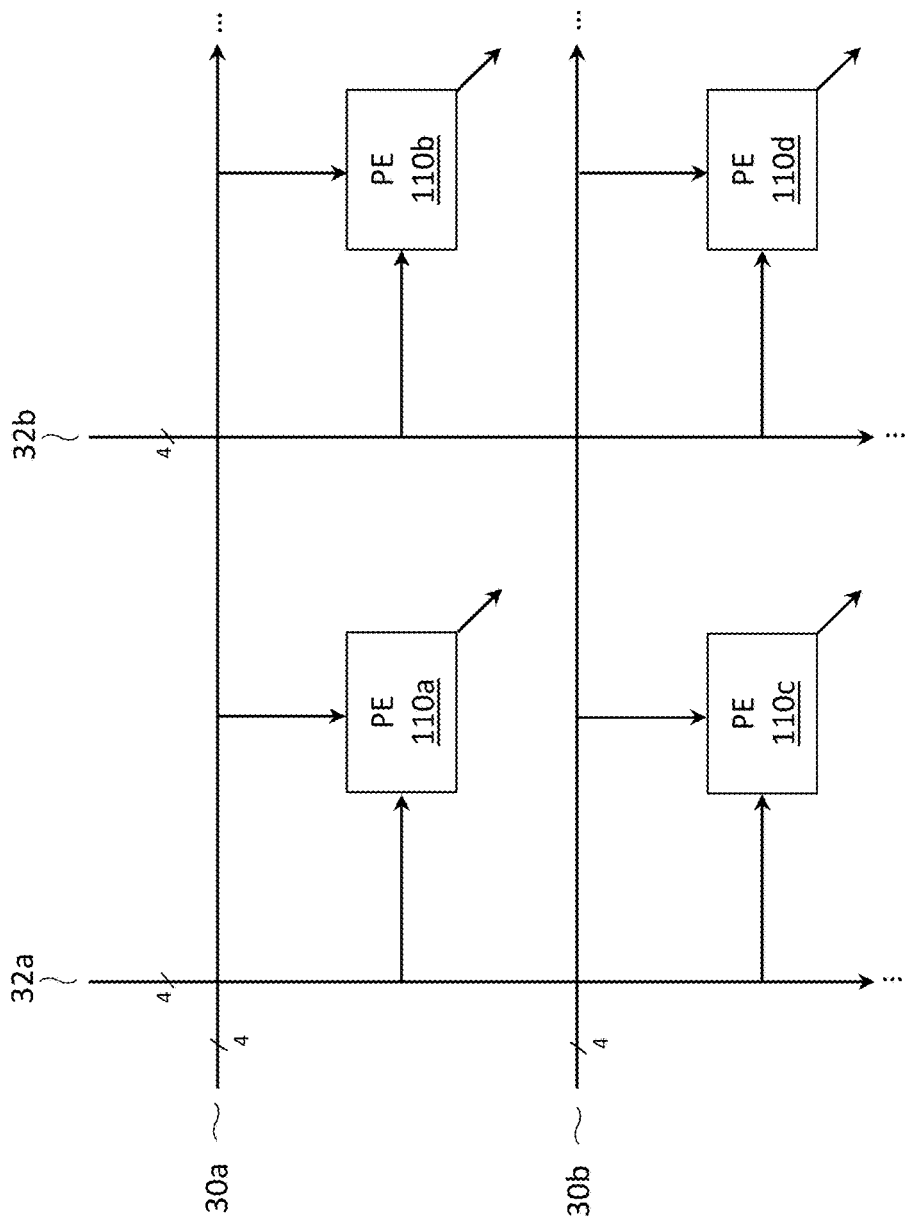
FIG. 2D depicts a logic schematic of the processing element array depicted in FIG. 2A, in accordance with one embodiment of the invention.

FIG. 2D depicts a logic schematic of the processing element array 108 depicted in FIG. 2A. As should be apparent by comparing the depiction of the processing element array 108 in FIGS. 2A and 2B, the depiction of the processing element array 108 depicted in FIG. 2A is "shorthand" notation. Conceptually, there are columns of data paths, each column carrying η values (at one moment in time or at one clock cycle), and rows of data paths, each row carrying η values (at one moment in time or at one clock cycle). In the simplified example of FIG. 2D, η equals 4. In a preferred embodiment, η equals 9. A processing element (PE) is (conceptually) disposed adjacent to the intersection of each of the columns and rows of data paths, and receives the 2η signals at each of the intersections. The word "conceptually" is used to emphasize that the conceptual arrangement of the logic components may differ from the physical arrangement of the circuit components after the typical placement and routing operations to translate a circuit design into a chip layout.

In the example of FIG. 2D:
Processing element 110a is disposed adjacent to the intersection of row data path 30a and column data path 32a, and receives η signals from row data path 30a and η signals from column data path 32a;
Processing element 110b is disposed adjacent to the intersection of row data path 30a and column data path 32b, and receives η signals from row data path 30a and η signals from column data path 32b;
Processing element 110c is disposed adjacent to the intersection of row data path 30b and column data path 32a, and receives η signals from row data path 30b and η signals from column data path 32a; and
Processing element 110d is disposed adjacent to the intersection of row data path 30b and column data path 32b, and receives η signals from row data path 30b and η signals from column data path 32b.

Each of the processing elements also has an output signal, depicted as the diagonal output line.

Figure 2E:
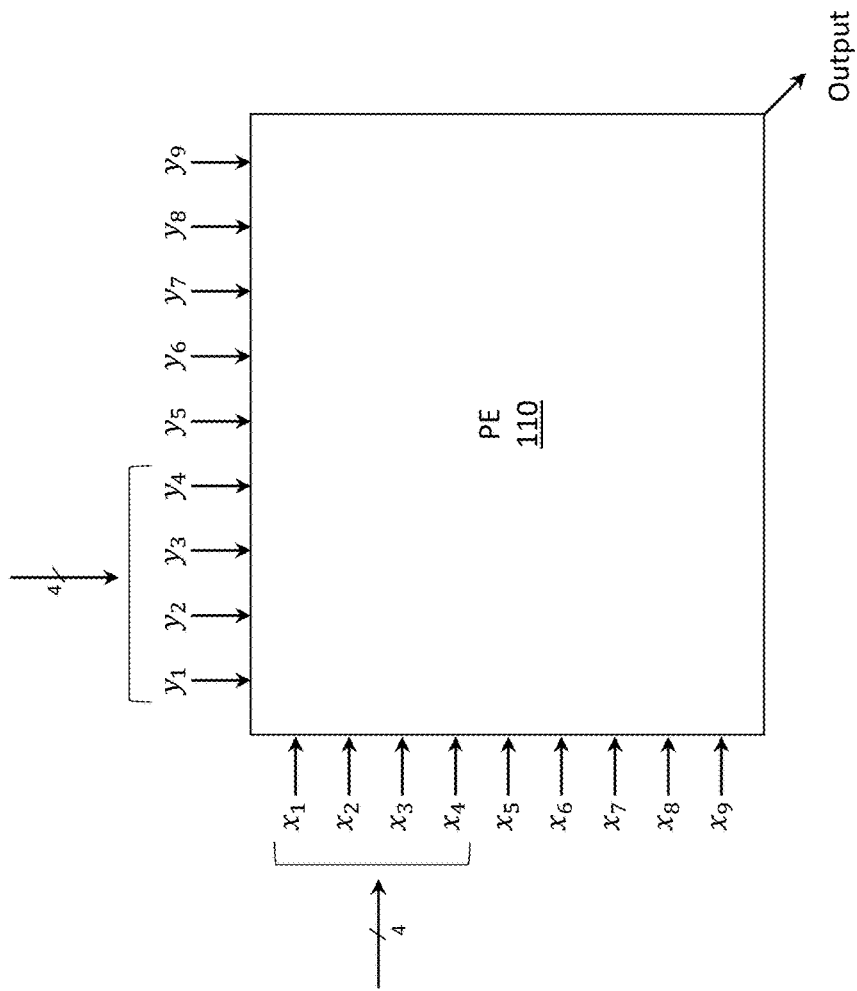
FIG. 2E depicts a logic schematic of the inputs and outputs of one of the processing elements, in accordance with one embodiment of the invention.

FIG. 2E depicts a logic schematic of the inputs and outputs of one of the processing elements. In general, each of the processing elements has 2η input ports. As a specific example in FIG. 2E, processing element 110 includes a total of 2*9 input ports for receiving eighteen input signals (i.e., $x_1, \ldots, x_9, y_1, \ldots, y_9$). $x_1, \ldots, x_9$ may represent the nine input signals from a row data path and $y_1, \ldots, y_9$ may represent the nine input signals from a column data path. It is important to note that not all of the input ports of a processing element 110 may be in use. Stated differently, the number of input ports of a processing element 110 that are in use may change over time. As an example, for matrix multiplication, 2*8 of the input ports may be in use, whereas for 3×3 convolution 2*9 of the input ports may be in use. In the example of FIG. 2E, only four of the input ports from a row data path and four of the input ports from a column data path are in use, in which case the other (unused) input ports may be deactivated or set to zero.

Figure 2F:
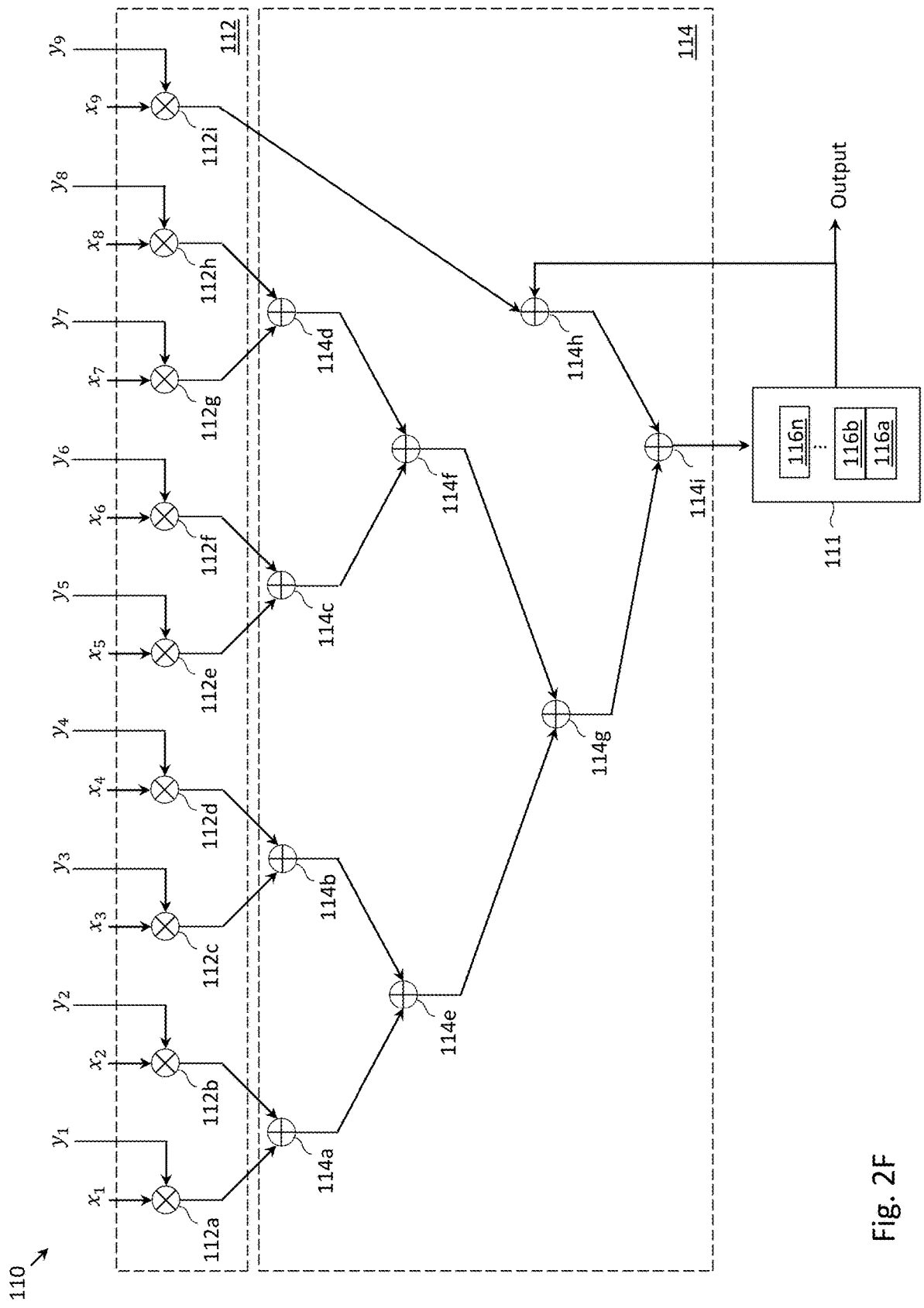
FIG. 2F depicts a logic schematic of the internal components of one of the processing elements, in accordance with one embodiment of the invention.

FIG. 2F depicts a logic schematic of the internal components of one of the processing elements 110 which is configured to compute a dot product of the values provided in the row data path (e.g., $x_1, \ldots, x_9$) with the values provided in the column data path (e.g., $y_1, \ldots, y_9$). If desired, processing element 110 may also accumulate the dot products that are sequentially computed over time. Processing element 110 may include a plurality of multipliers 112 and an adder tree 114 configured to sum the respective outputs of the multipliers 112. In the specific example of FIG. 2F, the plurality of multipliers 112 includes nine two-input multipliers 112a-112i, and the adder tree includes nine two-input adders 114a-114i. The output of adder 114i (which typically represents a dot product or an accumulation of a plurality of dot products) may be stored in one of a plurality of storage elements 116a, ..., 116n, which may be collectively referred to as register 111. Controller 101 may select one of the storage elements 116a, ..., 116n for storing the value from adder 114i, and select one of the storage elements 116a, ..., 116n which is to be read in order to generate the output of the processing element 110 and/or the value that is fed back into the adder tree 114 for accumulation with a dot product computed by the multipliers 112 and adder tree 114. As should be apparent from the logic schematic of FIG. 2F, the dot product of the values provided in the row data path (e.g., $x_1, \ldots, x_9$) and the values provided in the column data path (e.g., $y_1, \ldots, y_9$) may be computed in a single clock cycle (as no storage elements are included in 112 and 114).

Figure 2G:
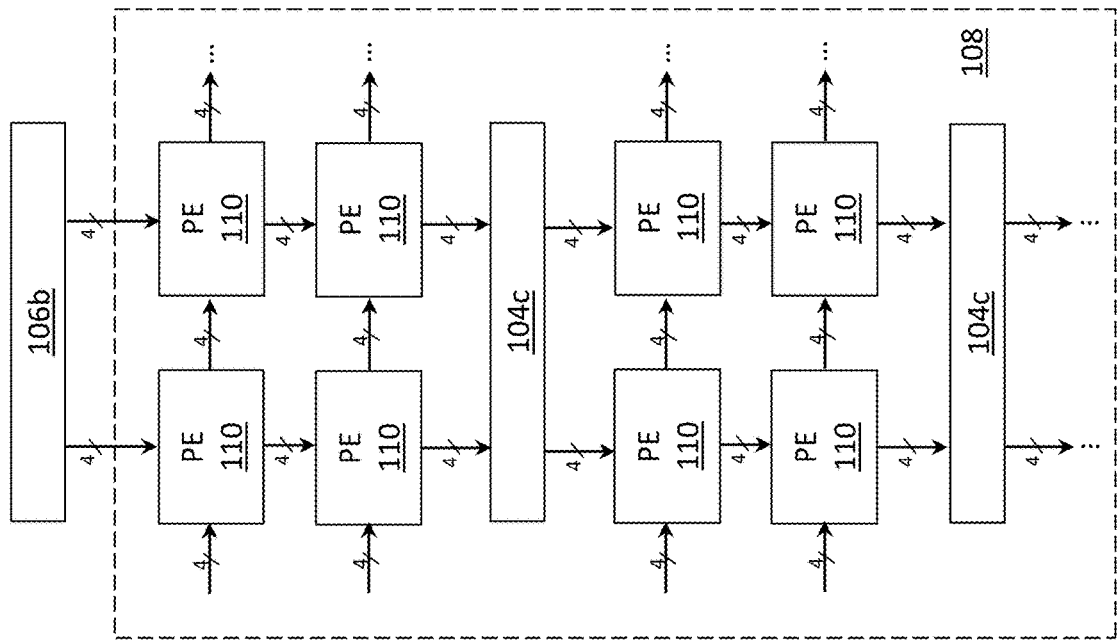
FIG. 2G depicts additional details of the processing element array, in accordance with one embodiment of the invention.

FIG. 2G depicts additional details associated with processing element array 108. Due to timing requirements, it may be necessary to place additional buffers 104c between rows of the processing elements 110 in order to reduce the propagation delay experienced by the the η signals transmitted along each of the column data paths 32a, 32b, etc. (i.e., in the example of FIG. 2G, η=4). Buffers 104c (and the vertical wires connecting the buffers 104c) may form a two-dimensional shift register, within which one can visualize the η signals (transmitted along each of the column data paths 32a, 32b, etc.) being propagated down a certain number of rows of processing elements 110 every clock cycle. In the simplified example of FIG. 2G, additional buffers 104c are placed between every two rows of processing elements 110. In a preferred embodiment, additional buffers 104c are placed between every four rows of processing elements 110. To clarify, buffer 104b may be double buffered, but buffers 104c may not be double buffered.

Figure 3:
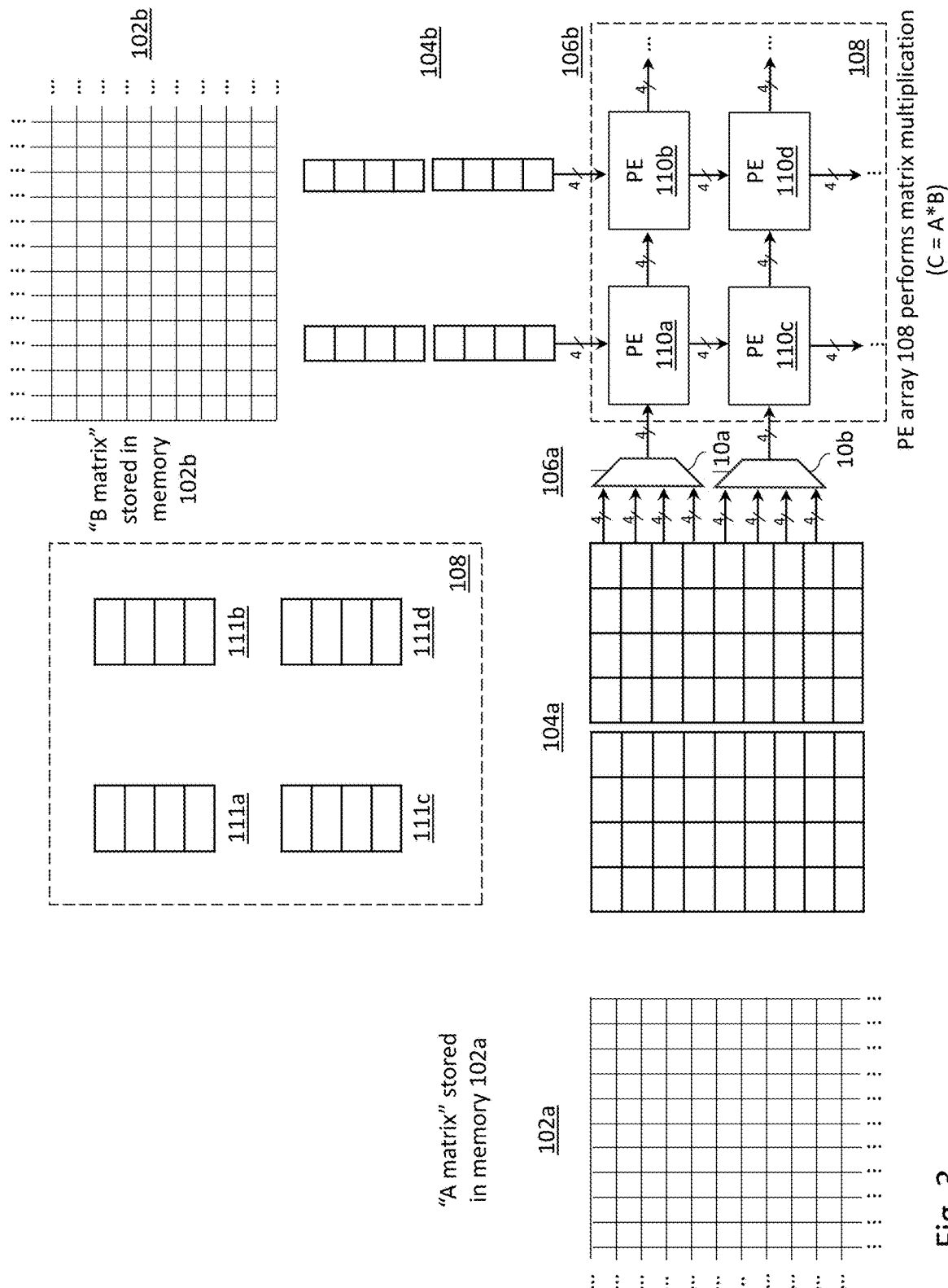
FIG. 3 depicts the logic schematic of FIG. 2A, when configured to perform matrix multiplication, in accordance with one embodiment of the invention.

FIG. 3 depicts the logic schematic of FIG. 2A, when configured to multiply matrix A with matrix B. Matrix A may be stored in memory 102a and matrix B may be stored in memory 102b. Processing element array 108 may be used to compute A*B, which may be also referred to as the output matrix C. By comparing the logic schematic of FIG. 3 with the logic schematic of FIG. 2A, one will notice that control logic 106b has been configured as pass-through wires that connect each column of buffer 104b with a corresponding column of processing elements from the processing element array 108. The other detail one will notice is that the registers 111a, ..., 111d of each of the processing elements 110a, ..., 110d, has been explicitly depicted, respectively. For clarity sake, it is noted that registers 111a, ..., 111d are drawn with a dotted box labeled 108 to emphasize that registers 111a, ..., 111d are part of the processing element array 108.

FIGS. 4A-4I depict a sequence of timesteps (or clock cycles) to explain the computation of matrix multiplication using the system of FIG. 1 (or more specifically, the logic schematic of FIG. 3). In one timestep (or clock cycle) depicted in FIG. 4A, one column (e.g., the right-most column) of the A matrix may be written to buffer 104a, including values $a_4, a_8, a_{12}, a_{16}, a_{20}, a_{24}, a_{28}$, and $a_{32}$, and one row (e.g., the bottom-most row) of the B matrix may be written to buffer 104b, including values $b_4$ and $b_8$. These values are abstractly depicted as "•" in memory 102a and 102b.

Figure 4A:
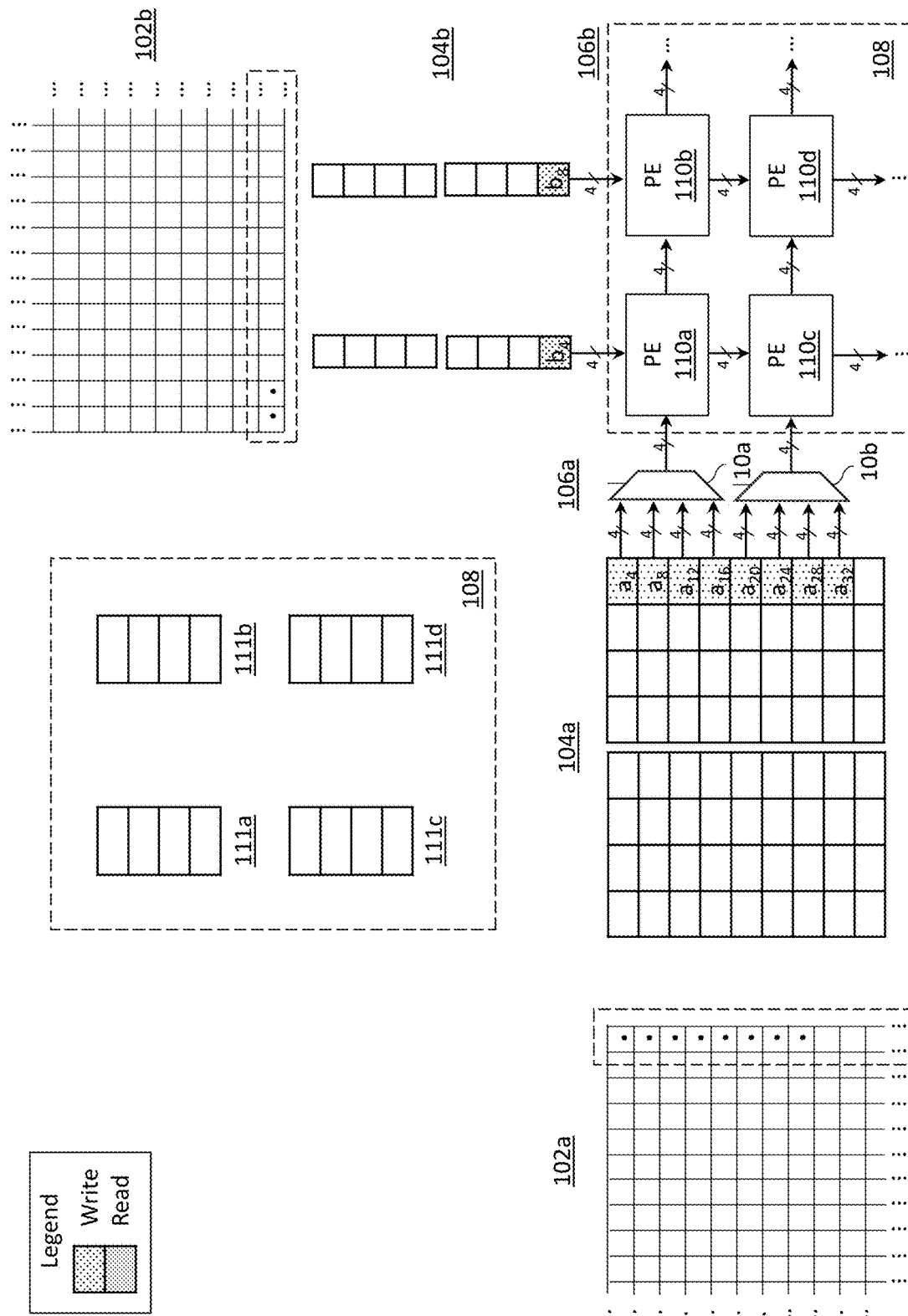
FIGS. 4A-4I depict a sequence of timesteps to explain the computation of matrix multiplication using the system of FIG. 1 (or more specifically, the logic schematic of FIG. 3), in accordance with one embodiment of the invention.
Figure 4B:
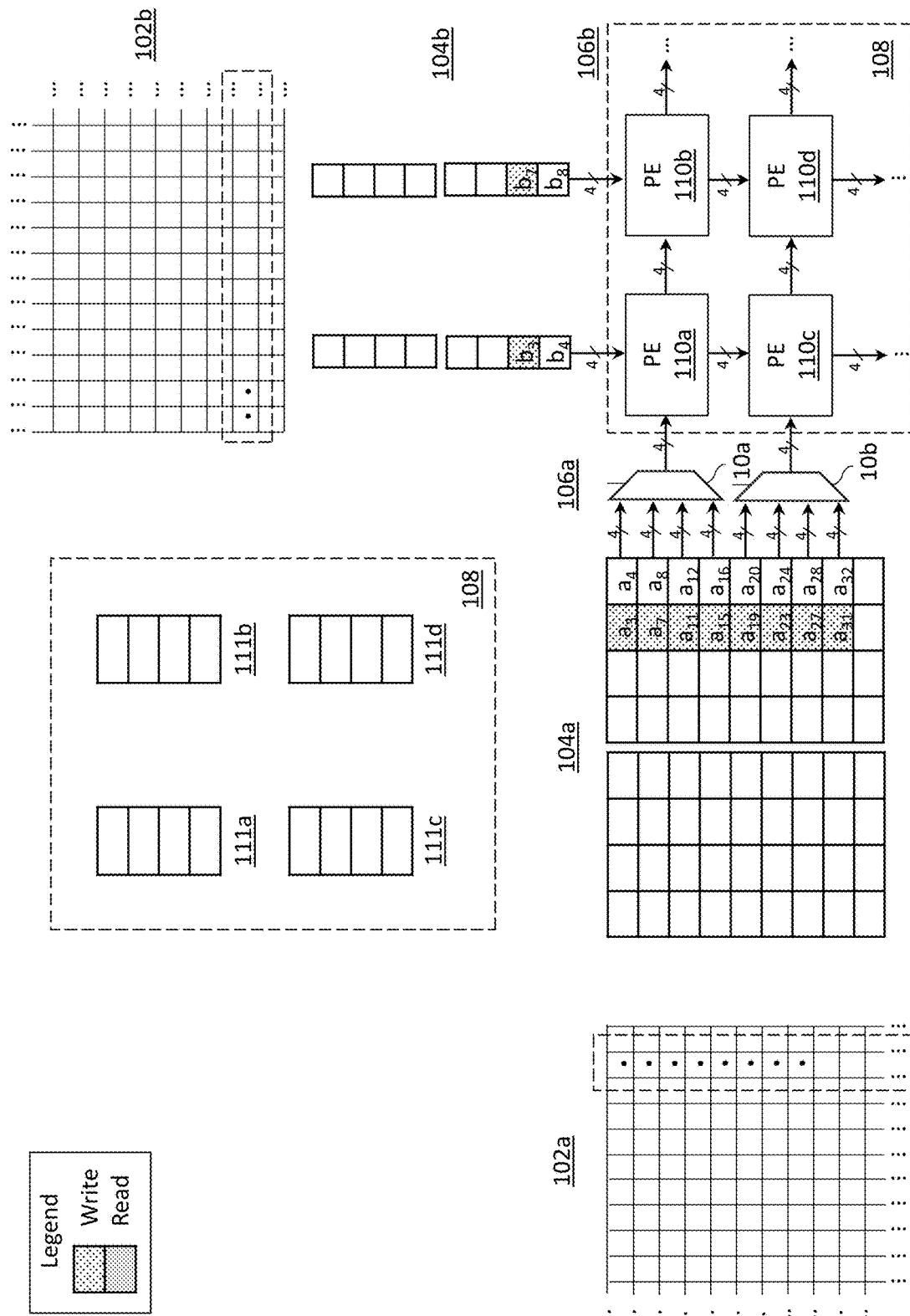

In the next (or immediately following) timestep (or clock cycle) depicted in FIG. 4B, one column of the A matrix (immediately adjacent to the one previously read) may be written to buffer 104a, including values $a_3, a_7, a_{11}, a_{15}, a_{19}, a_{23}, a_{27}$, and $a_{31}$, and one row of the B matrix may be written to buffer 104b (immediately adjacent to the one previously read), including values $b_3$ and $b_7$. These values are abstractly depicted as "•" in memory 102a and 102b.

Figure 4C:
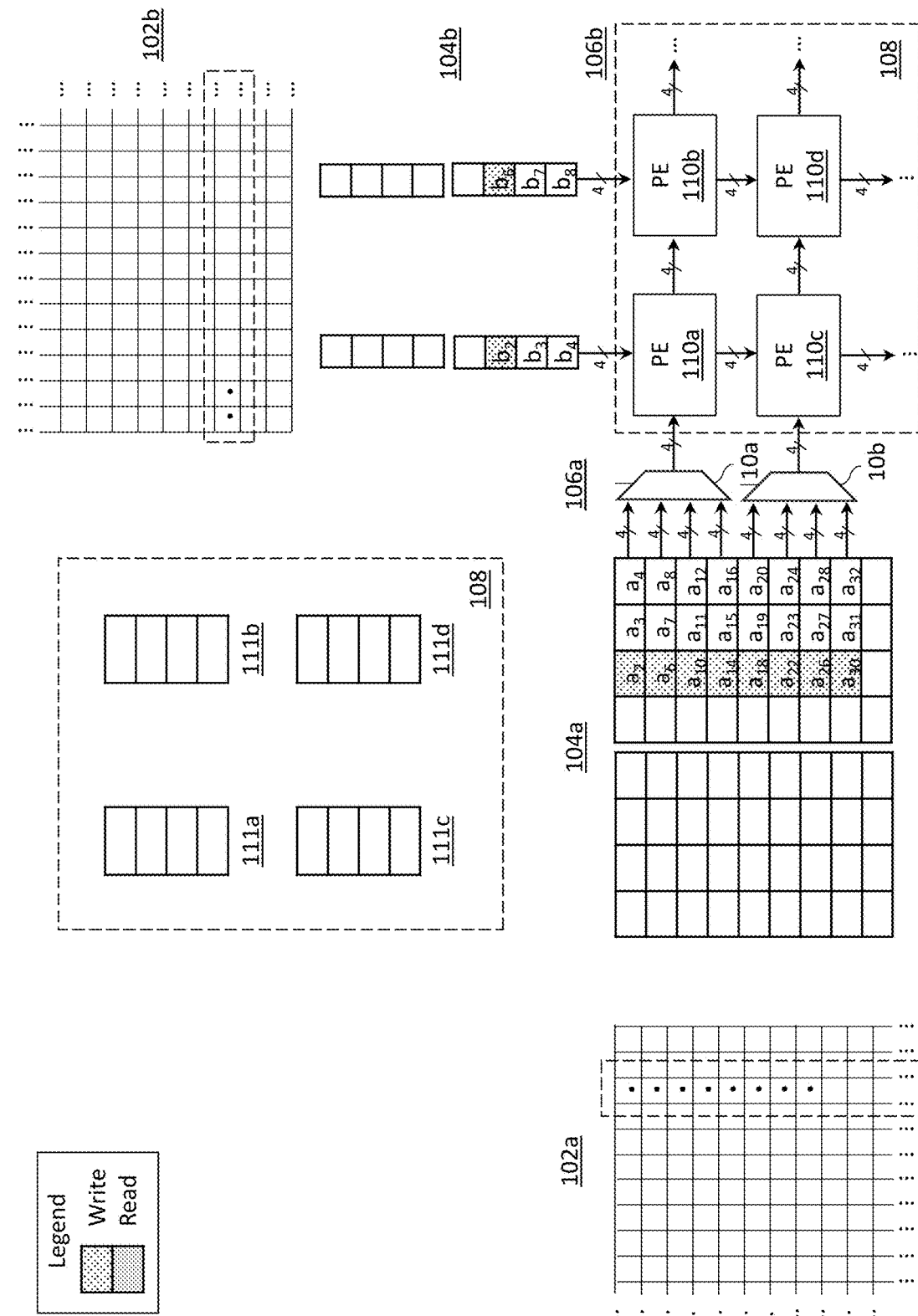

In the next (or immediately following) timestep (or clock cycle) depicted in FIG. 4C, one column of the A matrix (immediately adjacent to the one previously read) may be written to buffer 104a, including values $a_2, a_6, a_{10}, a_{14}, a_{18}, a_{22}, a_{26}$, and $a_{30}$, and one row of the B matrix (immediately adjacent to the one previously read) may be written to buffer 104b, including values $b_2$ and $b_6$. These values are abstractly depicted as "•" in memory 102a and 102b.

Figure 4D:
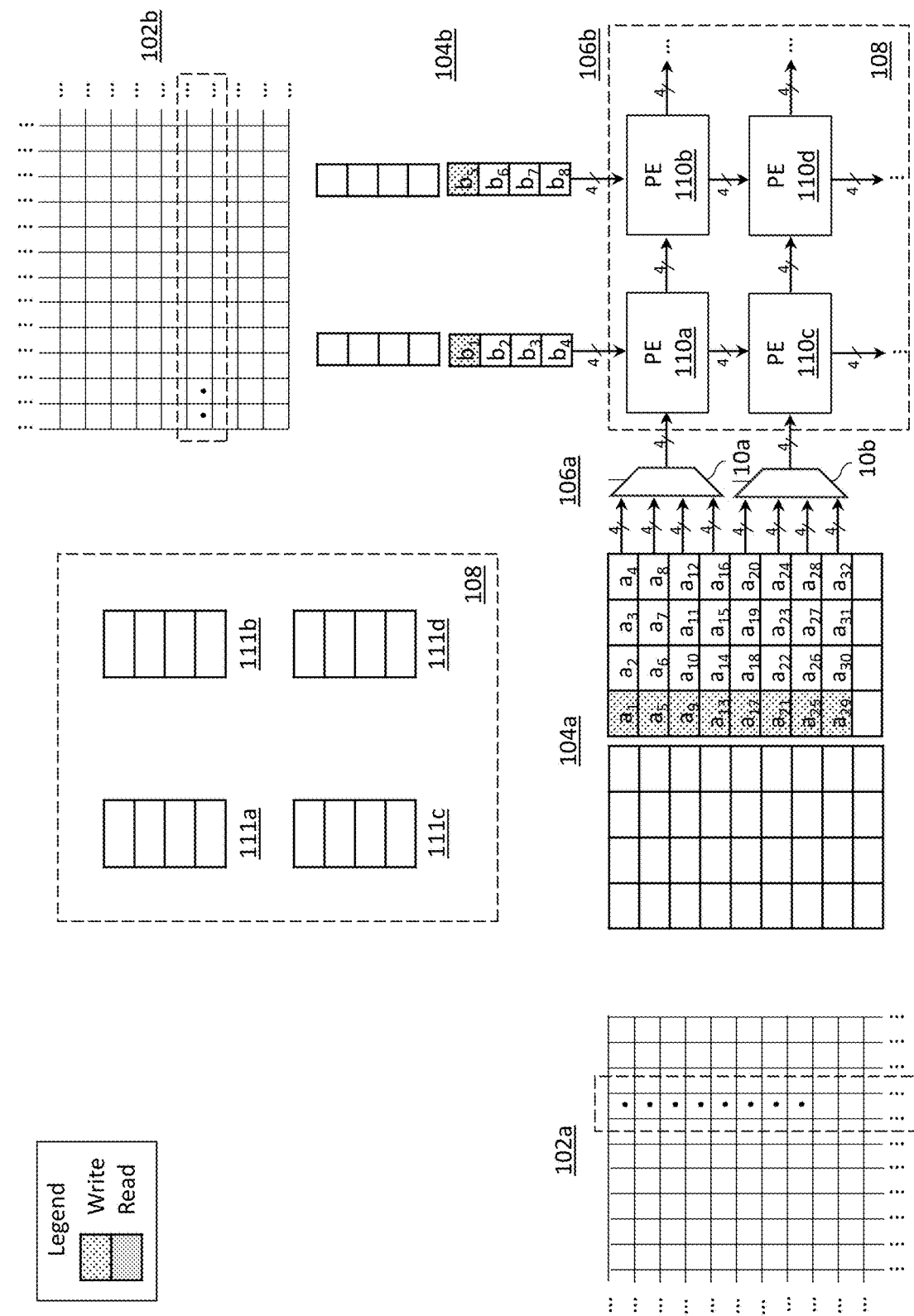

In the next (or immediately following) timestep (or clock cycle) depicted in FIG. 4D, one column of the A matrix (immediately adjacent to the one previously read) may be written to buffer 104a, including values $a_1, a_5, a_9, a_{13}, a_{17}, a_{21}, a_{25}$, and $a_{29}$, and one row of the B matrix (immediately adjacent to the one previously read) may be written to buffer 104b, including values $b_1$ and $b_5$. These values are abstractly depicted as "•" in memory 102a and 102b.

Figure 4E:
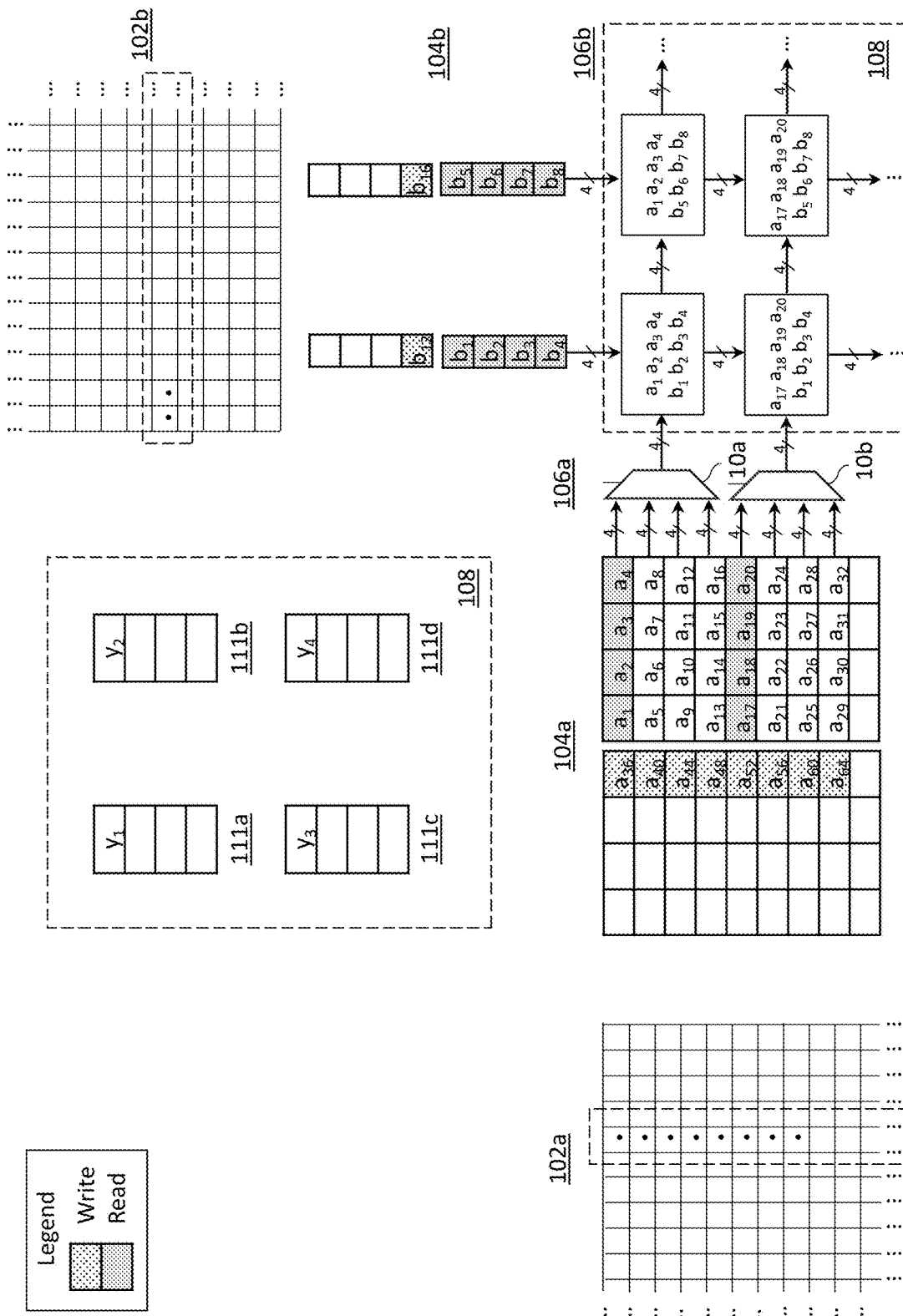

In the next timestep (or clock cycle) depicted in FIG. 4E, one column of the A matrix (immediately adjacent to the one previously read) may be written to buffer 104a, including values $a_{36}, a_{40}, a_{44}, a_{48}, a_{52}, a_{56}, a_{60}$, and $a_{64}$, and one row of the B matrix (immediately adjacent to the one previously read) may be written to buffer 104b, including values $b_{12}$ and $b_{16}$. These values are abstractly depicted as "•" in memory 102a and 102b. In the same timestep (or clock cycle) depicted in FIG. 4E, one or more rows may be read from buffer 104a, including values $a_1, a_2, a_3, a_4$ and $a_{17}, a_{18}, a_{19}, a_{20}$. Due to the previously explained "double buffering" in buffer 104a, the read and write operations may take place in separate portions of buffer 104a and may be performed in the same timestep (or clock cycle). Multiplexor 10a may transmit the values $a_1, a_2, a_3, a_4$ to processing elements 110a and 110b; and multiplexor 10b may transmit the values $a_{17}, a_{18}, a_{19}, a_{20}$ to processing elements 110c and 110d. Stated differently, values $a_1, a_2, a_3, a_4$ may be broadcasted along row data path 30a depicted in FIG. 2D, and values $a_{17}, a_{18}, a_{19}, a_{20}$ may be broadcasted along row data path 30b depicted in FIG. 2D.

In the same timestep (or clock cycle) depicted in FIG. 4E, one or more columns may be read from buffer 104b, including values $b_1, b_2, b_3, b_4, b_5, b_6, b_7$, and $b_8$. Due to the previously explained "double buffering" in buffer 104b, the read and write operations may take place in separate portions of buffer 104b and may be performed in the same timestep (or clock cycle). Control logic 106b may transmit values $b_1, b_2, b_3, b_4$ to processing elements 110a and 110c, and values $b_5, b_6, b_7, b_8$ to processing elements 110b and 110d. Stated differently, values $b_1, b_2, b_3, b_4$ may be broadcasted along column data path 32a depicted in FIG. 2D, and values $b_5, b_6, b_7, b_8$ may be broadcasted along column data path 32b depicted in FIG. 2D.

In the same timestep (or clock cycle) depicted in FIG. 4E:
processing element 110a may compute a dot product between values $a_1, a_2, a_3, a_4$ and $b_1, b_2, b_3, b_4$ (i.e., $a_1b_1+a_2b_2+a_3b_3+a_4b_4$) and store the dot product in a storage element of register 111a (i.e., represented as $y_1$ in FIG. 4E);
processing element 110b may compute a dot product between values $a_1, a_2, a_3, a_4$ and $b_5, b_6, b_7, b_8$ (i.e., $a_1b_5+a_2b_6+a_3b_7+a_4b_8$) and store the dot product in a storage element of register 111b (i.e., represented as $y_2$ in FIG. 4E);

processing element 110c may compute a dot product between values $a_{17}, a_{18}, a_{19}, a_{20}$ and $b_1, b_2, b_3, b_4$ (i.e., $a_{17}b_1+a_{18}b_2+a_{19}b_3+a_{20}b_4$) and store the dot product in a storage element of register 111c (i.e., represented as $y_3$ in FIG. 4E); and processing element 110d may compute a dot product between values $a_{17}, a_{18}, a_{19}, a_{20}$ and $b_5, b_6, b_7, b_8$ (i.e., $a_{17}b_5+a_{18}b_6+a_{19}b_7+a_{20}b_8$) and store the dot product in a storage element of register 111d (i.e., represented as $y_4$ in FIG. 4E).

Figure 4F:
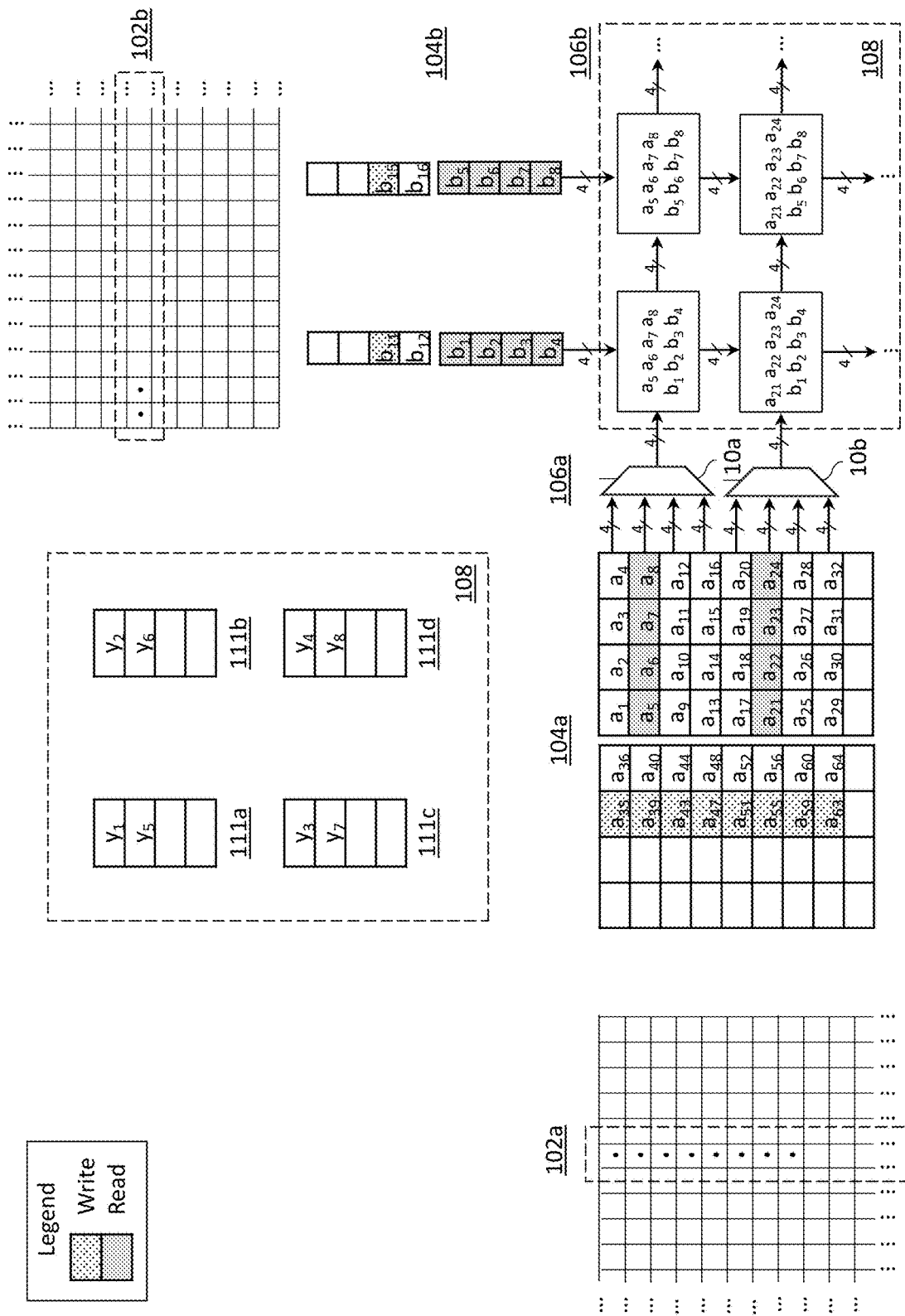

In the next (or immediately following) timestep (or clock cycle) depicted in FIG. 4F, one column of the A matrix (immediately adjacent to the one previously read) may be written to buffer 104a, including values $a_{35}, a_{39}, a_{43}, a_{47}, a_{51}, a_{55}, a_{59}$, and $a_{63}$, and one row of the B matrix (immediately adjacent to the one previously read) may be written to buffer 104b, including values $b_{11}$ and $b_{15}$. These values are abstractly depicted as "•" in memory 102a and 102b. In the same timestep (or clock cycle) depicted in FIG. 4F, one or more rows may be read from buffer 104a, including values $a_5, a_6, a_7, a_8$ and $a_{21}, a_{22}, a_{23}, a_{24}$. Multiplexor 10a may transmit the values $a_5, a_6, a_7, a_8$ to processing elements 110a and 110b; and multiplexor 10b may transmit the values $a_{21}, a_{22}, a_{23}, a_{24}$ to processing elements 110c and 110d. Stated differently, values $a_5, a_6, a_7, a_8$ may be broadcasted along row data path 30a depicted in FIG. 2D, and values $a_{21}, a_{22}, a_{23}, a_{24}$ may be broadcasted along row data path 30b depicted in FIG. 2D.

In the same timestep (or clock cycle) depicted in FIG. 4F, one or more columns may be read from buffer 104b, including values $b_1, b_2, b_3, b_4, b_5, b_6, b_7$, and $b_8$. Control logic 106b may transmit values $b_1, b_2, b_3, b_4$ to processing elements 110a and 110c, and values $b_5, b_6, b_7, b_8$ to processing elements 110b and 110d.

In the same timestep (or clock cycle) depicted in FIG. 4F:

processing element 110a may compute a dot product between values $a_5, a_6, a_7, a_8$ and $b_1, b_2, b_3, b_4$ (i.e., $a_5b_1+a_6b_2+a_7b_3+a_8b_4$) and store the dot product in a storage element of register 111a (i.e., represented as $y_5$ in FIG. 4F);

processing element 110b may compute a dot product between values $a_5, a_6, a_7, a_8$ and $b_5, b_6, b_7, b_8$ (i.e., $a_5b_8+a_6b_6+a_7b_7+a_8b_8$) and store the dot product in a storage element of register 111b (i.e., represented as $y_6$ in FIG. 4F);

processing element 110c may compute a dot product between values $a_{21}, a_{22}, a_{23}, a_{24}$ and $b_1, b_2, b_3, b_4$ (i.e., $a_{21}b_1+a_{22}b_2+a_{23}b_3+a_{24}b_4$) and store the dot product in a storage element of register 111c (i.e., represented as $y_7$ in FIG. 4F); and processing element 110d may compute a dot product between values $a_{21}, a_{22}, a_{23}, a_{24}$ and $b_5, b_6, b_7, b_8$ (i.e., $a_{21}b_8+a_{22}b_6+a_{23}b_7+a_{24}b_8$) and store the dot product in a storage element of register 111d (i.e., represented as $y_8$ in FIG. 4F).

Figure 4G:
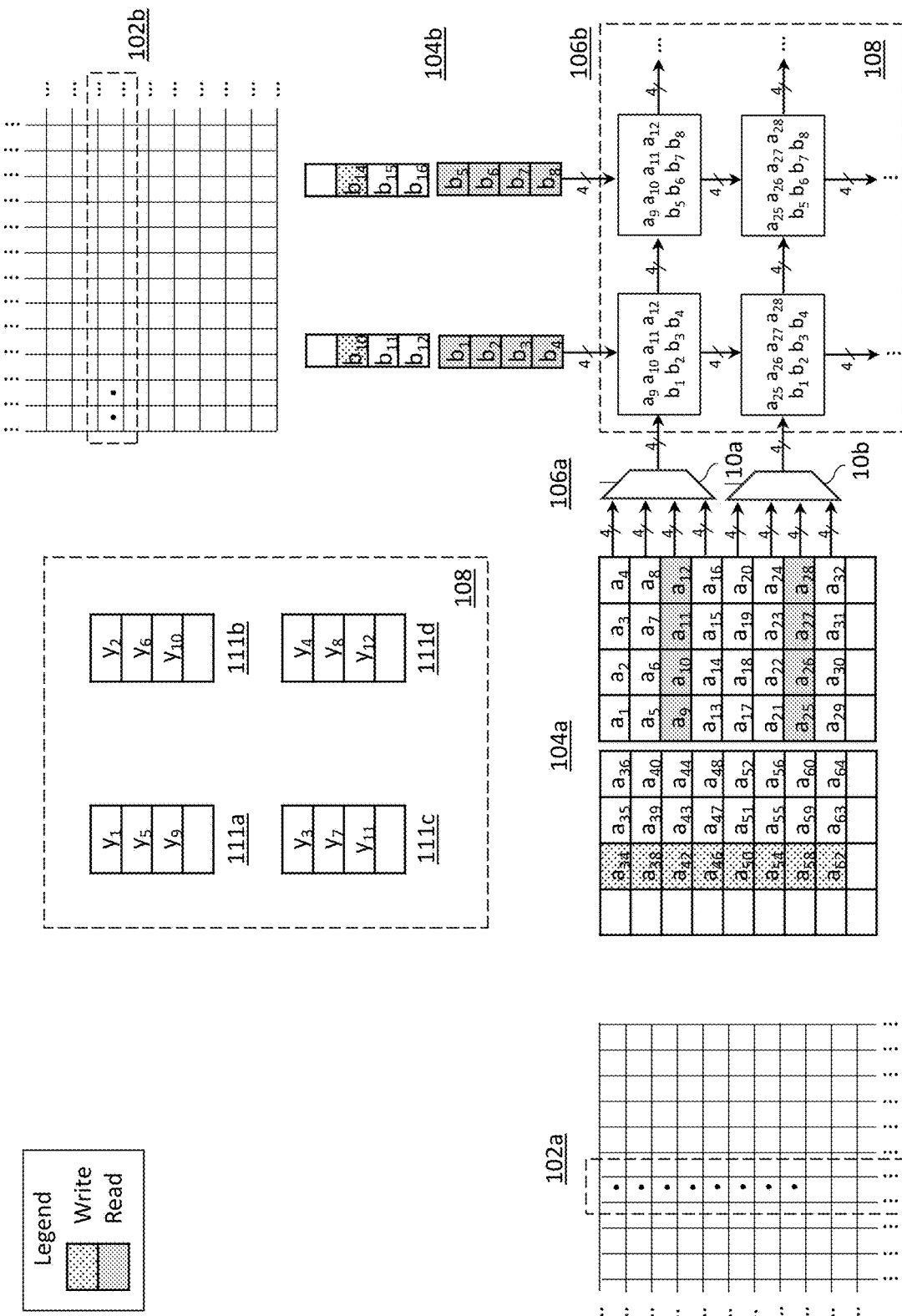

In the next (or immediately following) timestep (or clock cycle) depicted in FIG. 4G, one column of the A matrix (immediately adjacent to the one previously read) may be written to buffer 104a, including values $a_{34}, a_{38}, a_{42}, a_{46}, a_{50}, a_{54}, a_{58}$, and $a_{62}$, and one row of the B matrix (immediately adjacent to the one previously read) may be written to buffer 104b, including values $b_{10}$ and $b_{14}$. These values are abstractly depicted as "•" in memory 102a and 102b. In the same timestep (or clock cycle) depicted in FIG. 4G, one or more rows may be read from buffer 104a, including values $a_9, a_{10}, a_{11}, a_{12}$ and $a_{25}, a_{26}, a_{27}, a_{28}$. Multiplexor 10a may transmit the values $a_9, a_{10}, a_{11}, a_{12}$ to processing elements 110a and 110b; and multiplexor 10b may transmit the values $a_{25}, a_{26}, a_{27}, a_{28}$ to processing elements 110c and 110d. Stated differently, values $a_9, a_{10}, a_{11}, a_{12}$ may be broadcasted along row data path 30a depicted in FIG. 2D, and values $a_{25}, a_{26}, a_{27}, a_{28}$ may be broadcasted along row data path 30b depicted in FIG. 2D.

In the same timestep (or clock cycle) depicted in FIG. 4G, one or more columns may be read from buffer 104b, including values $b_1, b_2, b_3, b_4, b_5, b_6, b_7$, and $b_8$. Control logic 106b may transmit values $b_1, b_2, b_3, b_4$ to processing elements 110a and 110c, and values $b_5, b_6, b_7, b_8$ to processing elements 110b and 110d.

In the same timestep (or clock cycle) depicted in FIG. 4G:

processing element 110a may compute a dot product between values $a_9, a_{10}, a_{11}, a_{12}$ and $b_1, b_2, b_3, b_4$ (i.e., $a_9b_1+a_{18}b_2+a_{11}b_3+a_{12}b_4$) and store the dot product in a storage element of register 111a (i.e., represented as $y_9$ in FIG. 4G);

processing element 110b may compute a dot product between values $a_9, a_{10}, a_{11}, a_{12}$ and $b_5, b_6, b_7, b_8$ (i.e., $a_9b_5+a_{10}b_6+a_{11}b_7+a_{12}b_8$) and store the dot product in a storage element of register 111b (i.e., represented as $y_{10}$ in FIG. 4G);

processing element 110c may compute a dot product between values $a_{25}, a_{26}, a_{27}, a_{28}$ and $b_1, b_2, b_3, b_4$ (i.e., $a_{25}b_1+a_{26}b_2+a_{27}b_3+a_{28}b_4$) and store the dot product in a storage element of register 111c (i.e., represented as $y_{11}$ in FIG. 4G); and processing element 110d may compute a dot product between values $a_{25}, a_{26}, a_{27}, a_{28}$ and $b_5, b_6, b_7, b_8$ (i.e., $a_{25}b_5+a_{26}b_6+a_{27}b_7+a_{28}b_8$) and store the dot product in a storage element of register 111d (i.e., represented as $y_{12}$ in FIG. 4G).

Figure 4H:
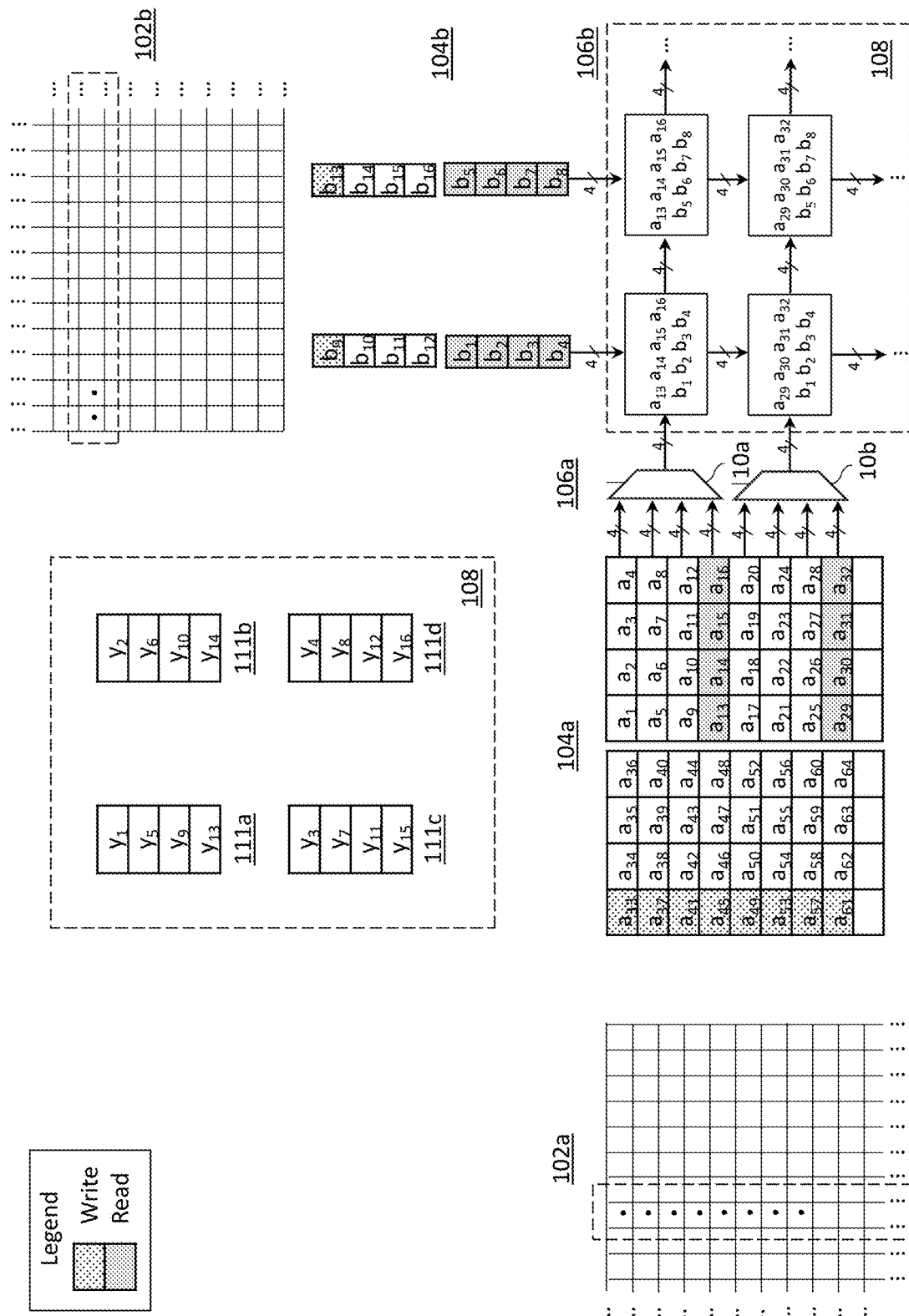

In the next (or immediately following) timestep (or clock cycle) depicted in FIG. 4H, one column of the A matrix (immediately adjacent to the one previously read) may be written to buffer 104a, including values $a_{33}, a_{37}, a_{41}, a_{45}, a_{49}, a_{53}, a_{57}$, and $a_{61}$, and one row of the B matrix (immediately adjacent to the one previously read) may be written to buffer 104b, including values $b_9$ and $b_{13}$. These values are abstractly depicted as "•" in memory 102a and 102b. In the same timestep (or clock cycle) depicted in FIG. 4H, one or more rows may be read from buffer 104a, including values $a_{13}, a_{14}, a_{15}, a_{16}$ and $a_{29}, a_{30}, a_{31}, a_{32}$. Multiplexor 10a may transmit the values $a_{13}, a_{14}, a_{15}, a_{16}$ to processing elements 110a and 110b; and multiplexor 10b may transmit the values $a_{29}, a_{30}, a_{31}, a_{32}$ to processing elements 110c and 110d. Stated differently, values $a_{13}, a_{14}, a_{15}, a_{16}$ may be broadcasted along row data path 30a depicted in FIG. 2D, and values $a_{29}, a_{30}, a_{31}, a_{32}$ may be broadcasted along row data path 30b depicted in FIG. 2D.

In the same timestep (or clock cycle) depicted in FIG. 4H, one or more columns may be read from buffer 104b, including values $b_1, b_2, b_3, b_4, b_5, b_6, b_7$, and $b_8$. Control logic 106b may transmit values $b_1, b_2, b_3, b_4$ to processing elements 110a and 110c, and values $b_5, b_6, b_7, b_8$ to processing elements 110b and 110d.

In the same timestep (or clock cycle) depicted in FIG. 4H:

processing element 110a may compute a dot product between values $a_{13}, a_{14}, a_{15}, a_{16}$ and $b_1, b_2, b_3, b_4$ (i.e., $a_{13}b_1+a_{14}b_2+a_{15}b_3+a_{16}b_4$) and store the dot product in a storage element of register 111a (i.e., represented as $y_{13}$ in FIG. 4H);

processing element 110b may compute a dot product between values $a_{13}$, $a_{14}$, $a_{15}$, $a_{16}$ and $b_5$, $b_6$, $b_7$, $b_8$ (i.e., $a_{13}b_5+a_{14}b_6+a_{15}b_7+a_{16}b_8$) and store the dot product in a storage element of register 111b (i.e., represented as $y_{14}$ in FIG. 4H);

processing element 110c may compute a dot product between values $a_{29}$, $a_{30}$, $a_{31}$, $a_{32}$ and $b_1$, $b_2$, $b_3$, $b_4$ (i.e., $a_{29}b_1+a_{38}b_2+a_{31}b_3+a_{32}b_4$) and store the dot product in a storage element of register 111c (i.e., represented as $y_{15}$ in FIG. 4H); and processing element 110d may compute a dot product between values $a_{29}$, $a_{30}$, $a_{31}$, $a_{32}$ and $b_5$, $b_6$, $b_7$, $b_8$ (i.e., $a_{29}b_5+a_{38}b_6+a_{31}b_7+a_{32}b_8$) and store the dot product in a storage element of register 111d (i.e., represented as $y_{16}$ in FIG. 4H).

Figure 4I:
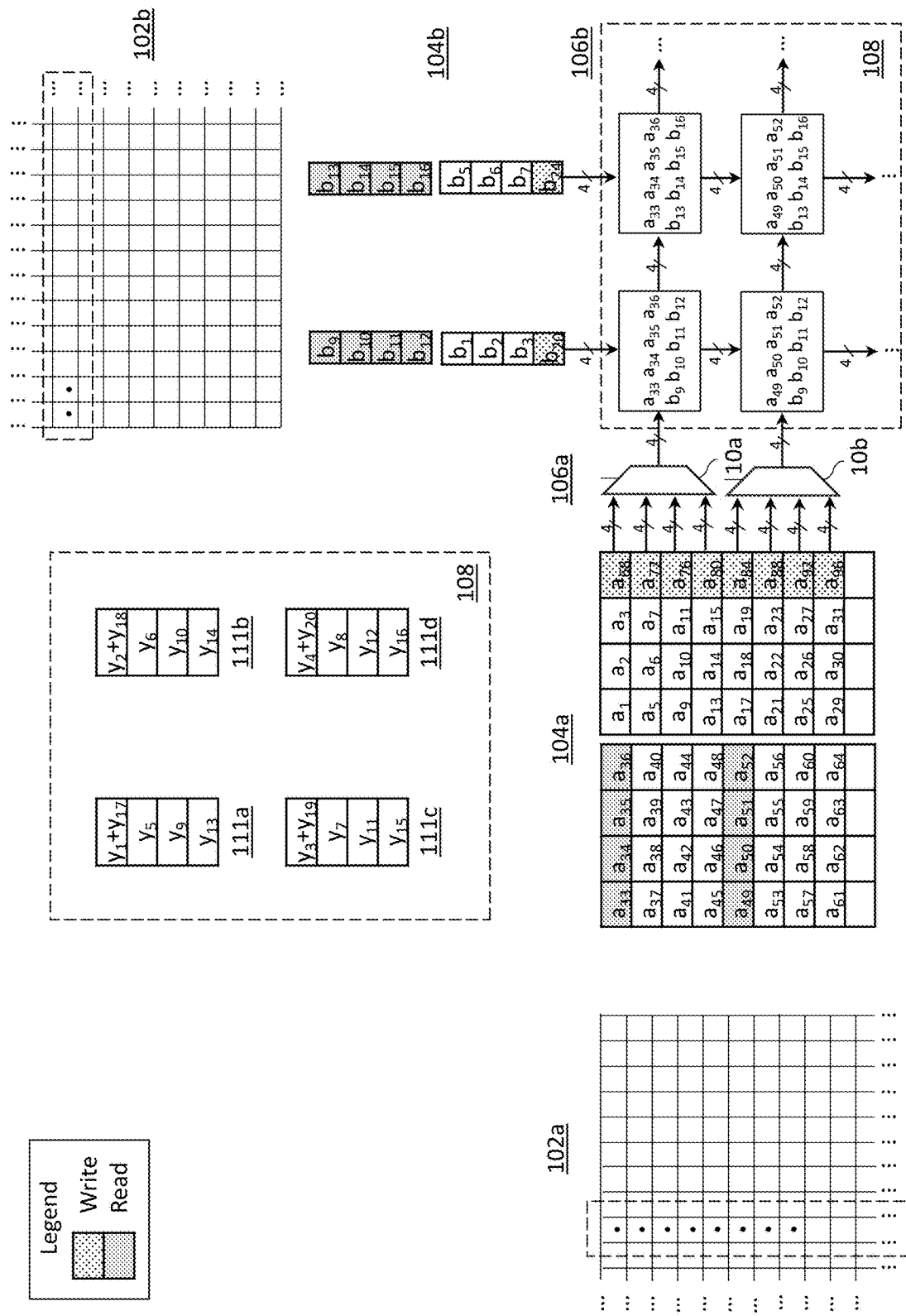

In the next (or immediately following) timestep (or clock cycle) depicted in FIG. 4I, one column of the A matrix (immediately adjacent to the one previously read) may be written to buffer 104a, including values $a_{68}$, $a_{72}$, $a_{76}$, $a_{80}$, $a_{84}$, $a_{88}$, $a_{92}$, and $a_{96}$, and one row of the B matrix (immediately adjacent to the one previously read) may be written to buffer 104b, including values $b_{20}$ and $b_{24}$. These values are abstractly depicted as "•" in memory 102a and 102b. In the same timestep (or clock cycle) depicted in FIG. 4I, one or more rows may be read from buffer 104a, including values $a_{33}$, $a_{34}$, $a_{35}$, $a_{36}$ and $a_{49}$, $a_{50}$, $a_{51}$, $a_{52}$. Multiplexor 10a may transmit the values $a_{33}$, $a_{34}$, $a_{35}$, $a_{36}$ to processing elements 110a and 110b; and multiplexor 10b may transmit the values $a_{49}$, $a_{50}$, $a_{51}$, $a_{52}$ to processing elements 110c and 110d. Stated differently, values $a_{33}$, $a_{34}$, $a_{35}$, $a_{36}$ may be broadcasted along row data path 30a depicted in FIG. 2D, and values $a_{49}$, $a_{50}$, $a_{51}$, $a_{52}$ may be broadcasted along row data path 30b depicted in FIG. 2D.

In the same timestep (or clock cycle) depicted in FIG. 4H, one or more columns may be read from buffer 104b, including values $b_9$, $b_{10}$, $b_{11}$, $b_{12}$, $b_{13}$, $b_{14}$, $b_{15}$, and $b_{16}$. Control logic 106b may transmit values $b_9$, $b_{10}$, $b_{11}$, $b_{12}$ to processing elements 110a and 110c, and values $b_{13}$, $b_{14}$, $b_{15}$, $b_{16}$ to processing elements 110b and 110d.

It is worth noting that, in the time step shown in FIG. 4I, the read and write portions have swapped in buffers 104a and 104b. Right after all the data has been read in the right portion of buffer 104a (which happens in the clock cycles depicted in FIGS. 4E-4H), the right portion of buffer 104a starts being written to, erasing the previously read data. The present example should motivate why it is optimal to match the number of rows within a row group to the number of elements in a "row" of buffer 104a (in which the row refers only to the elements in the read portion), so that the swapping between the read and write portions can occur seamlessly without any wasted clock cycles in which either the read or write operations are idling.

In the same timestep (or clock cycle) depicted in FIG. 4I.
processing element 110a may compute a dot product between values $a_{33}$, $a_{34}$, $a_{35}$, $a_{36}$ and $b_9$, $b_{10}$, $b_{11}$, $b_{12}$ (i.e., $a_{33}b_9+a_{34}b_{10}+a_{35}b_{11}+a_{36}b_{12}$), accumulate the dot product with the previously stored value, $y_1$, and store the accumulated value in a storage element of register 111a (i.e., represented as $y_1+y_{17}$ in FIG. 4I);

processing element 110b may compute a dot product between values $a_{33}$, $a_{34}$, $a_{35}$, $a_{36}$ and $b_{13}$, $b_{14}$, $b_{15}$, $b_{16}$ (i.e., $a_{33}b_{13}+a_{34}b_{14}+a_{35}b_{15}+a_{36}b_{16}$), accumulate the dot product with the previously stored value, $y_2$, and store the accumulated value in a storage element of register 111b (i.e., represented as $y_2+y_{18}$ in FIG. 4I);

processing element 110c may compute a dot product between values $a_{49}$, $a_{50}$, $a_{51}$, $a_{52}$ and $b_9$, $b_{10}$, $b_{11}$, $b_{12}$ (i.e., $a_{49}b_9+a_{50}b_{10}+a_{51}b_{11}+a_{52}b_{12}$), accumulate the dot product with the previously stored value, $y_3$, and store the accumulated value in a storage element of register 111c (i.e., represented as $y_3+y_{19}$ in FIG. 4I); and processing element 110d may compute a dot product between values $a_{49}$, $a_{50}$, $a_{51}$, $a_{52}$ and $b_{13}$, $b_{14}$, $b_{15}$, $b_{16}$ (i.e., $a_{49}b_{13}+a_{50}b_{14}+a_{51}b_{15}+a_{52}b_{16}$), accumulate the dot product with the previously stored value, $y_4$, and store the accumulated value in a storage element of register 111d (i.e., represented as $y_4+y_{20}$ in FIG. 4I).

If not already apparent, it noted that the A matrix can be written as a column of row vectors $\{\alpha_i^T\}_{i=1}^m$, in which:

$\alpha_1^T = [\ldots \alpha_{68}\ \alpha_{33}\ \alpha_{34}\ \alpha_{35}\ \alpha_{36}\ \alpha_1\ \alpha_2\ \alpha_3\ \alpha_4]$ $\alpha_2^T = [\ldots \alpha_{72}\ \alpha_{37}\ \alpha_{38}\ \alpha_{39}\ \alpha_{40}\ \alpha_5\ \alpha_6\ \alpha_7\ \alpha_8]$ $\alpha_3^T = [\ldots \alpha_{76}\ \alpha_{41}\ \alpha_{42}\ \alpha_{43}\ \alpha_{44}\ \alpha_9\ \alpha_{10}\ \alpha_{11}\ \alpha_{12}]$ and so on . . . .

Likewise, the B matrix can be written as a row of column vectors in which:

$$\beta_1 = \begin{bmatrix} \vdots \\ b_{20} \\ b_9 \\ b_{10} \\ b_{11} \\ b_{12} \\ b_1 \\ b_2 \\ b_3 \\ b_4 \end{bmatrix}$$

$$\beta_2 = \begin{bmatrix} \vdots \\ b_{24} \\ b_{13} \\ b_{14} \\ b_{15} \\ b_{16} \\ b_5 \\ b_6 \\ b_7 \\ b_8 \end{bmatrix}$$

As such, the computation of $\alpha_1^T\beta_1$ (as one example of $\alpha_i^T\beta_j$) can be understood as carrying out the following sum of partial dot products:

$\alpha_1^T\beta_1 = \ldots + (\ldots + \ldots + \ldots + \ldots + a_{68}b_{20}) + (a_{33}b_9+a_{34}b_{10}+a_{35}b_{11}+a_{36}b_{12})+(a_1b_1+a_2b_2+a_3b_3+a_4b_4)$ The process to compute matrix multiplication continues in a similar manner after FIG. 4I until the computations of each of the dot products $\alpha_i^T\beta_j$ (for i=1 . . . m, j=1 . . . q) has been fully computed. In some cases, there may be more rows in matrix A than rows in buffer 104a. In such cases, it should be understood that the above-described process can be repeated for "horizontal stripes" of matrix A, in which the height of a horizontal stripe is configured to fit within the height of buffer 104a. Likewise, in some cases, there may be more columns in matrix B than columns in buffer 104b. In such cases, it should be understood that the above-described process can be repeated for "vertical stripes" of matrix B, in which the width of a vertical stripe is configured to fit within the width of buffer 104b.

After the computation has completed, the output matrix C may be stored in a distributed manner across the registers of the processing elements from processing element array 108 (including registers 111a-111d).

As should be apparent, while the example of FIGS. 4A-4I illustrated the operation of processing elements 110a, 110b, 110c and 110d, it should be understood that a similar description for matrix multiplication would also apply to, for example, processing elements 110b, 110e, 110d and 110g depicted in FIG. 7.

Figure 5:
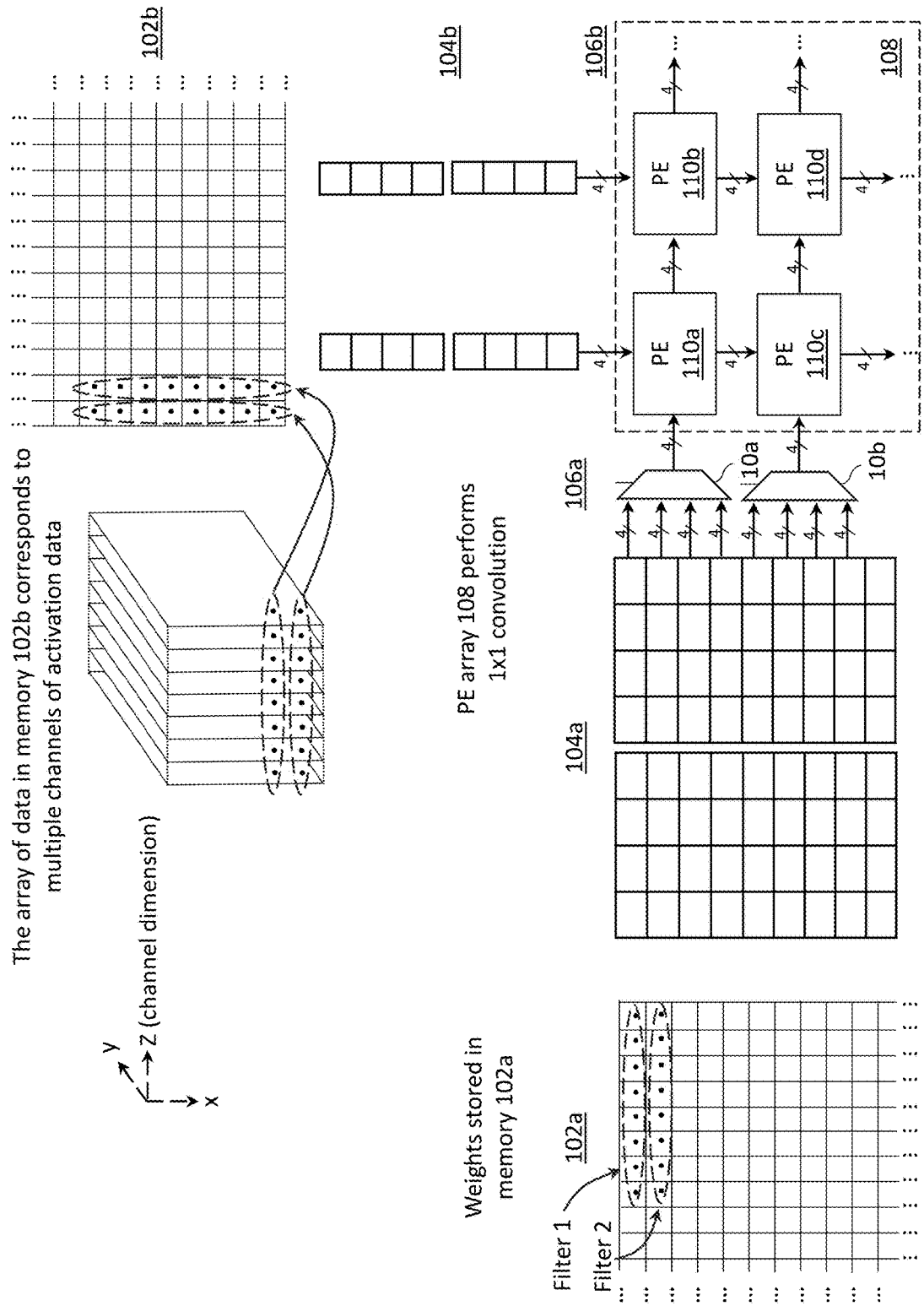
FIG. 5 depicts the logic schematic of FIG. 2A, when configured to perform 1×1 convolution, in accordance with one embodiment of the invention.

FIG. 5 depicts the logic schematic of FIG. 2A, when configured to perform 1×1 convolution. By way of background, 1×1 convolution refers to an operation that reduces the dimensionality of data (assuming that the 1×1 convolution only consists of a single filter). As a simple example for clarity, suppose the activation data included a 100×100 array of red saturation values, a 100×100 array of green saturation values and a 100×100 array of blue saturation values. The red, green and blue array of values may each be referred to a "channel." A 1×1 convolution operation could be to compute the brightness level at each of the 100×100 pixels, in which case a pointwise sum of the red, green and blue saturation values could be computed. In this case, the filter for the 1×1 convolution would be [1 1 1]. As a result of the 1×1 convolution operation, the dimensionality of the data reduces from three dimension to two dimensions. Stated differently, the dimensions of the input tensor is 100×100×3, whereas the dimension of the output tensor (i.e., brightness levels) is 100×100×1.

More generally, 1×1 convolution can be performed with a number of filters, in which case there may not be any change in the number of dimensions of the input tensor. For instance, if the dimensions of the input tensor were 100×100×3 and 1×1 convolution with N filters were desired, the dimensions of the output tensor would be 100×100×N (in which each of the N channels of the output tensor would correspond to one of the N filters).

There is not much difference in the hardware architecture between 1×1 convolution and matrix multiplication. In particular, one will notice that there is no change to control logic 106b. The difference between the two modes comes down to the data that is populated in memory 102a and 102b. In the case of 1×1 convolution, filter weighs are populated in memory 102a, with each row of memory 102a storing the weights corresponding to a filter, and activation data is populated in memory 102b, with each column of memory 102b storing activation data across multiple channels. In the example of FIG. 5, there are eight channels of activation data, so each filter in memory 102a includes eight weights and each column in memory 102b includes eight activation values.

FIGS. 6A-6I depict a sequence of timesteps to explain the computation of 1×1 convolution using the system of FIG. 1 (or more specifically, the logic schematic of FIG. 5). By comparing FIGS. 6A-6I with the earlier discussed FIGS. 4A-4I, one will notice that the figures are nearly identical to one another, except for the change in the types of values that are read from the respective memories 102a and 104a. For concreteness, it is noted that the filters are represented as follows:

Filter 1=[$w_{33}$ $w_{34}$ $w_{35}$ $w_{36}$ $w_1$ $w_2$ $w_3$ $w_4$]

Filter 2=[$w_{37}$ $w_{38}$ $w_{39}$ $w_{40}$ $w_5$ $w_6$ $w_7$ $w_8$]

Filter 3=[$w_{41}$ $w_{42}$ $w_{43}$ $w_{44}$ $w_9$ $w_{10}$ $w_{11}$ $w_{12}$]

and so on . . . .

Examples of columns of activation data across the channel dimension include $$\begin{bmatrix} a_9 \\ a_{10} \\ a_{11} \\ a_{12} \\ a_1 \\ a_2 \\ a_3 \\ a_4 \end{bmatrix}$$

$$\begin{bmatrix} a_{13} \\ a_{14} \\ a_{15} \\ a_{16} \\ a_5 \\ a_6 \\ a_7 \\ a_8 \end{bmatrix}$$

Figure 6A:
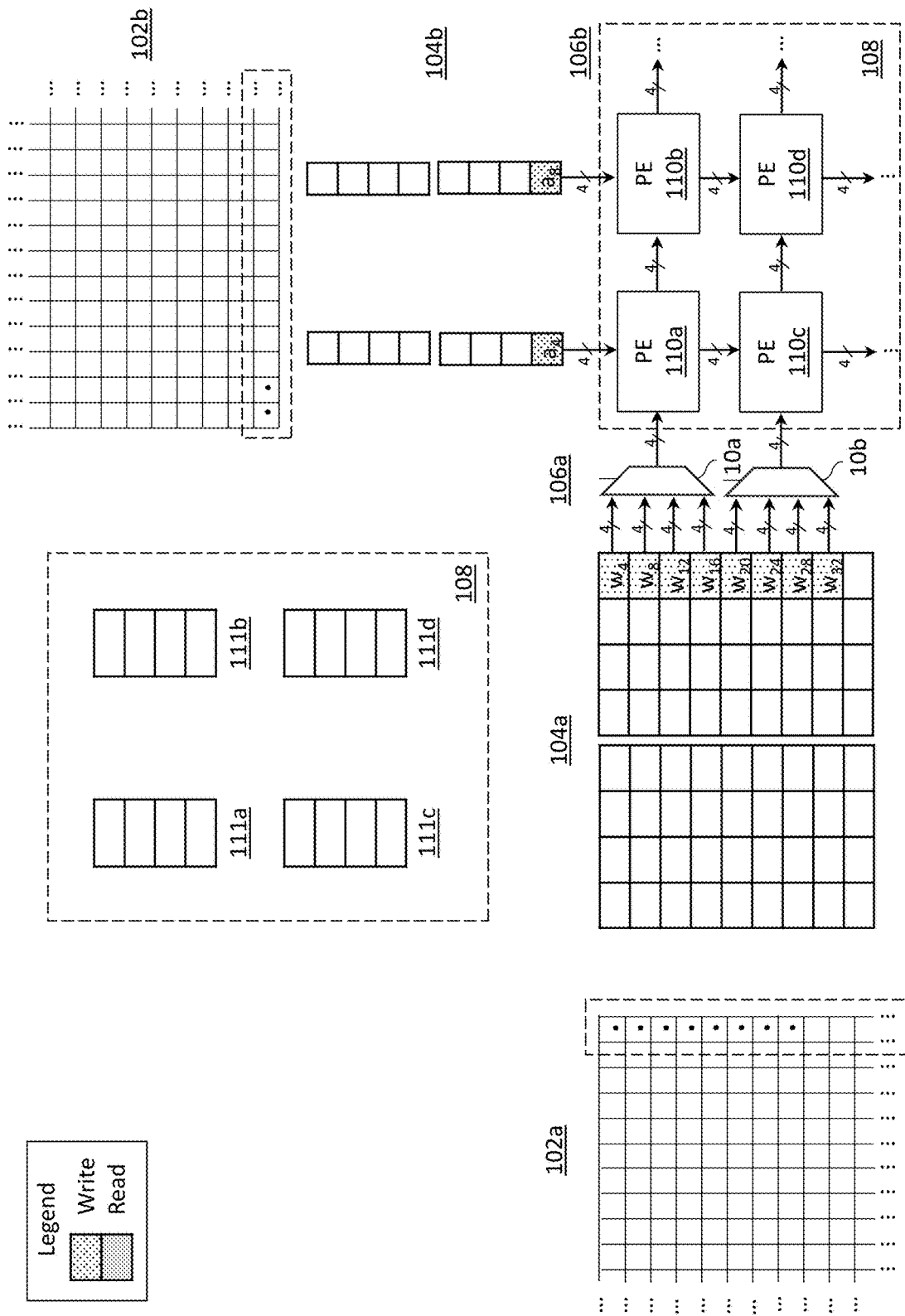
Figure 6B:
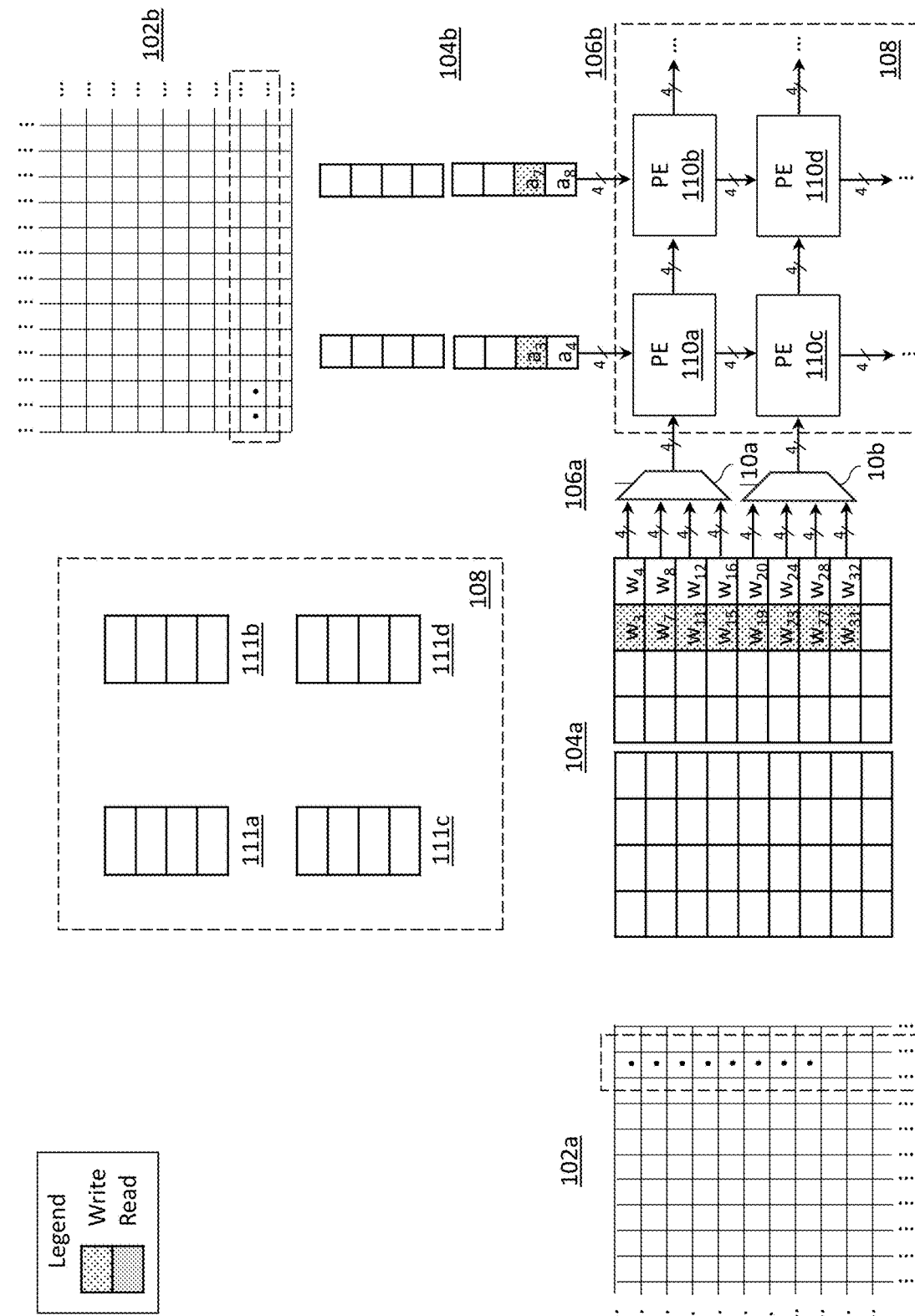
Figure 6C:
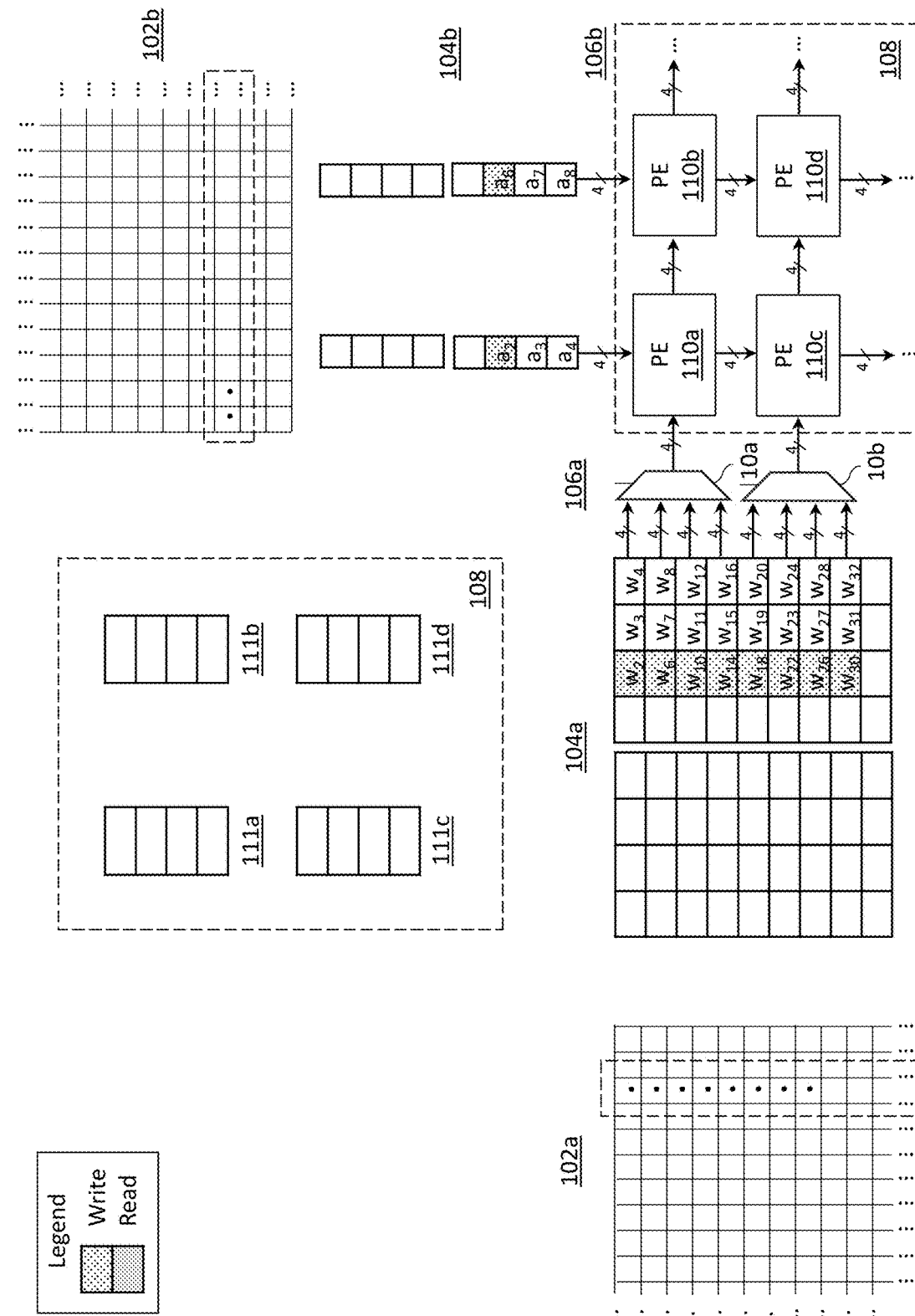
Figure 6D:
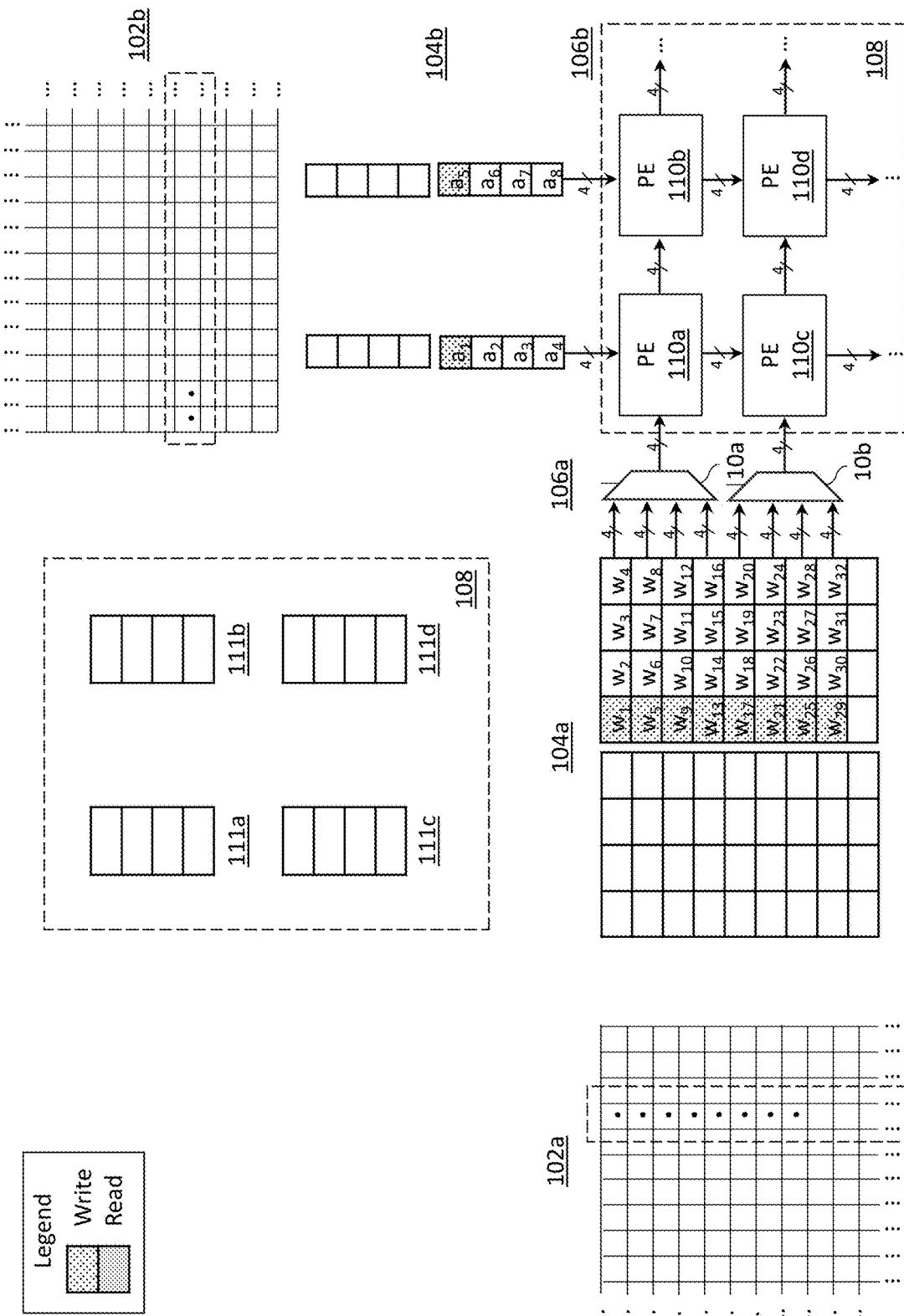
Figure 6E:
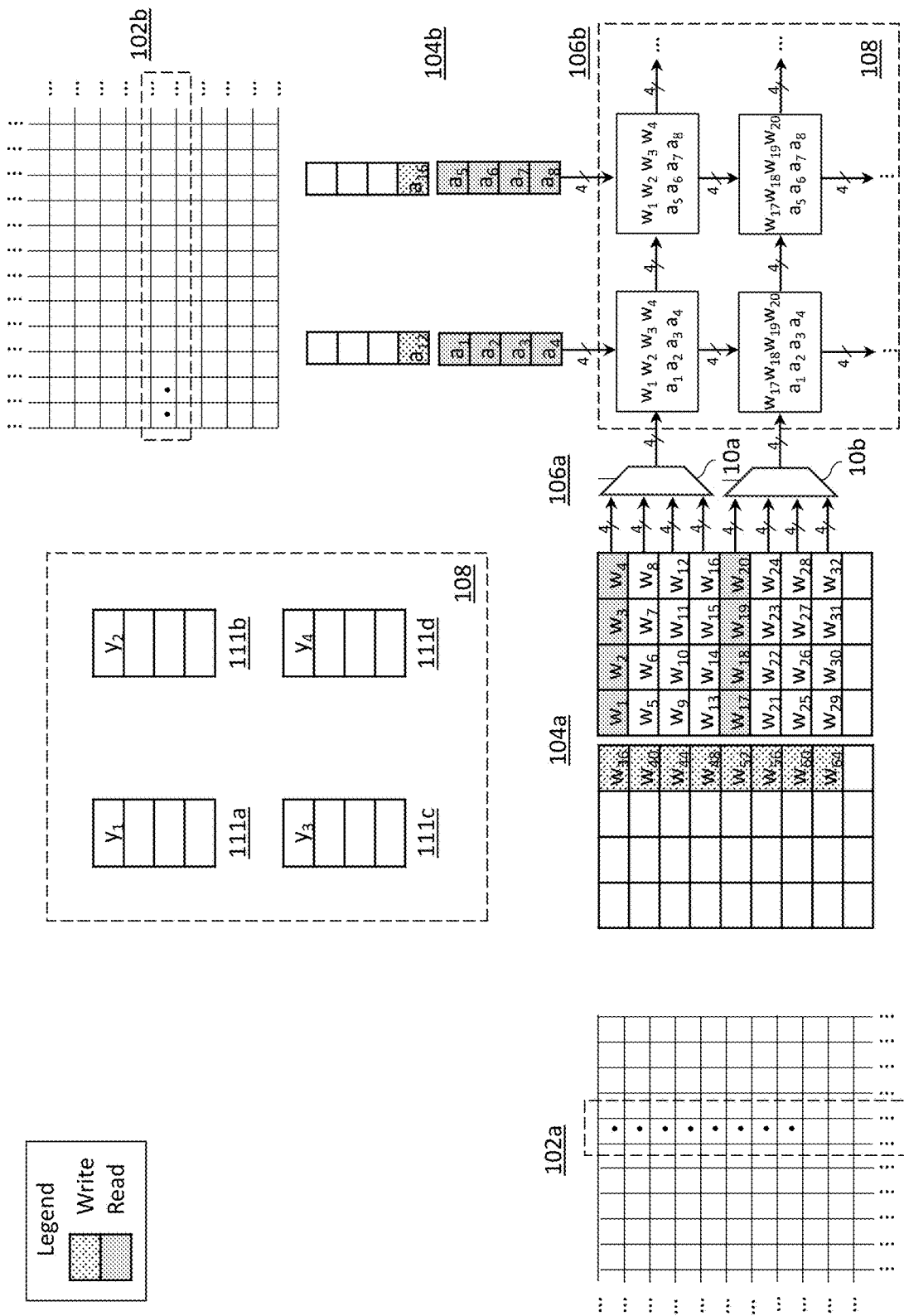
Figure 6F:
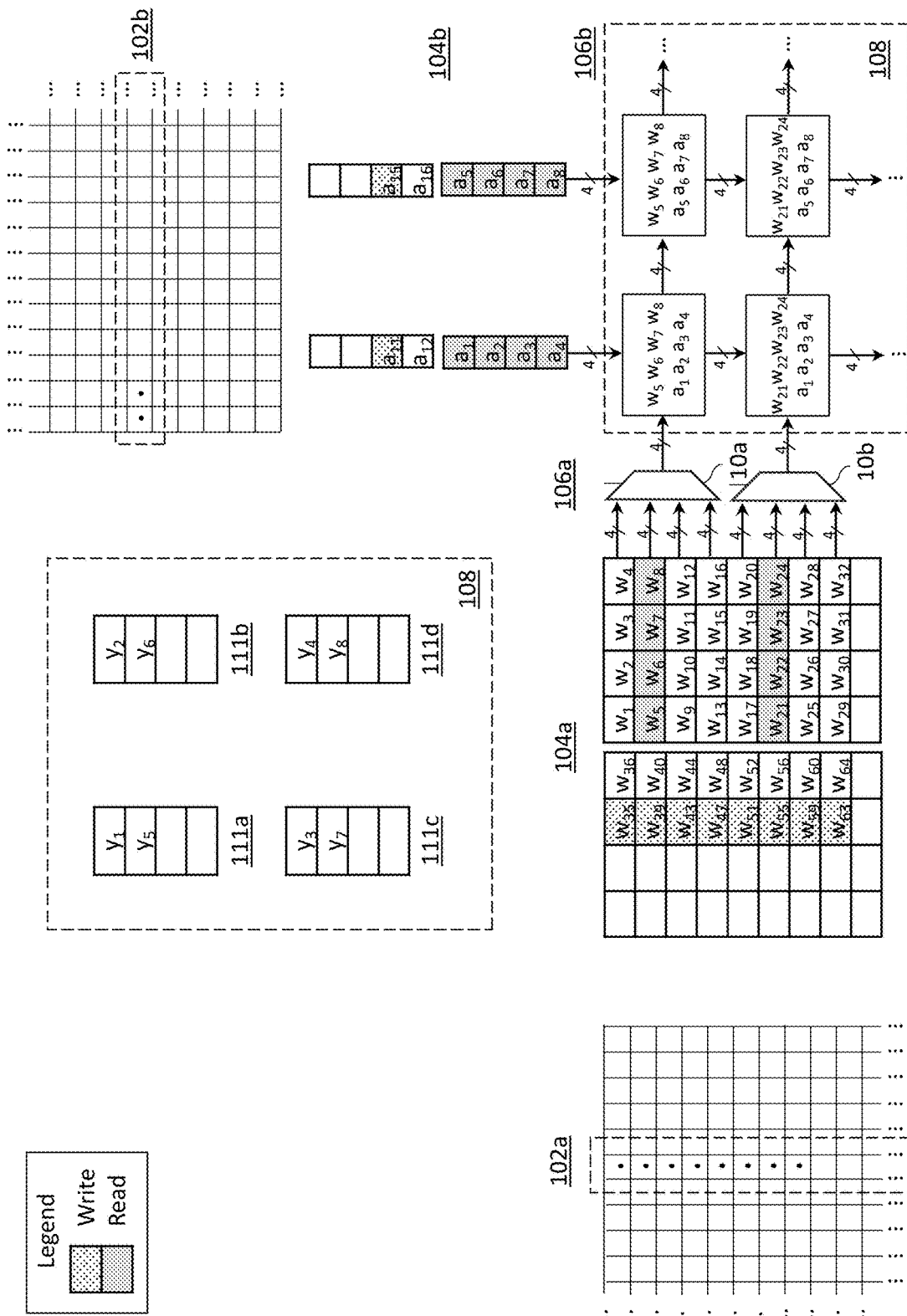
Figure 6G:
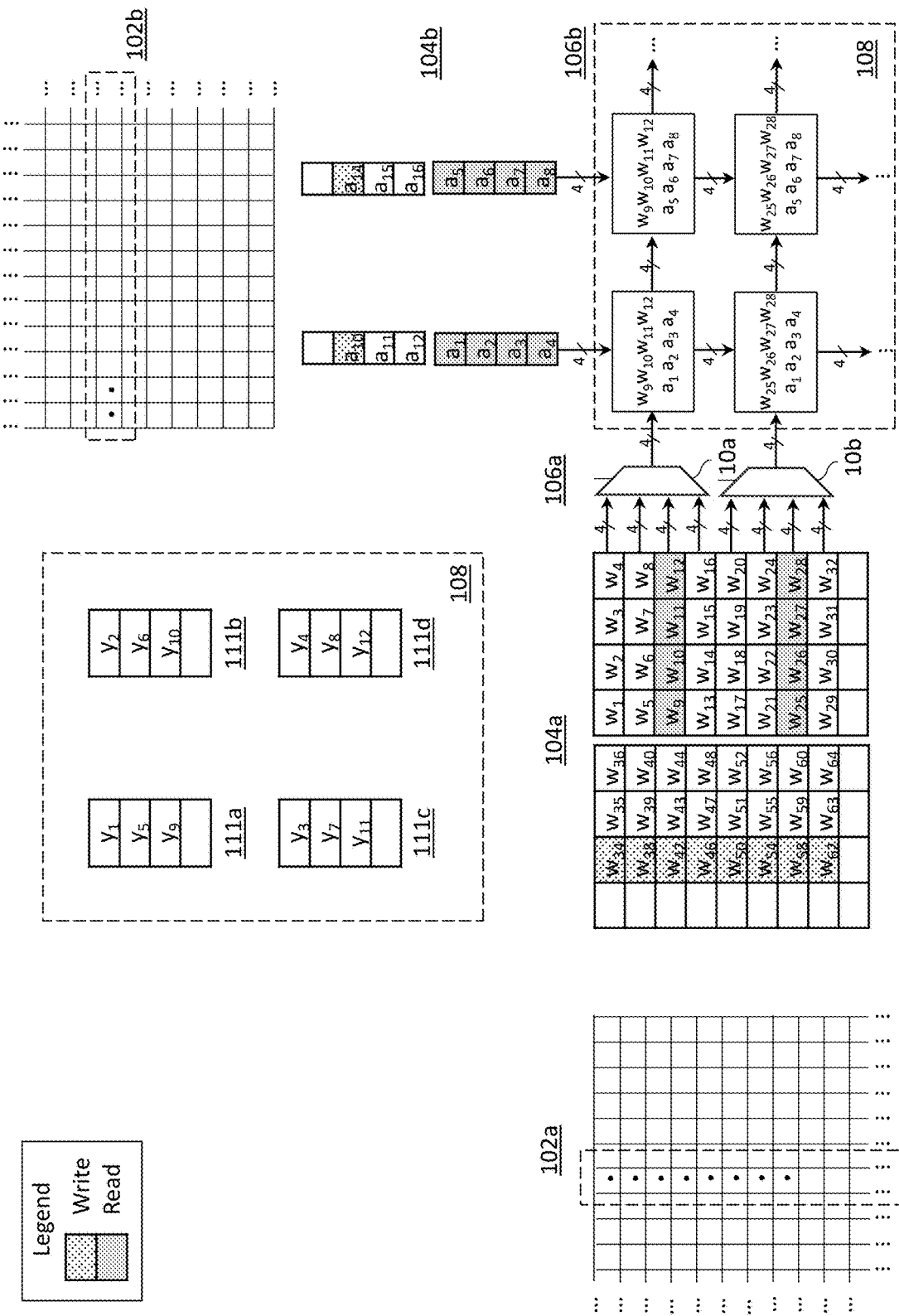
Figure 6H:
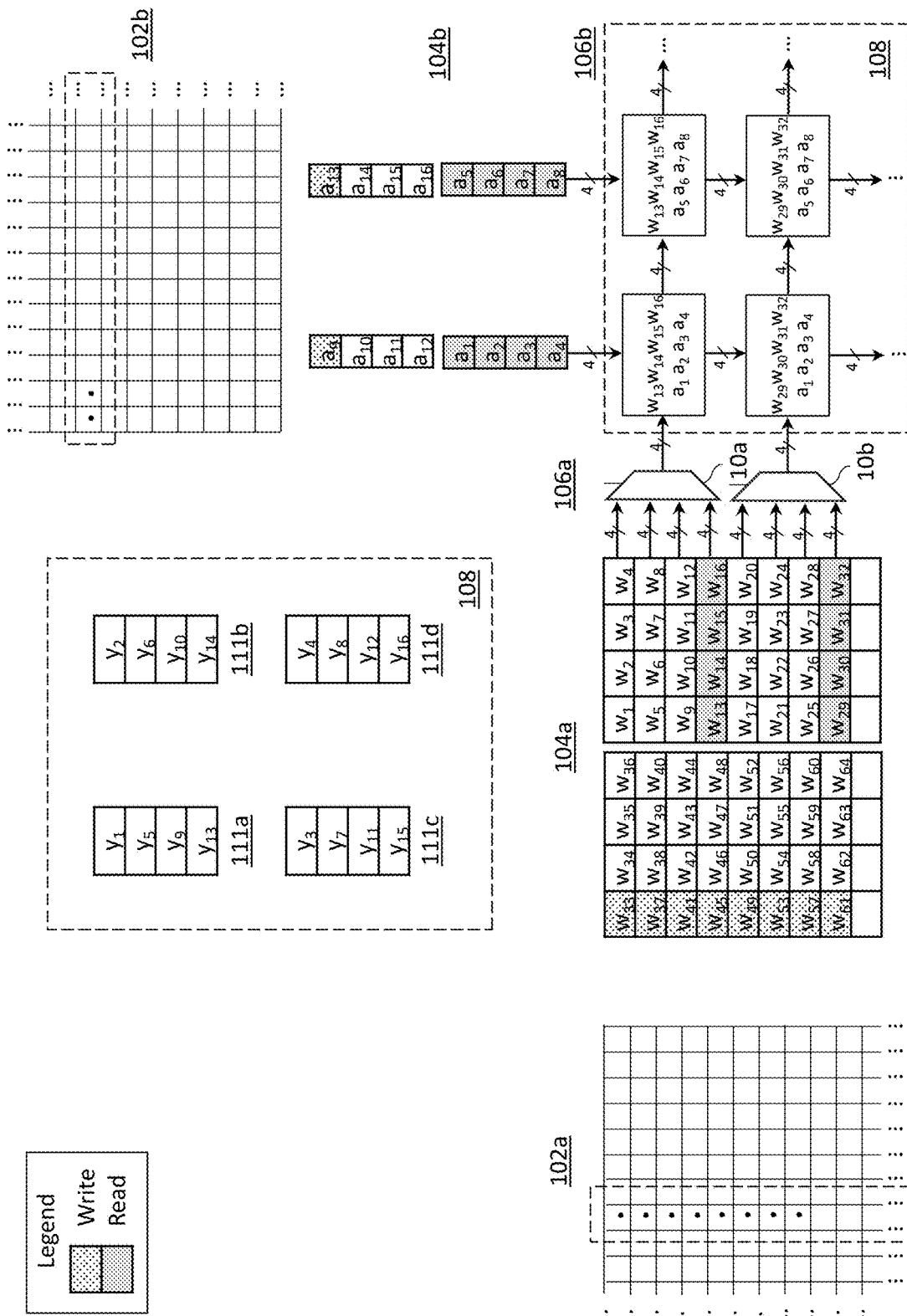
Figure 61:
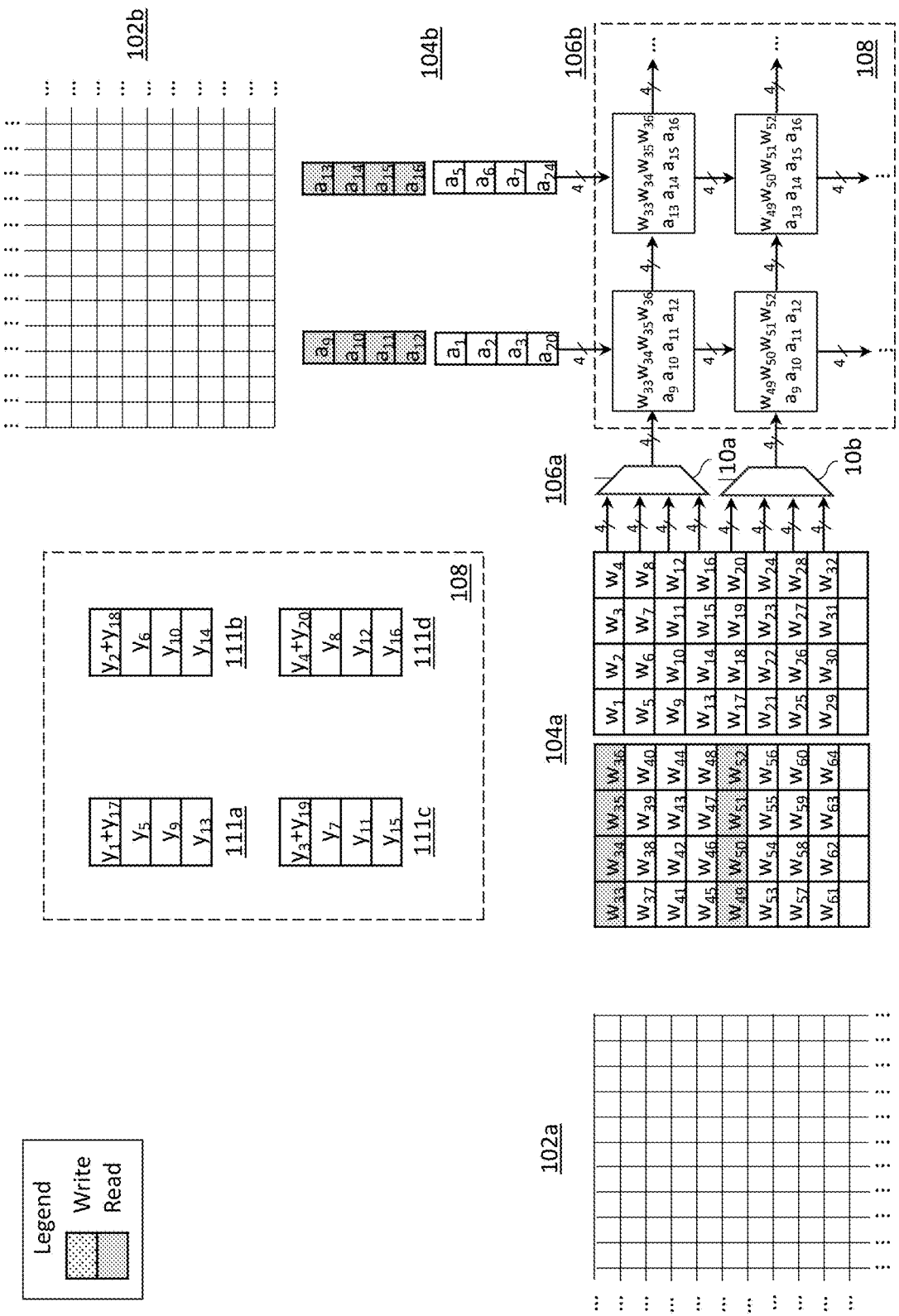

Another minor difference between the examples is that the 1×1 convolution example assumes that each of the filters have eight weights, so in FIG. 6I, there is no further writing to the buffers 104a, 104b, as opposed to FIG. 4I, in which the matrix multiplication example assumed that n>8 for both the A and B matrices (refer to FIG. 10 for the context of "n"), so further writing to the buffers 104a, 104b takes place. For the sake of conciseness, a detailed discussion of FIGS. 6A-6I will be omitted as 1×1 convolution and matrix multiplication are carried out in a very similar manner. As should be apparent, while the example of FIGS. 6A-6I illustrated the operation of processing elements 110a, 110b, 110c and 110d, it should be understood that a similar description for 1×1 convolution would also apply to, for example, processing elements 110b, 110e, 110d and 110g depicted in FIG. 7.

Figure 7A:
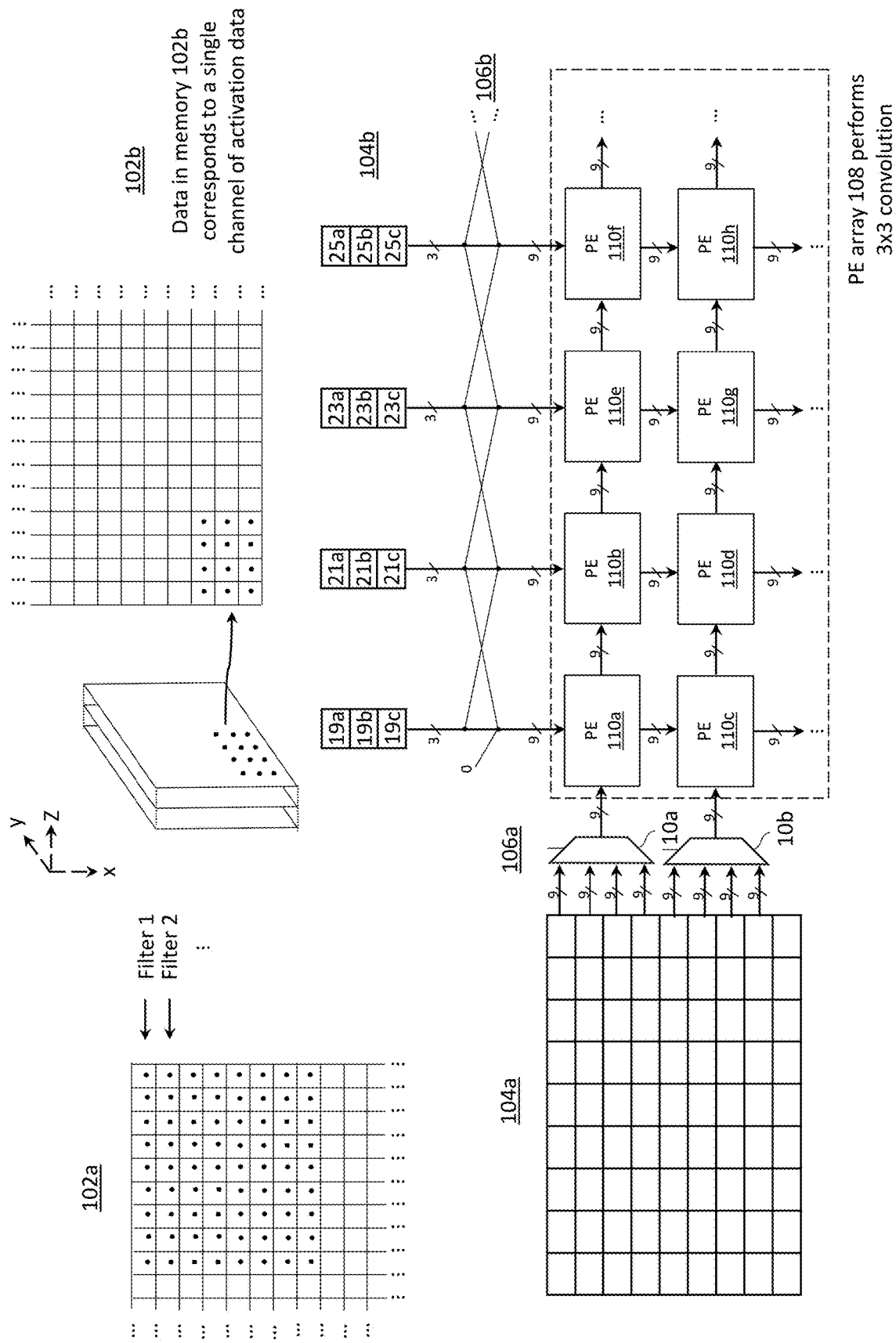
FIG. 7A depicts the logic schematic of FIG. 2A, when configured to perform 3×3 convolution, in accordance with one embodiment of the invention.

FIG. 7A depicts the logic schematic of FIG. 2A, when configured to perform 3×3 convolution. In 3×3 convolution, filter weights may be stored in memory 102a, and activation data may be stored in memory 102b. More specifically, each row of memory 102a may store one filter, each with nine weights, and memory 102b may store activation data from a single channel. The read and write paths of buffer 104b, when configured to perform 3×3 convolution, are depicted in greater detail in the logic schematic of FIG. 7B, in which the buffer 104b is configured as a two-dimensional (2D) shift register. In the write path to buffer 104b, only the "top row" of storage elements (e.g., 19a, 21a, 23a and 25a) are configured to receive values from memory 102b, whereas the remaining rows of storage elements are configured to receive values from the immediately preceding row of storage elements. In the read path of buffer 104b, each column of storage elements (e.g., column formed by storage elements 19a-19c, column formed by storage elements 21a-21c, column formed by storage elements 23a-23c, column formed by storage elements 25a-25c) may be read every clock cycle.

Figure 7B:
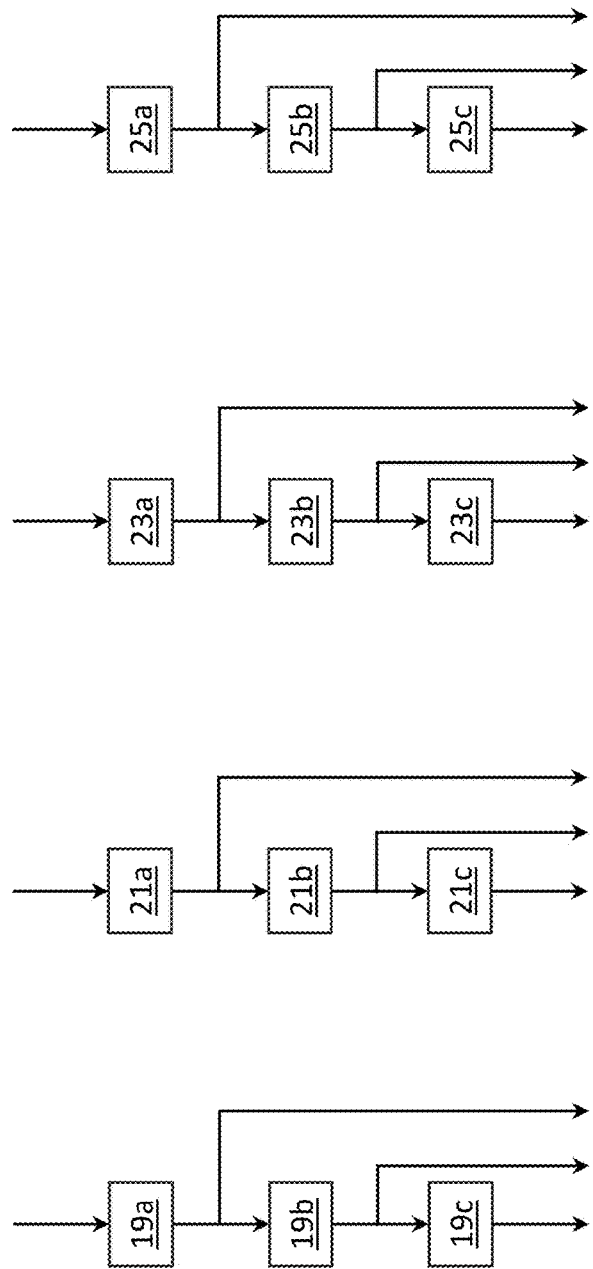
FIG. 7B depicts a buffer configured as a two-dimensional (2D) shift register, in accordance with one embodiment of the invention.
Figure 9B:
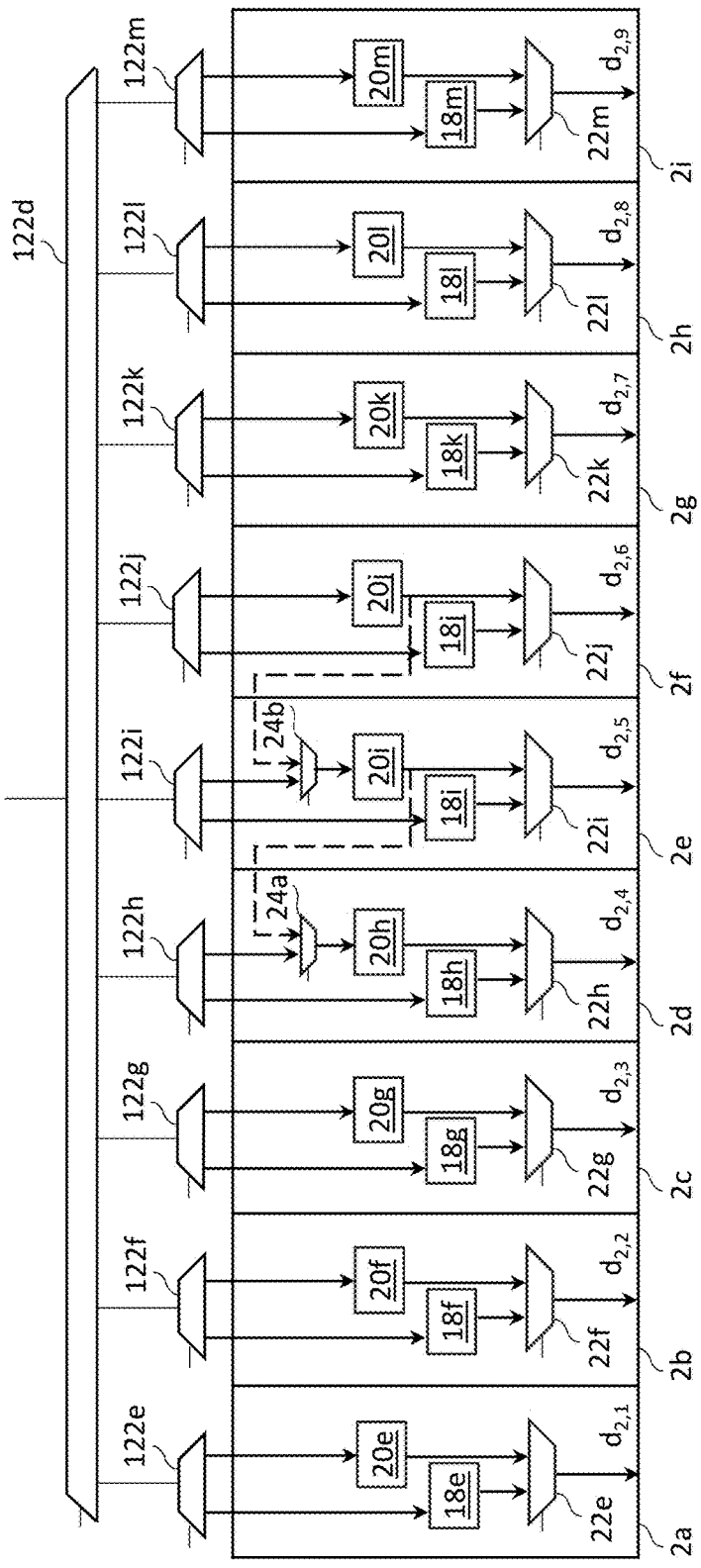

At this point, the reader may notice a possible discrepancy as buffer 104b was configured as a double buffer in the case of matrix multiplication and 1×1 convolution, whereas it is configured as a 2D shift register in the case of 3×3 convolution. There is, however, no discrepancy. The representation of buffer 104b as a double buffer in FIG. 2A was merely a simplified view, just as the representation of buffer 104b as a 2D shift register in FIG. 7B is also a simplified view. In FIG. 9B, a generalized logic schematic for buffer 104b is provided which can be configured as either a double buffer or as a 2D shift register. Of course, in an system implemented with only a single configuration (e.g., matrix multiplication mode only or 3×3 convolution mode only), the views of FIG. 2A and FIG. 9B may be the actual representations, and not simplified views.

In a similar vein, control logic 106b for the case of 3×3 convolution may be configured differently than in the case of 1×1 convolution or matrix multiplication. As will be better understood from the example in FIGS. 8A-8G, control logic 106b is configured, for each column data path, to pass (i) three activation values from the corresponding column of buffer 104b, (ii) three activation values from the left neighboring column of buffer 104b, and (iii) three activation values from the right neighboring column of buffer 104b. In FIG. 9A, a generalized logic schematic for the control logic 106b is provided which can be configured to carry out 3×3 convolution, matrix multiplication or 1×1 convolution.

Finally, it is noted that the column and row data paths each pass groups of nine signals, as opposed to the (simplified) examples for 1×1 convolution and matrix multiplication in which each data path passed four signals. One should understand that this difference does not reflect a difference in the hardware architecture. Rather, the previous 1×1 convolution and matrix multiplication were simplified in that there were actually a greater number of wires in each row or column data path, but only the "active" ones of the wires were depicted and the ones of the wires set to zero were omitted. It should be understood that in practice, the number of signals (or wires) for each row or column data path will be the maximum number needed across the three modes (i.e., matrix multiplication, 1×1 convolution, and 3×3 convolution), and a smaller number of those wires could be utilized in a specific mode of operation (leaving unused ones of the wires). In one embodiment, the maximum number of signals could be chosen to match that of 3×3 convolution (which would be nine per column data path, and nine per row data path), and the other modes (i.e., matrix multiplication and 1×1 convolution) could use up to this maximum number of signals. For completeness, it is noted that all the previously described features with 4 elements could be scaled up to 9 elements, which could include the width of buffer 104a, the number of rows in a row-group, the number inputs to multiplexors 10a and 10b, the height of buffer 104b, etc.

Figure 8A:
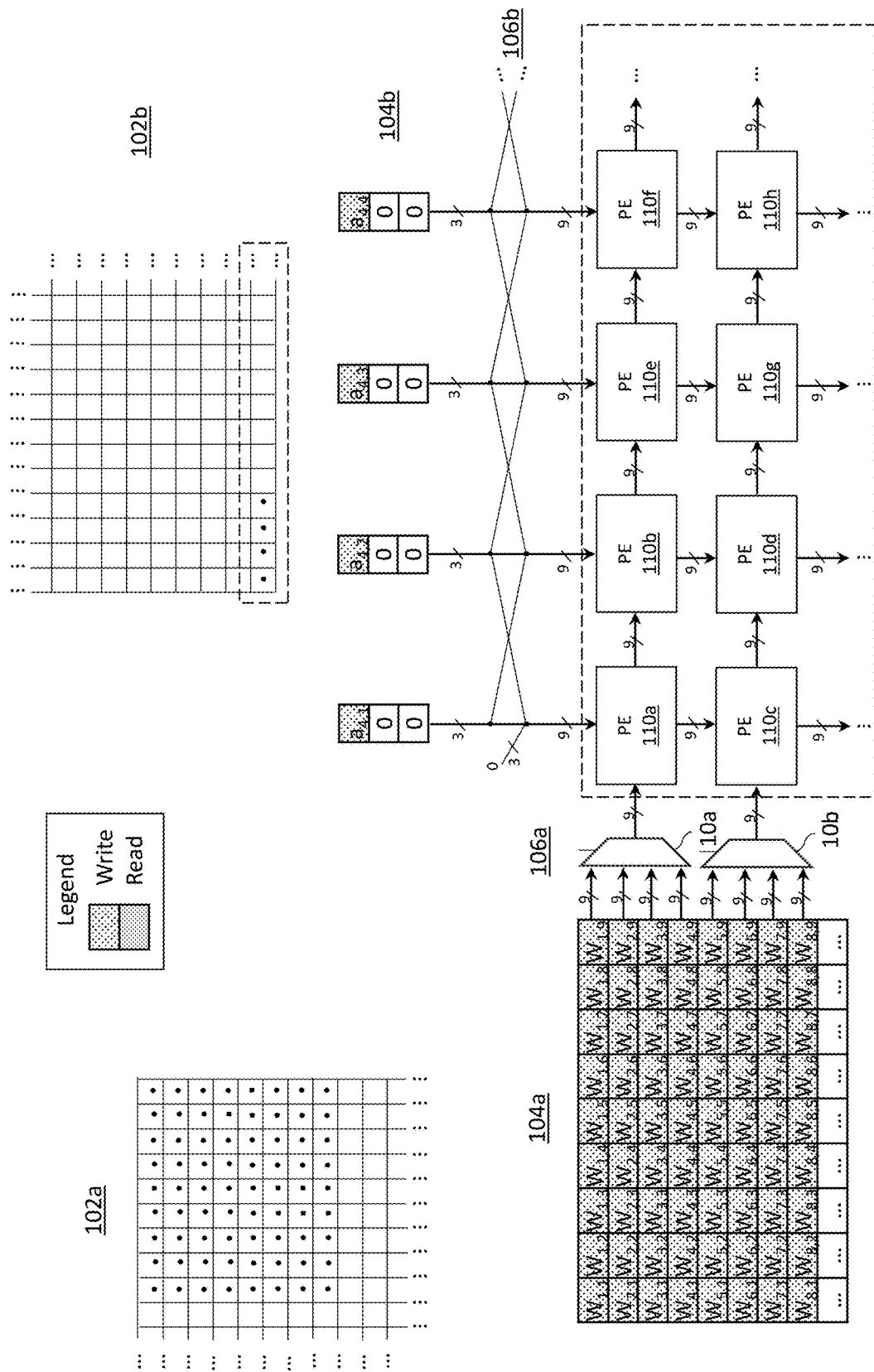
FIG. 8A depicts a first timestep to explain the computation of 3×3 convolution using the system of FIG. 1 (or more specifically, the logic schematic of FIG. 7), in accordance with one embodiment of the invention.

FIG. 8A depicts a first timestep to explain the computation of 3×3 convolution using the system of FIG. 1 (or more specifically, the logic schematic of FIG. 7A). Weights may be loaded from memory 102a into buffer 104a, in which each row of the buffer 104a may correspond to a filter (also called a kernel). In the example of FIG. 8A, all nine weights of each filter are stored into buffer 104a in the first timestep. In another embodiment (not depicted), it is also possible for buffer 104a to be operated as a double buffer, in which case the weights may be written to buffer 104a one column every clock cycle, in a similar manner as was described above for matrix multiplication and 1×1 convolution.

Multiplexors 10a, 10b may broadcast one fixed filter (across each row of processing elements) while the activation data propagates through the processing element array 108 (in a "downwards" direction). After the activation data has propagated through the processing element array 108, multiplexors 10a, 10b may select the next filter in the "row-group" of buffer 104a. In the case where the activation data includes multiple channels, each filter within a "row-group" may correspond to a channel of the activation data.

Also in the timestep of FIG. 8A, the last row of activation data from memory 102b may be written into the "top row" of buffer 104b. For reasons of zero padding, zeros may be populated in the remaining rows of buffer 104b (e.g., through initialization of the buffer 104b to all zeros, or other means), and furthermore, control logic 106b may set the left three values for the left-most column data path to zero and the right three values for the right-most column data path to zero (not depicted). Concepts regarding zero padding are well known in the art, so will not be explained in further detail for the sake of conciseness.

Figure 8B:
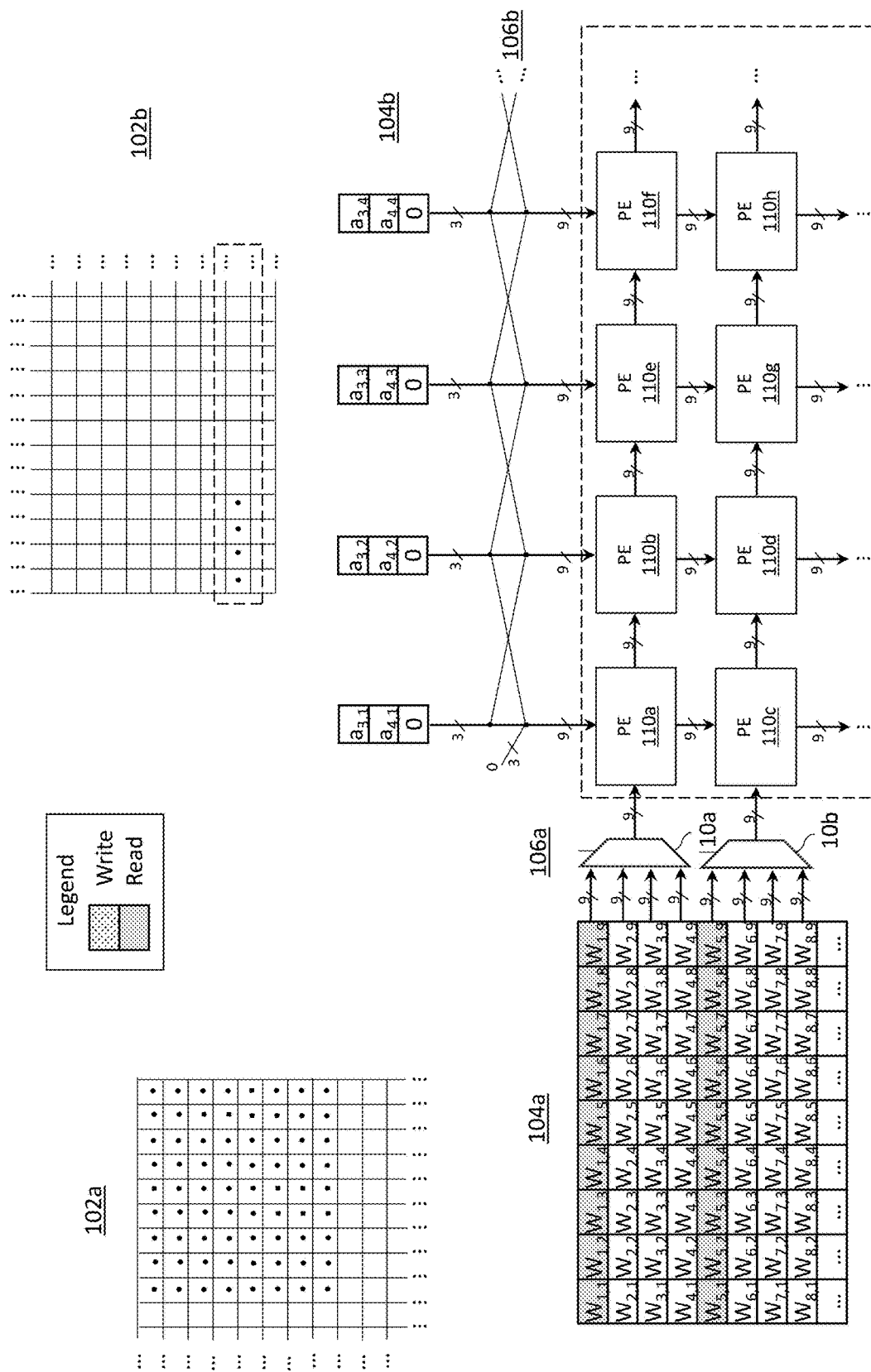
FIGS. 8B-8C depict a second timestep to explain the computation of 3×3 convolution using the system of FIG. 1 (or more specifically, the logic schematic of FIG. 7), in accordance with one embodiment of the invention.
Figure 8C:
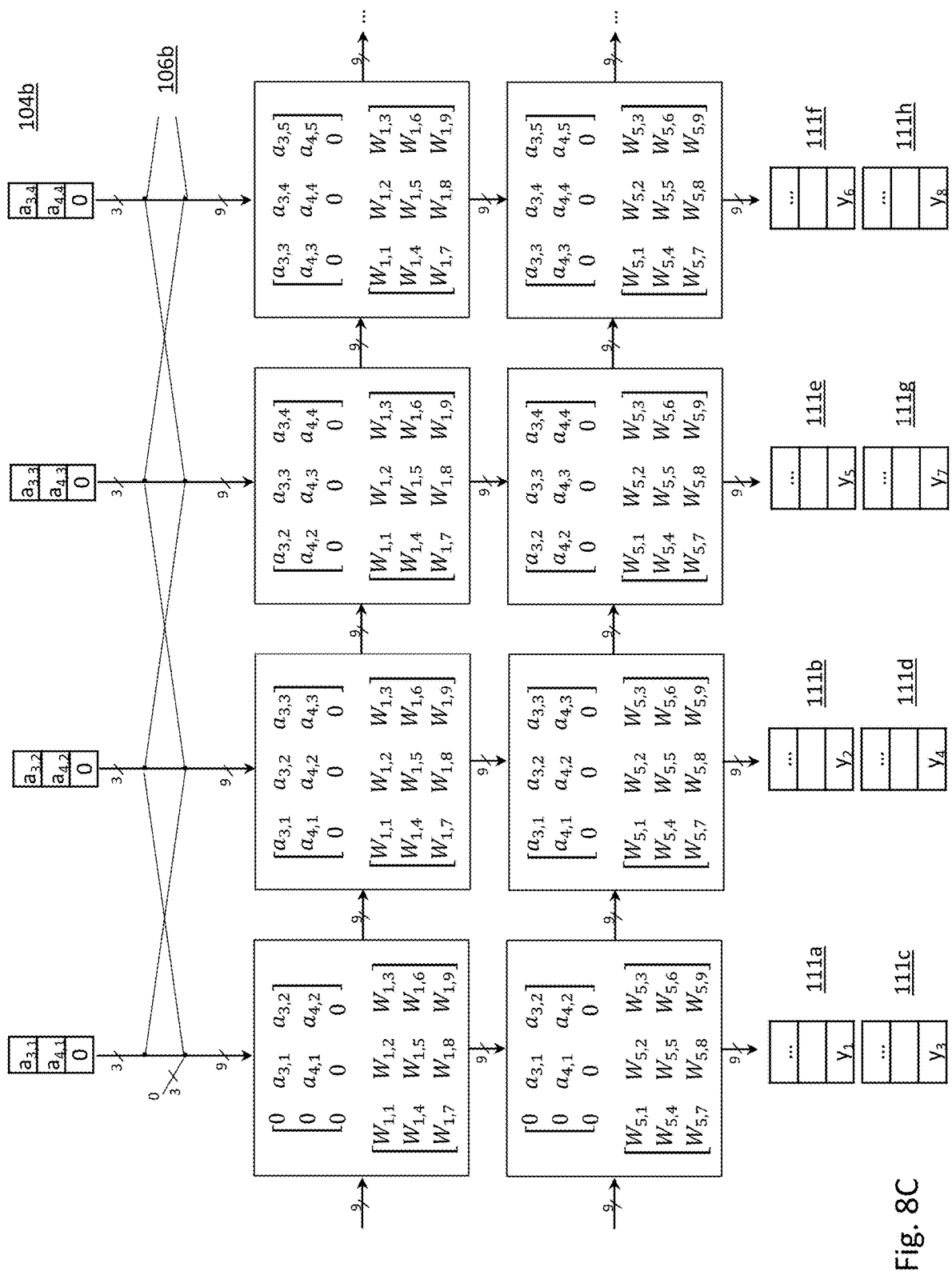

FIGS. 8B-8C depict a second timestep (immediately following the first timestep) to explain the computation of 3×3 convolution using the system of FIG. 1 (or more specifically, the logic schematic of FIG. 7A). As depicted in FIG. 8B, in the very beginning of the second time step (or during the transition between the first time step and the second time step), the rows of values stored within buffer 104b may shift downwards (as in the typical operation of a 2D shift register), and the next row of activation data from memory 102b may be written to the top row of the buffer 104b Immediately after buffer 104b is populated with the values as shown in FIG. 8B, the values may be read and transmitted to the respective processing elements 110a-110h in accordance with control logic 106b.

FIG. 8C depicts the same clock cycle as in FIG. 8B, but due to space constraints in the FIG. 8B, a separate sheet of drawings was used to show the computation that takes place within processing elements 111a-111h. As shown in FIG. 8C:

the values $$\begin{bmatrix} 0 & a_{3,1} & a_{3,2} \\ 0 & a_{4,1} & a_{4,2} \\ 0 & 0 & 0 \end{bmatrix}$$

are received by processing elements 110a and 110c;

the values $$\begin{bmatrix} a_{3,1} & a_{3,2} & a_{3,3} \\ a_{4,1} & a_{4,2} & a_{4,3} \\ 0 & 0 & 0 \end{bmatrix}$$

are received by processing elements 110b and 110d;

the values $$\begin{bmatrix} a_{3,2} & a_{3,3} & a_{3,4} \\ a_{4,2} & a_{4,3} & a_{4,4} \\ 0 & 0 & 0 \end{bmatrix}$$

are received by processing elements 110e and 110g;

the values $$\begin{bmatrix} a_{3,3} & a_{3,4} & a_{3,5} \\ a_{4,3} & a_{4,4} & a_{4,5} \\ 0 & 0 & 0 \end{bmatrix}$$

are received by processing elements 110f and 110h;

the values $$\begin{bmatrix} W_{1,1} & W_{1,2} & W_{1,3} \\ W_{1,4} & W_{1,5} & W_{1,6} \\ W_{1,7} & W_{1,8} & W_{1,9} \end{bmatrix}$$

are received by processing elements 110*a*, 110*b*, 110*e* and 110*f*; and
the values $$\begin{bmatrix} W_{5,1} & W_{5,2} & W_{5,3} \\ W_{5,4} & W_{5,5} & W_{5,6} \\ W_{5,7} & W_{5,8} & W_{5,9} \end{bmatrix}$$

are received by processing elements 110*c*, 110*d*, 110*g* and 110*h*.

It is noted that groups of nine values are each visually represented as a 3×3 matrix in the example of FIG. 8C, but this is for clarity purposes only. The use of a 3×3 matrix is optional, and the nine values could be organized, for instance, as a vector of nine values. For instance the 3×3 matrix $$\begin{bmatrix} 0 & a_{3,1} & a_{3,2} \\ 0 & a_{4,1} & a_{4,2} \\ 0 & 0 & 0 \end{bmatrix}$$

could be represented as [0 $a_{3,1}$ $a_{3,2}$ 0 $a_{4,1}$ $a_{4,2}$ 0 0 0] without any change in the informational content of the nine values.

Also in the same time step (or clock cycle) depicted in FIG. 8C, each of the processing elements 110*a*-110*h* further computes the dot product of the two groups of nine values and stores the computed dot products in storage elements of the respective registers 111*a*-111*h*. For instance:

processing element 110*a* computes $$y_1 = 0*W_{1,1} + a_{3,1}*W_{1,2} + a_{3,2}*W_{1,3} + 0*W_{1,4} + a_{4,1}*W_{1,5} + a_{4,2}*W_{1,6} + 0*W_{1,7} + 0*W_{1,8} + 0*W_{1,9}$$

and stores the dot product $y_1$ in a storage element of register 111*a*;

processing element 110*b* computes $$y_2 = a_{3,1}*W_{1,1} + a_{3,2}*W_{1,2} + a_{3,3}*W_{1,3} + a_{4,1}*W_{1,4} + a_{4,2}*W_{1,5} + a_{4,3}*W_{1,6} + 0*W_{1,7} + 0*W_{1,8} + 0*W_{1,9}$$

and stores the dot product $y_2$ in a storage element of register 111*b*;

processing element 110*c* computes $$y_3 = 0*W_{5,1} + a_{3,1}*W_{5,2} + a_{3,2}*W_{5,3} + 0*W_{5,4} + a_{4,1}*W_{5,5} + a_{4,2}*W_{5,6} + 0*W_{5,7} + 0*W_{5,8} + 0*W_{5,9}$$

and stores the dot product $y_3$ in a storage element of register 111*c*;

processing element 110*d* computes $$y_4 = a_{3,1}*W_{5,1} + a_{3,2}*W_{5,2} + a_{3,3}*W_{5,3} + a_{4,1}*W_{5,4} + a_{4,2}*W_{5,5} + a_{4,3}*W_{5,6} + 0*W_{5,7} + 0*W_{5,8} + 0*W_{5,9}$$

and stores the dot product $y_4$ in a storage element of register 111*d*;

processing element 110*e* computes $$y_5 = a_{3,2}*W_{1,1} + a_{3,3}*W_{1,2} + a_{3,4}*W_{1,3} + a_{4,2}*W_{1,4} + a_{4,3}*W_{1,5} + a_{4,4}*W_{1,6} + 0*W_{1,7} + 0*W_{1,8} + 0*W_{1,9}$$

and stores the dot product $y_5$ in a storage element of register 111*e*;

processing element 110*f* computes $$y_6 = a_{3,3}*W_{1,1} + a_{3,4}*W_{1,2} + a_{3,5}*W_{1,3} + a_{4,3}*W_{1,4} + a_{4,4}*W_{1,5} + a_{4,5}*W_{1,6} + 0*W_{1,7} + 0*W_{1,8} + 0*W_{1,9}$$

and stores the dot product $y_6$ in a storage element of register 111*f*;

processing element 110*g* computes $$y_7 = a_{3,2}*W_{5,1} + a_{3,3}*W_{5,2} + a_{3,4}*W_{5,3} + a_{4,2}*W_{5,4} + a_{4,3}*W_{5,5} + a_{4,4}*W_{5,6} + 0*W_{5,7} + 0*W_{5,8} + 0*W_{5,9}$$

and stores the dot product $y_7$ in a storage element of register 111*g*; and processing element 110*h* computes $$y_8 = a_{3,3}*W_{5,1} + a_{3,4}*W_{5,2} + a_{3,5}*W_{5,3} + a_{4,3}*W_{5,4} + a_{4,4}*W_{5,5} + a_{4,5}*W_{5,6} + 0*W_{5,7} + 0*W_{5,8} + 0*W_{5,9}$$

and stores the dot product $y_8$ in a storage element of register 111*h*. Lastly, it is noted that the shading shown in the legend in FIG. 8B has not been applied to buffer 104*b* (as it would be difficult to simultaneously depict the shading for both a read and a write occurring in a single clock cycle).

Figure 8D:
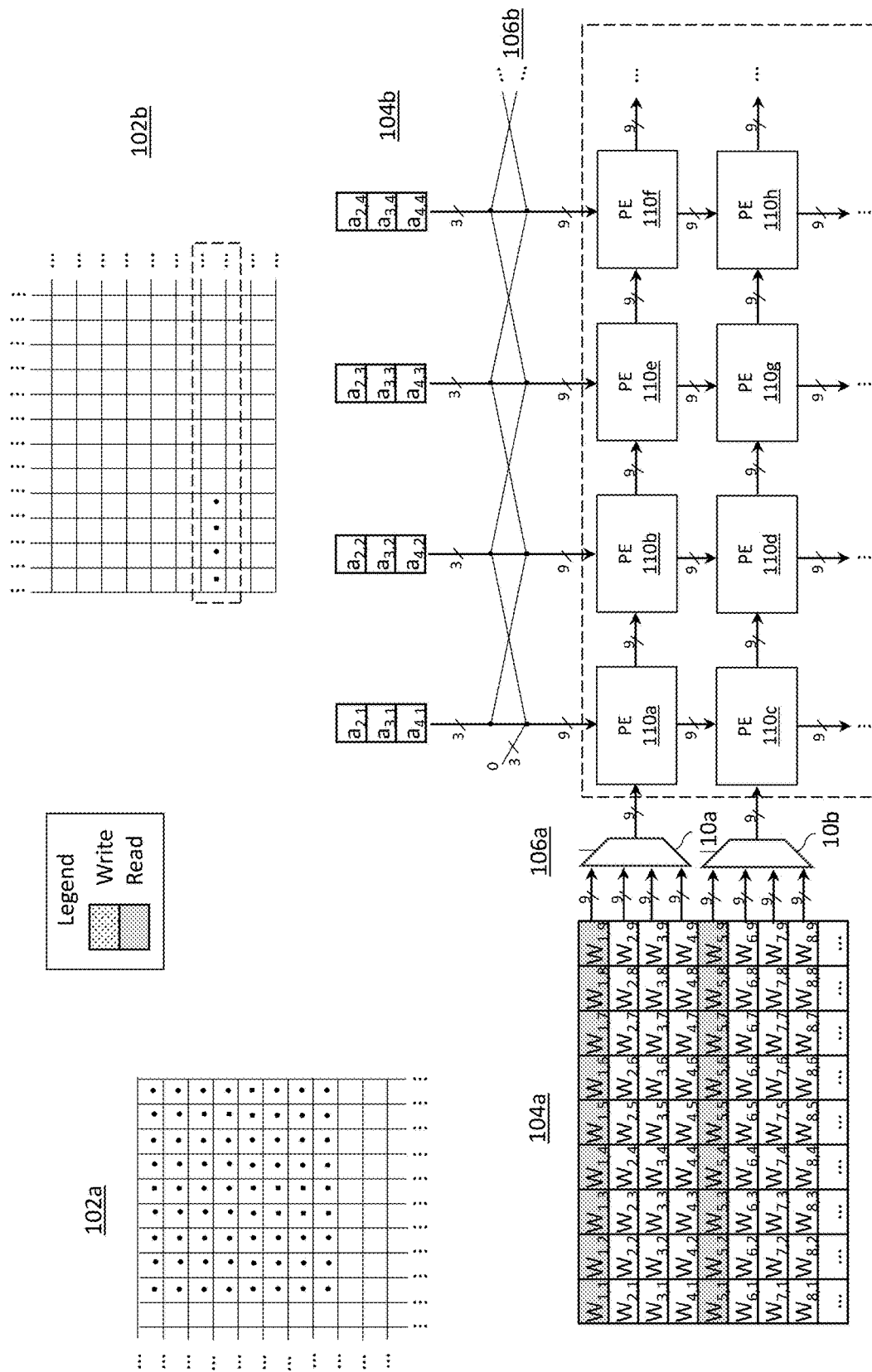
FIGS. 8D-8E depict a third timestep to explain the computation of 3×3 convolution using the system of FIG. 1 (or more specifically, the logic schematic of FIG. 7), in accordance with one embodiment of the invention.
Figure 8E:
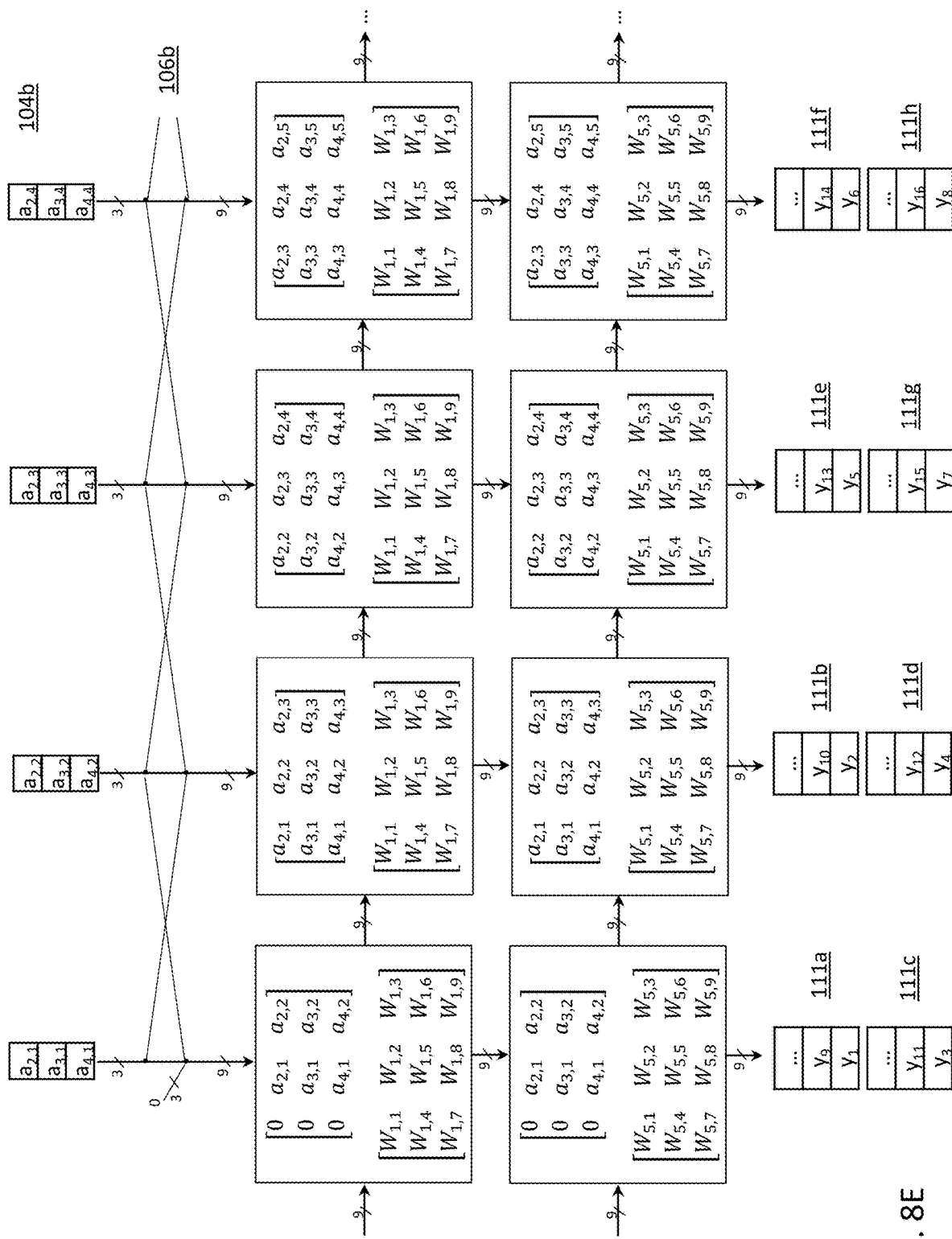

FIGS. 8D-8E depict a third timestep (immediately following the second timestep) to explain the computation of 3×3 convolution using the system of FIG. 1 (or more specifically, the logic schematic of FIG. 7A). As depicted in FIG. 8D, in the very beginning of the third time step (or during the transition between the second time step and the third time step), the rows of values stored within buffer 104*b* may shift downwards (as in the typical operation of a 2D shift register), and the next row of activation data from memory 102*b* may be written to the top row of the buffer 104*b* Immediately after buffer 104*b* is populated with the values as shown in FIG. 8D, the values may be read and transmitted to the respective processing elements 110*a*-110*h* in accordance with control logic 106*b*.

As shown in FIG. 8E:
the values $$\begin{bmatrix} 0 & a_{2,1} & a_{2,2} \\ 0 & a_{3,1} & a_{3,2} \\ 0 & a_{4,1} & a_{4,2} \end{bmatrix}$$

are received by processing elements 110*a* and 110*c*;
the values $$\begin{bmatrix} a_{2,1} & a_{2,2} & a_{2,3} \\ a_{3,1} & a_{3,2} & a_{3,3} \\ a_{4,1} & a_{4,2} & a_{4,3} \end{bmatrix}$$

are received by processing elements 110*b* and 110*d*;
the values $$\begin{bmatrix} a_{2,2} & a_{2,3} & a_{2,4} \\ a_{3,2} & a_{3,3} & a_{3,4} \\ a_{4,2} & a_{4,3} & a_{4,4} \end{bmatrix}$$

are received by processing elements 110*e* and 110*g*;
the values $$\begin{bmatrix} a_{2,3} & a_{2,4} & a_{2,5} \\ a_{3,3} & a_{3,4} & a_{3,5} \\ a_{4,3} & a_{4,4} & a_{4,5} \end{bmatrix}$$

are received by processing elements 110*f* and 110*h*;

the values $$\begin{bmatrix} W_{1,1} & W_{1,2} & W_{1,3} \\ W_{1,4} & W_{1,5} & W_{1,6} \\ W_{1,7} & W_{1,8} & W_{1,9} \end{bmatrix}$$

are received by processing elements 110a, 110b, 110e and 110f; and
the values $$\begin{bmatrix} W_{5,1} & W_{5,2} & W_{5,3} \\ W_{5,4} & W_{5,5} & W_{5,6} \\ W_{5,7} & W_{5,8} & W_{5,9} \end{bmatrix}$$

are received by processing elements 110c, 110d, 110g and 110h.

Also in the same time step (or clock cycle) depicted in FIG. 8E, each of the processing elements 110a-110h further computes the dot product of the two groups of nine values and stores the computed dot products in storage elements of the respective registers 111a-111h. The dot products computed by the processing elements should be self-explanatory and will not be detailed herein for the sake of conciseness. The dot products $y_9, \ldots, y_{16}$ are then stored in the storage elements of data registers 111a, . . . , 111h, respectively.

Figure 8F:
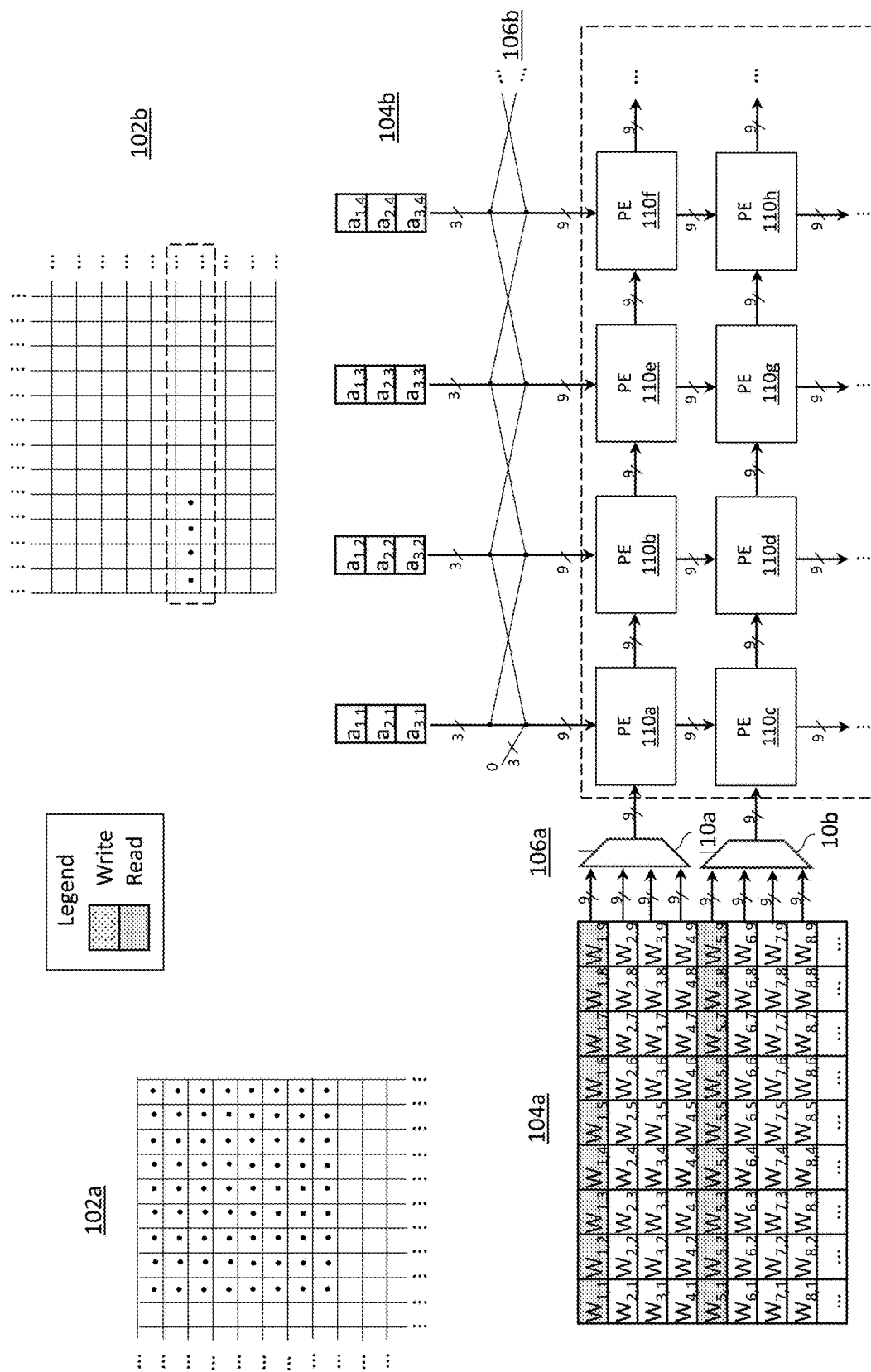
FIGS. 8F-8G depict a fourth timestep to explain the computation of 3×3 convolution using the system of FIG. 1 (or more specifically, the logic schematic of FIG. 7), in accordance with one embodiment of the invention.
Figure 8G:
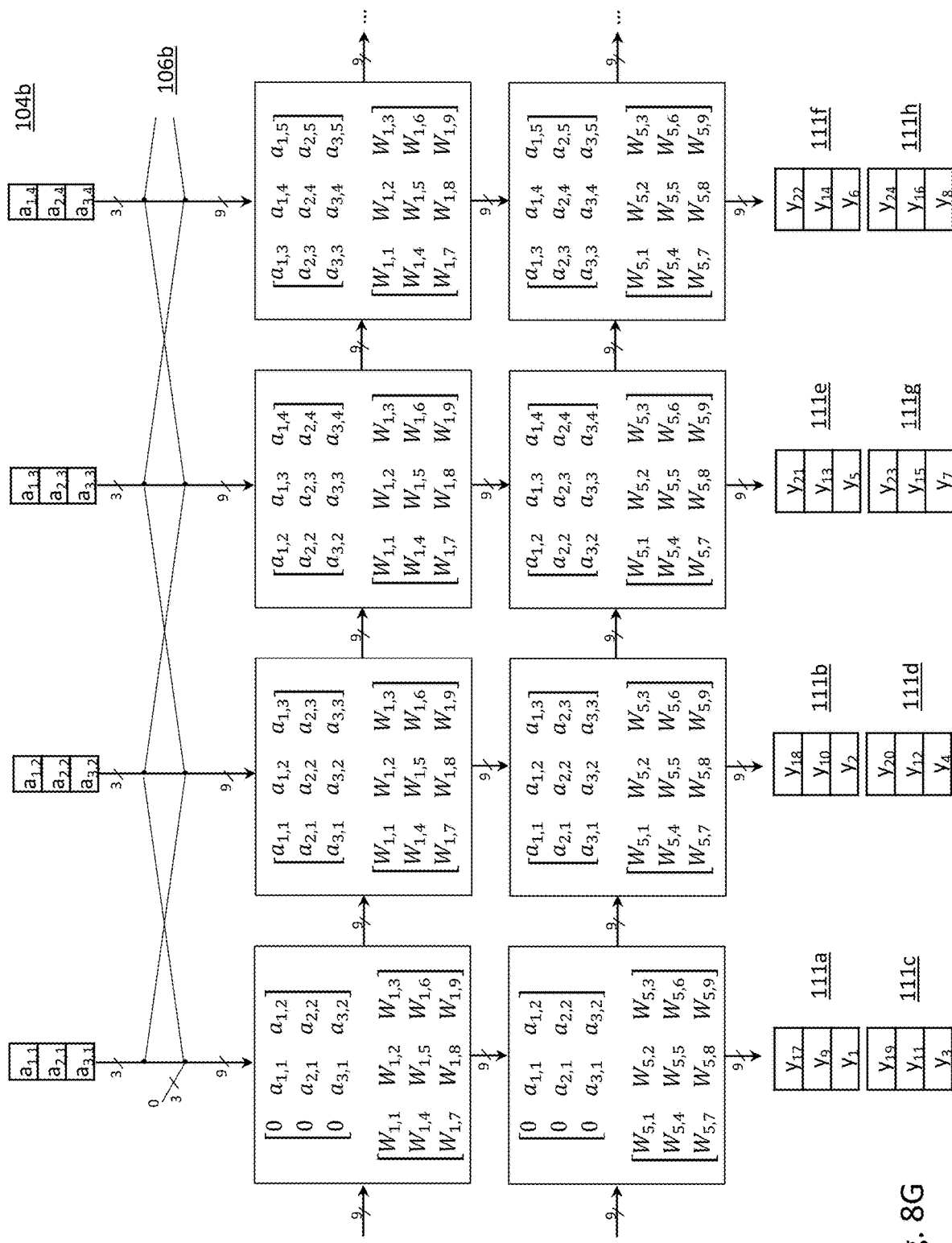

FIGS. 8F-8G depict a fourth timestep (immediately following the third timestep) to explain the computation of 3×3 convolution using the system of FIG. 1 (or more specifically, the logic schematic of FIG. 7A). As depicted in FIG. 8F, in the very beginning of the fourth time step (or during the transition between the third time step and the fourth time step), the rows of values stored within buffer 104b may shift downwards (as in the typical operation of a 2D shift register), and the next row of activation data from memory 102b may be written to the top row of the buffer 104b Immediately after buffer 104b is populated with the values as shown in FIG. 8F, the values may be read and transmitted to the respective processing elements 110a-110h in accordance with control logic 106b.

As shown in FIG. 8G:
the values $$\begin{bmatrix} 0 & a_{1,1} & a_{1,2} \\ 0 & a_{2,1} & a_{2,2} \\ 0 & a_{3,1} & a_{3,2} \end{bmatrix}$$

are received by processing elements 110a and 110c;
the values $$\begin{bmatrix} a_{1,1} & a_{1,2} & a_{1,3} \\ a_{2,1} & a_{2,2} & a_{2,3} \\ a_{3,1} & a_{3,2} & a_{3,3} \end{bmatrix}$$

are received by processing elements 110b and 110d;
the values $$\begin{bmatrix} a_{1,2} & a_{1,3} & a_{1,4} \\ a_{2,2} & a_{2,3} & a_{2,4} \\ a_{3,2} & a_{3,3} & a_{3,4} \end{bmatrix}$$

are received by processing elements 110e and 110g;
the values $$\begin{bmatrix} a_{1,3} & a_{1,4} & a_{1,5} \\ a_{2,3} & a_{2,4} & a_{2,5} \\ a_{3,3} & a_{3,4} & a_{3,5} \end{bmatrix}$$

are received by processing elements 110f and 110h;
the values $$\begin{bmatrix} W_{1,1} & W_{1,2} & W_{1,3} \\ W_{1,4} & W_{1,5} & W_{1,6} \\ W_{1,7} & W_{1,8} & W_{1,9} \end{bmatrix}$$

are received by processing elements 110a, 110b, 110e and 110f; and
the values $$\begin{bmatrix} W_{5,1} & W_{5,2} & W_{5,3} \\ W_{5,4} & W_{5,5} & W_{5,6} \\ W_{5,7} & W_{5,8} & W_{5,9} \end{bmatrix}$$

are received by processing elements 110c, 110d, 110g and 110h.

Also in the same time step (or clock cycle) depicted in FIG. 8G, each of the processing elements 110a-110h further computes the dot product of the two groups of nine values and stores the computed dot products in storage elements of the respective registers 111a-111h. The dot products computed by the processing elements should be self-explanatory and will not be detailed herein for the sake of conciseness. The dot products $y_{17}, \ldots, y_{24}$ are then stored in the storage elements of data registers 111a, . . . , 111h, respectively. It should be understood how the process continues to process additional rows of the activation data in memory 102b until all rows of the activation data have been processed. 3×3 convolution with other filters may be performed by repeating the above process, after multiplexors 10a, 10b are used to select other rows of buffer 104a. Lastly, it should be understood that the present example can be generalized to perform 3×3 convolution for activation data having multiple channels, in which case the dot products from the additional channels would be accumulated in the data registers 111a, . . . , 111h. Such computation is known in the art, so the details will not be provided herein for the sake of conciseness.

FIG. 9A depicts a logic schematic of the control logic 106b depicted in FIG. 1. As should be apparent from the examples that have been presented, control logic 106b should resemble a plurality of pass-through wires in the modes of matrix multiplication and 1×1 convolution, while it should resemble the circuitry 106b depicted in FIG. 7A for 3×3 convolution. The logic schematic depicted in FIG. 9A accomplishes these objectives.

To set the context for the logic schematic of FIG. 9A, one will notice that groups of storage modules from buffer 104b correspond to each of the processing elements 110b, 110e and 110f. Storage modules 1a-1i correspond to processing element 110b; storage modules 2a-2i correspond to processing element 110e; and storage modules 3a-3i correspond to processing element 110f. Multiplexors 4a-4c control the flow of data to the left three inputs 7a-7c of processing element 110b; multiplexors 4d-4f control the flow of data to the right three inputs 7g-7i of processing element 110b; multiplexors 5a-5c control the flow of data to the left three inputs 8a-8c of processing element 110e; multiplexors 5d-5f control the flow of data to the right three inputs 8g-8i of processing element 110e; multiplexors 6a-6c control the flow of data to the left three inputs 9a-9c of processing element 110f; and multiplexors 6d-6f control the flow of data to the right three inputs 9g-9i of processing element 110f.

The control of multiplexors 4a-4f, 5a-5f and 6a-6f may set the mode of operation. In the example of FIG. 9A, when the multiplexors 4a-4f, 5a-5f and 6a-6f pass the left inputs of the respective multiplexors, matrix multiplication or 1×1 convolution may be carried out, and when the multiplexors 4a-4f, 5a-5f and 6a-6f pass the right inputs of the respective multiplexors, 3×3 convolution may be carried out.

To describe the operation at a lower level, selection of the left inputs of the multiplexors 4a-4f, 5a-5f and 6a-6f results in:
  pass through wires between the respective outputs of storage modules 1a-1i and the respective inputs 7a-7i of processing element 110b;
  pass through wires between the respective outputs of storage modules 2a-2i and the respective inputs 8a-8i of processing element 110e; and
  pass through wires between the respective outputs of storage modules 3a-3i and the respective inputs 9a-9i of processing element 110f.

In contrast, selection of the right inputs of the multiplexors 4d-4f, 5a-5f and 6a-6d results in:
  the respective outputs of storage modules 2d-2f being transmitted to inputs 7g-7i of processing element 110b;
  the respective outputs of storage modules 1d-1f being transmitted to inputs 8a-8c of processing element 110e;
  the respective outputs of storage modules 3d-3f being transmitted to inputs 8g-8i of processing element 110e; and
  the respective outputs of storage modules 2d-2f being transmitted to inputs 9a-9c of processing element 110f.

As a further note regarding the 3×3 convolution mode, the three values provided by data storage modules 2d-2f are provided to each of processing elements 110b, 110e and 110f (i.e., in other words, these three values are shared between processing elements 110b, 110e and 110f). Likewise, the three values provided by data storage modules 1d-1f are provided to three processing elements 110a, 110b and 110e. Similarly, the three values provided by data storage modules 3d-3f are provided to three processing elements 110e, 110f and (a processing element to the right of 110f that is not depicted).

While the example in FIG. 9A only included three processing elements 110b, 110e and 110f from a single row of processing element array 108, it should be understood that the example could be extended to include additional processing elements from the same row. Further, it should be understood that the example could be extended to include processing elements from other rows of the processing element array 108.

FIG. 9B depicts a more detailed logic schematic for a group of the storage modules (i.e., 2a-2i). Each of the storage modules may include a multiplexor that selects between the output of two storage elements. Specifically:
  Storage element 2a may include multiplexor 22e that selects between the output of storage elements 18e and 20e;
  Storage element 2b may include multiplexor 22f that selects between the output of storage elements 18f and 20f;
  Storage element 2c may include multiplexor 22g that selects between the output of storage elements 18g and 20g;
  Storage element 2d may include multiplexor 22h that selects between the output of storage elements 18h and 20h;
  Storage element 2e may include multiplexor 22i that selects between the output of storage elements 18i and 20i;
  Storage element 2f may include multiplexor 22j that selects between the output of storage elements 18j and 20j;
  Storage element 2g may include multiplexor 22k that selects between the output of storage elements 18k and 20k;
  Storage element 2h may include multiplexor 22l that selects between the output of storage elements 18l and 20l; and
  Storage element 2i may include multiplexor 22m that selects between the output of storage elements 18m and 20m.

A similar structure was shown in FIG. 2C for performing double buffering, so the functionality of storage elements 18e-18m, 20e-20m and multiplexors 22e-22m will not be explained in further detail for the sake of conciseness.

FIG. 9B depicts the write path from memory 102b to buffer 104b in more detail. De-multiplexor 122d may be used to select one of the storage modules 2a-2i to which a value from memory 102b should be written to. Further:
  De-multiplexor 122e may be used to select one of the storage elements 18e and 20e within storage module 2a to which the value from memory 102b should be written to.
  De-multiplexor 122f may be used to select one of the storage elements 18f and 20f within storage module 2b to which the value from memory 102b should be written to.
  De-multiplexor 122g may be used to select one of the storage elements 18g and 20g within storage module 2c to which the value from memory 102b should be written to.
  De-multiplexor 122h may be used to select one of the storage elements 18h and 20h within storage module 2d to which the value from memory 102b should be written to.
  De-multiplexor 122i may be used to select one of the storage elements 18i and 20i within storage module 2e to which the value from memory 102b should be written to.
  De-multiplexor 122j may be used to select one of the storage elements 18j and 20j within storage module 2f to which the value from memory 102b should be written to.
  De-multiplexor 122k may be used to select one of the storage elements 18k and 20k within storage module 2g to which the value from memory 102b should be written to.
  De-multiplexor 122l may be used to select one of the storage elements 18l and 20l within storage module 2h to which the value from memory 102b should be written to.
  De-multiplexor 122m may be used to select one of the storage elements 18m and 20m within storage module 2i to which the value from memory 102b should be written to. Using the write path from memory 102b to the buffer 104b depicted in FIG. 9B, one value can be written to one of the storage elements 18e-18m and 20e-20m every clock cycle. In another embodiment (not depicted), it is possible to omit de-multiplexors 122d-122m, and have a branching wire structure connect all of the storage elements 18e-18m and 20e-20m to a single input (supplied by memory 102b). In such an embodiment, the respective inputs of the storage elements 18e-18m and 20e-20m can be selectively enabled or disabled (e.g., by a clock signal) to selectively store a value from memory 102b to one of the storage elements 18e-18m and 20e-20m every clock cycle.

In the logic schematic of FIG. 9B, storage elements 20h, 20i and 20j can additionally be configured as a shift register (for the 3×3 convolution mode) by selecting the right inputs of multiplexors 22h, 22i, 22j, 24a and 24b. As should be apparent when comparing FIGS. 7A and 9B, storage elements 20j, 20i and 20h in FIG. 9B correspond to storage elements 23a, 23b and 23c in FIG. 7A. Selection of the left inputs of multiplexors 24a and 24b reverts the circuit back into the structure shown in FIG. 2C for performing double buffering. For completeness, it is noted that reference to the "right" or "left" inputs of the multiplexors is not meant to be limiting, as the functionality of the logic schematic could be achieved with a different assignment of signals to the respective inputs of the multiplexors. It should be understood that the same structure as depicted in FIG. 9B could be used for storage modules 1a-1i and 3a-3i.

Returning to the earlier discussion of the write path to buffer 104b, multiplexors 24a and 24b may be considered to be part of the write path to buffer 104b, along with the respective wires connecting various components together (e.g., between storage elements 20h and 20i, between storage elements 20i and 20j, connecting storage elements 18e-18m and 20e-20m to memory element 102b). Again, for simplicity of depiction, the write path to buffer 104b is shown as being incorporated within buffer 104b itself. This is not a substantive detail, but rather a matter of depiction.

Figure 9C:
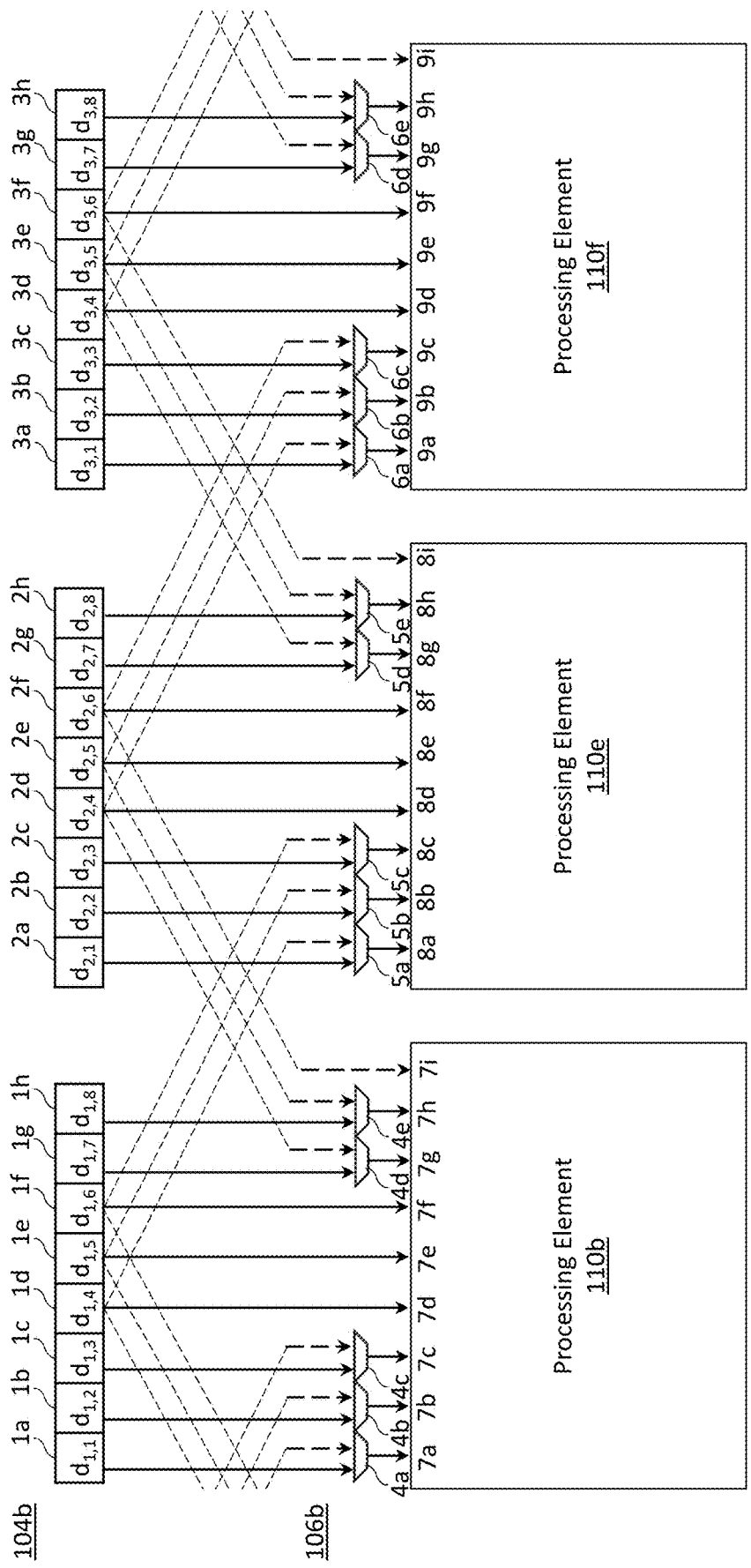
FIG. 9C depicts a variation of the logic schematic of FIG. 9A, in accordance with one embodiment of the invention.

FIG. 9C depicts a variant of the logic schematic of FIG. 9A in which the number of storage modules per processing element has been reduced from nine to eight (e.g., by removing storage modules 1i, 2i and 3i from the logic schematic of FIG. 9A). This change limits the "columns" of buffer 104b in the matrix multiplication mode to have a maximum of eight values per column, but does not impact the operation of 3×3 convolution as the shift registers in storage modules 1d-1f, 2d-2f and 3d-3f remain unchanged. The reference to "columns" in the context of FIG. 9C could be initially confusing, as only rows are depicted, but it is noted for completeness that storage modules 1a-1h store the column of values corresponding to processing element 110b, storage modules 2a-2h store the column of values corresponding to processing element 110e, and storage modules 3a-3h store the column of values corresponding to processing element 110f. One additional change as a result of the omission of storage modules 1i, 2i, and 3i is the omission of multiplexors 4f, 5f and 6f, as one of the "cross-over" signals for 3×3 convolution can be directly coupled to inputs 7i, 8i and 9i of the processing elements 110b, 110e and 110f, respectively.

It is noted that in other embodiments (not depicted), it is possible to omit one or more of the storage modules (from buffer 104b) other than those that are integral to forming the shift registers (i.e., storage modules 1d-1f, 2d-2f and 3d-3f). The tradeoff to omitting additional storage modules is that there will be fewer storage modules available (per clock cycle) to perform matrix multiplication or 1×1 convolution. In a similar manner, if additional storage modules are omitted, additional multiplexors will also be omitted, as additional cross-over signals can be directly coupled to the respective inputs of the processing elements.

Figure 9D:
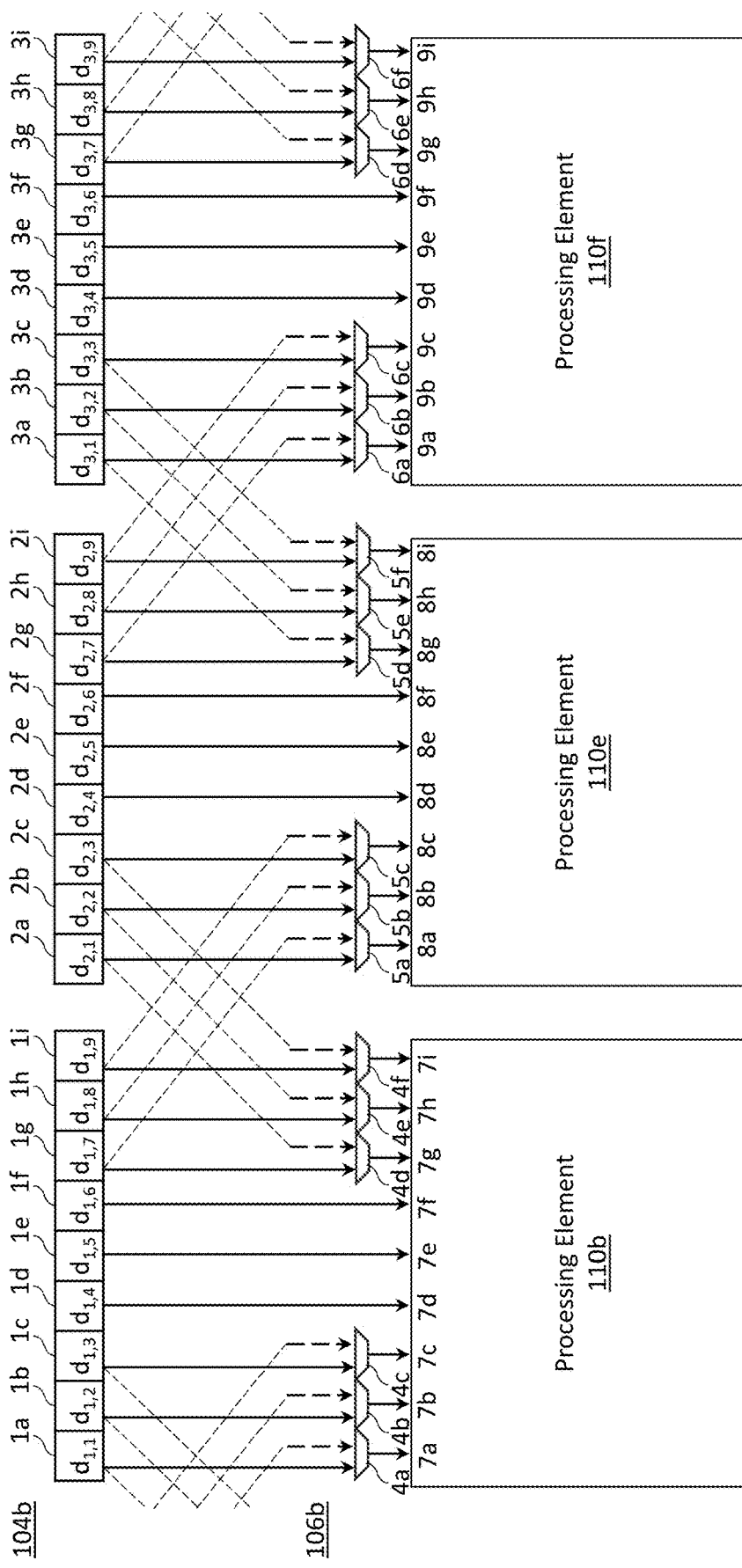
FIG. 9D depicts a further variation of the logic schematic of FIG. 9A, in accordance with one embodiment of the invention.

FIG. 9D depicts another variant of the logic schematic of FIG. 9A, in which the output load of storage modules 2d-2f is reduced by approximately two-thirds by replicating two additional copies of storage modules 2d-2f (including the shift register therein) using storage modules 2a-2c and 2g-2i. The values stored at storage modules 2d-2f will also be replicated at storage modules 2a-2c and 2g-2i. For instance, if storage modules 2d-2f were to store values $a_1$, $a_2$ and $a_3$, then storage modules 2a-2c would also store values $a_1$, $a_2$ and $a_3$, and storage modules 2g-2i would also store values $a_1$, $a_2$ and $a_3$.

Figure 9E:
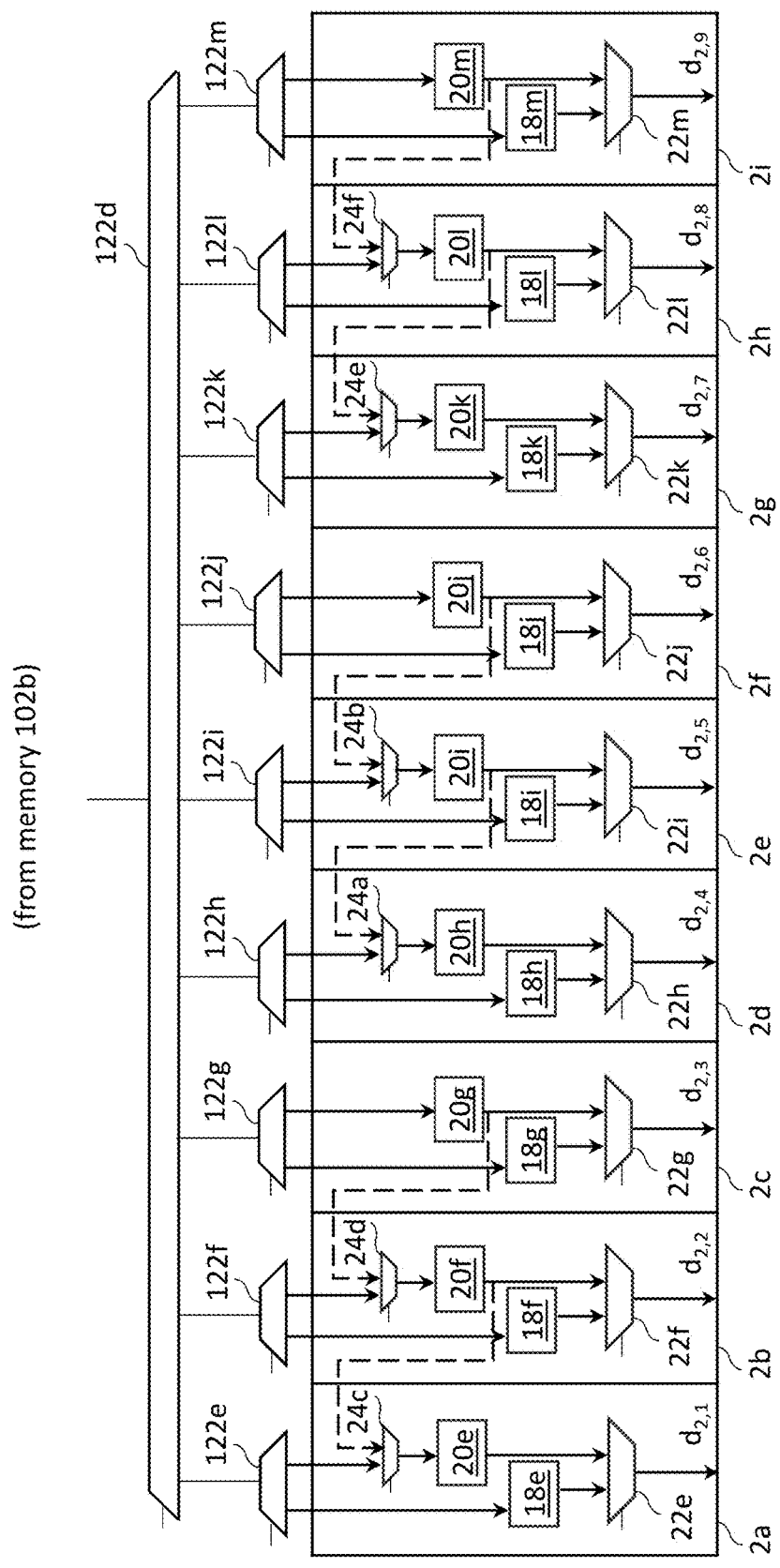
FIG. 9E depicts a variation of the logic schematic of FIG. 9B, in accordance with one embodiment of the invention.

FIG. 9E depicts the logic schematic of the storage modules 2a-2i of FIG. 9D, in which two additional shift registers may be instantiated using multiplexors 24c-24d and 24e-24f (in a controllable manner). Therefore, instead of using storage modules 2d-2f to supply values to multiplexors 4d-4f (as was the case in FIG. 9A), storage modules 2a-2c may be used to supply values to multiplexors 4d-4f. Likewise, instead of using storage modules 2d-2f to supply values to multiplexors 6a-6c (as was the case in FIG. 9A), storage modules 2g-2i may be used to supply values to multiplexors 6a-6c. It should be understood that the same structure as depicted in FIG. 9E could be used for storage modules 1a-1i and 3a-3i in FIG. 9D.

Figure 9F:
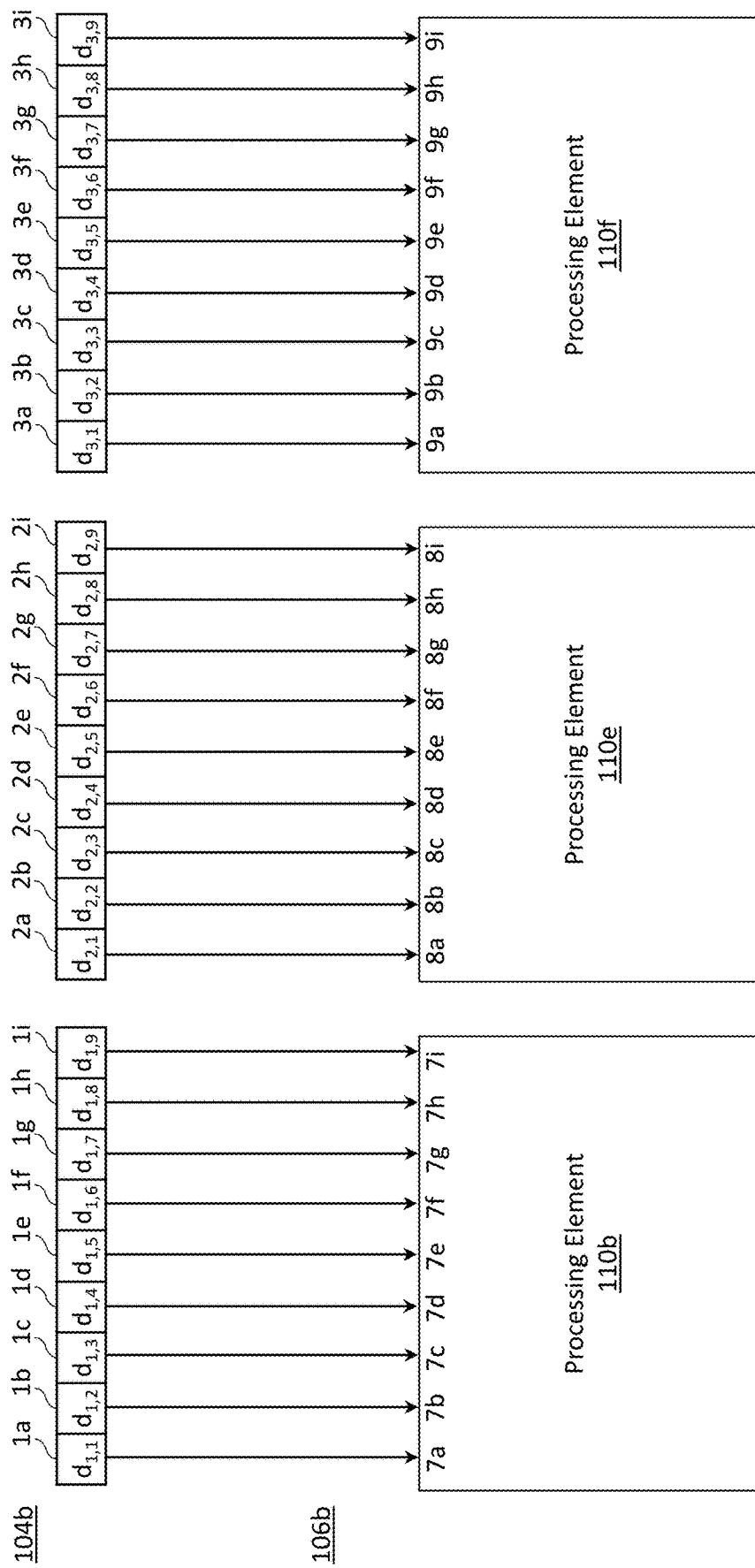
FIG. 9F depicts a further variation of the logic schematic of FIG. 9A, in accordance with one embodiment of the invention.

FIG. 9F depicts another variant of the logic schematic of FIG. 9A, in which the respective outputs of the storage modules are directly coupled to the respective inputs of the processing elements. This would be the default arrangement for matrix multiplication and 1×1 convolution. At this point, one might wonder how 3×3 convolution can be carried out using the logic schematic of FIG. 9F. First, it is noted that storage modules 2a-2i (as well as storage modules 1a-1i and 3a-3i) of FIG. 9F can also be implemented using the structure depicted in FIG. 9E, with three parallel shift registers. Second, rather than using crisscrossing wires to pass the signals from the left-three and right-three neighbors, this same effect of the crisscrossing wires can be accomplished by the writing of data (in a specific pattern) from memory 102b to buffer 104b. That is, in the context of FIG. 9F:

storage elements 1a-1i could be used to store the nine values $a_{3,1}$, $a_{2,1}$, $a_{1,1}$, $a_{3,2}$, $a_{2,2}$, $a_{1,2}$, $a_{3,3}$, $a_{2,3}$, $a_{1,3}$, respectively, or if written in matrix form for clarity $$\begin{bmatrix} a_{1,1} & a_{1,2} & a_{1,3} \\ a_{2,1} & a_{2,2} & a_{2,3} \\ a_{3,1} & a_{3,2} & a_{3,3} \end{bmatrix}$$

storage elements 2a-2i could be used to store the nine values $a_{3,2}$, $a_{2,2}$, $a_{1,2}$, $a_{3,3}$, $a_{2,3}$, $a_{1,3}$, $a_{3,4}$, $a_{2,4}$, $a_{1,4}$, respectively, or if written in matrix form for clarity $$\begin{bmatrix} a_{1,2} & a_{1,3} & a_{1,4} \\ a_{2,2} & a_{2,3} & a_{2,4} \\ a_{3,2} & a_{3,3} & a_{3,4} \end{bmatrix}$$

storage elements 3a-3i could be used to store the nine values $a_{3,3}$, $a_{2,3}$, $a_{1,3}$, $a_{3,4}$, $a_{2,4}$, $a_{1,4}$, $a_{3,5}$, $a_{2,5}$, $a_{1,5}$, respectively, or if written in matrix form for clarity $$\begin{bmatrix} a_{1,3} & a_{1,4} & a_{1,5} \\ a_{2,3} & a_{2,4} & a_{2,5} \\ a_{3,3} & a_{3,4} & a_{3,5} \end{bmatrix}$$

in one clock cycle, and the reader should be able to extrapolate the behavior in the subsequent clock cycles, in which the data values would be shifted along the shift registers, and new values would be loaded into the shift registers from memory 102b. As one specific example to illustrate the operation of storage elements 2a-2i depicted in FIG. 9E, values $a_{3,2}$, $a_{3,3}$ and $a_{3,4}$ could be written to storage elements 20g, 20j and 20m in one clock cycle; values $a_{2,2}$, $a_{2,3}$ and $a_{2,4}$ could be written to storage elements 20g, 20j and 20m in the next clock cycle; values $a_{1,2}$, $a_{1,3}$ and $a_{1,4}$ could be written to storage elements 20g, 20j and 20m in the next clock cycle; and so on (i.e., with the shift registers shifting the values along for each successive clock cycle).

Figure 9G:
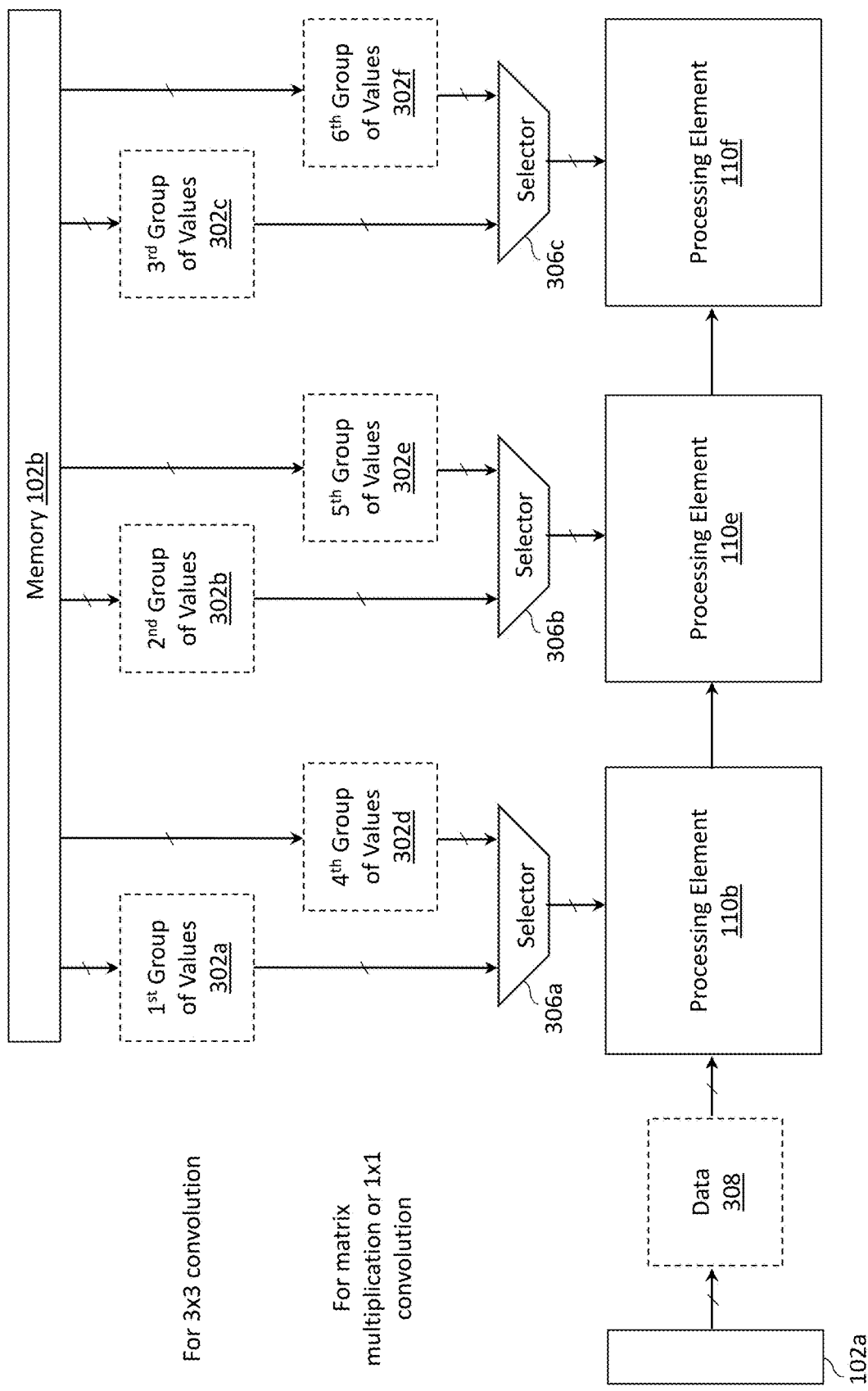
FIG. 9G depicts a schematic that summarizes the multi-modal operation of a portion of the system, in accordance with one embodiment of the invention.

FIG. 9G depicts a schematic that summarizes the multi-modal operation of processing elements 110b, 110e and 110f and its surrounding circuits. In a first configuration (e.g., for 3×3 convolution), a first group of values 302a from memory 102b may be transmitted to processing element 110b, a second group of values 302b from memory 102b may be transmitted to processing element 110e, and a third group of values 302c from memory 102b may be transmitted to the processing element 110f. The first, second and third groups 302a, 302b and 302c may each include activation values. As described above in connection with FIG. 9A, each of the groups 302a, 302b and 302c may include nine activation values, and three of the nine activation values may be shared between the groups 302a, 302b and 302c.

In the second configuration (e.g., for matrix multiplication or 1×1 convolution), a fourth group of values 302d from memory 102b may be transmitted to the processing element 110b, a fifth group of values 302e from memory 102b may be transmitted to the processing element 110e and a sixth group of values 302f from memory 102b may be transmitted to the processing element 110f. In the case of matrix multiplication, the fourth, fifth and sixth groups 302d, 302e and 302f may include partial columns from a matrix (e.g., matrix B in the above discussion). In the case of 1×1 convolution, the fourth, fifth and sixth groups 302d, 302e and 302f may include activation values. Each of groups 302d, 302e and 302f may include between three and nine values.

Selector 306a may abstractly represent a module for selecting between the first group of values 302a and the fourth group of values 302d. Selector 306b may abstractly represent a module for selecting between the second group of values 302b and the fifth group of values 302e. Selector 306c may abstractly represent a module for selecting between the third group of values 302c and the sixth group of values 302f. Various embodiment of selectors 306a, 306b and 306c have been described above in FIGS. 9A-9F, which may include two-input multiplexors, wires directly coupling storage elements to processing elements, the transfer of values from memory 102b into particular storage elements, etc.

Processing elements 110b, 110e and 110f may also receive data 308 from memory 102a. In the case of 1×1 or 3×3 convolution, data 308 may include weights. In the case of matrix multiplication, data 308 may include a partial row from a matrix (e.g., matrix A in the above discussion). Processing element 110b may be configured to manipulate (e.g., compute a dot product between) the data 308 from memory 102a with the first group of values 302a or the fourth group of values 302d from memory 102b. Processing element 110e may be configured to manipulate (e.g., compute a dot product between) the data 308 from the memory 102a with the second group of values 302b or the fifth group of values 302e from memory 102b Similarly, processing element 110f may be configured to manipulate (e.g., compute a dot product between) the data 308 from the memory 102a with the third group of values 302c or the sixth group of values 302f from memory 102b.

As should be apparent from the above description, an important idea behind the approach is to move beyond optimizing individual multiply accumulate (MAC) operations and instead focus on optimizing at the level of convolution (e.g., 1×1 or 3×3) or matrix multiplication. By conducting optimizations at these higher levels, it becomes possible to address the MAC operations holistically and unlock greater opportunities to gain performance and power efficiency, as compared to optimizing at the individual MAC operation level.

In one embodiment for performing matrix multiplication, in every eight clock cycles, each processing element may receive eight data values from the same column in matrix B (or more generally tensor B). These eight data values may be reused for eight clock cycles during matrix multiplication. In each clock cycle, each processing element may additionally receive eight data values from the same row in matrix A (or more generally tensor A) and one partially accumulated value. Data in different clock cycles may correspond to different rows of matrix A. In every clock cycle, each processing element may compute eight products, add those eight products to form a sum, and accumulate the sum with a partially accumulated value in order to generate one element in the output matrix C. Fully accumulated values at a processing element may correspond to different elements in the same column of the output matrix C=A*B (or more generally tensor C). On average, each processing unit may carry out eight MAC operations per clock cycle.

In one embodiment for performing 1×1 convolution, in every eight cycles, each processing unit may receive eight activation data values from eight input channels. These eight activation data may be reused for eight clock cycles during the 1×1 convolution. In each clock cycle, each processing unit may receive one partially accumulated value, and one set of weight parameters, all corresponding to the same output channel. In each clock cycle, each processing unit may compute eight products, and add those eight products to produce a sum corresponding to one output channel. On average, each processing unit may carry out eight MAC operations per clock cycle.

In one embodiment for performing 3×3 convolution (for activation data having multiple input channels), in every clock cycle, each processing unit may receive nine activation data, nine weight parameters, and one partially accumulated value; conduct 3×3 convolution; and produce one new accumulated value. In every nine clock cycles, each processing unit may conduct 3×3 convolution for eight contiguous rows in a single input channel (assuming zero padding around the activation data). It may then switch to another set of eight contiguous rows from a different input channel, load nine new weight parameters corresponding to the different input channel, and repeat the routine. On average, each processing unit may carry out eight MAC operations per clock cycle.

Thus, systems and methods for performing matrix multiplication with a plurality of processing elements have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A system, comprising:
a first memory;
a second memory;
a first buffer configured to receive and store a first array of values from the first memory;
a second buffer configured to receive and store a second array of values from the second memory;
a first multiplexor configured to select between a first and second row from the first array of values stored in the first buffer;
a first processing element configured to receive the first row from the first multiplexor and a first column of the second array of values from the second buffer, and multiply the first row with the first column so as to compute a first dot product;
a second processing element configured to receive the first row from the first multiplexor and a second column of the second array of values from the second buffer, and multiply the first row with the second column so as to compute a second dot product;
the first processing element configured to receive the second row from the first multiplexor, and multiply the second row and the first column to form a third dot product; and
the second processing element configured to receive the second row from the first multiplexor, and multiply the second row and the second column so as to compute a fourth dot product,
wherein the first and second dot products are computed in a first clock cycle, and the third and fourth dot products are computed in a second clock cycle immediately following the first clock cycle.

2. The system of claim 1, further comprising:
a second multiplexor configured to select between a third and fourth row from the first array of values stored in the first buffer;
a third processing element configured to receive the third row from the second multiplexor and the first column of the second array of values stored in the second buffer, and multiply the third row with the first column to form a fifth dot product;
a fourth processing element configured to receive the third row from the second multiplexor and the second column of the second array of values from the second buffer, and multiply the third row with the second column to form a sixth dot product;
the third processing element configured to receive the fourth row from the second multiplexor, and multiply the fourth row with the first column to form a seventh dot product; and
the fourth processing element configured to receive the fourth row from the second multiplexor, and multiply the fourth row and the second column to form an eighth dot product,
wherein the fifth and sixth dot products are computed in the first clock cycle, and the seventh and eighth dot products are computed in the second clock cycle.

3. The system of claim 1, wherein the first and second memory are part of a common memory.

4. The system of claim 1, wherein each of the first and second processing elements includes a plurality of two-input multipliers, and an adder tree configured to sum respective outputs of the plurality of two-input multipliers.

5. The system of claim 4, wherein each of the first and second processing elements includes a storage element configured to store an output of the adder tree.

6. The system of claim 5, wherein the adder tree of each of the first and second processing elements is further configured to receive an output of the storage element.

7. The system of claim 1, wherein the first and second buffers are doubled buffered.

8. The system of claim 1, wherein:
each of the first and second processing elements includes a first storage element configured to store a value based on the first row of the first array of values from the first memory, and a second storage element configured to store a value based on the second row of the first array of values from the first memory.

9. A method comprising:
storing a first array of values from a first memory in a first buffer;
storing a second array of values from a second memory in a second buffer;
selecting, by a first multiplexor, a first row of the first array of values from the first buffer;
receiving, by a first and second processing element, the first row from the first multiplexor;
receiving, by the first processing element, a first column of the second array of values from the second buffer;
receiving, by the second processing element, a second column of the second array of values from the second buffer;
multiplying, by the first processing element, the first row and the first column so as to compute a first dot product;
multiplying, by the second processing element, the first row and the second column so as to compute a second dot product;
selecting, by the first multiplexor, a second row of the first array of values from the first buffer;
receiving, by the first and second processing element, the second row from the first multiplexor;
multiplying, by the first processing element, the second row and the first column so as to compute a third dot product; and
multiplying, by the second processing element, the second row and the second column so as to compute a fourth dot product,
wherein the first and second dot products are computed in a first clock cycle, and the third and fourth dot products are computed in a second clock cycle immediately following the first clock cycle.

10. The method of claim 9, further comprising:
selecting, by a second multiplexor, a third row of the first array of values from the first buffer;
receiving, by a third and fourth processing element, the third row from the second multiplexor;
receiving, by the third processing element, the first column of the second array of values from the second buffer;
receiving, by the fourth processing element, the second column of the second array of values from the second buffer;
multiplying, by the third processing element, the third row with the first column so as to compute a fifth dot product;

multiplying, by the fourth processing element, the third row with the second column so as to compute a sixth dot product;

selecting, by the second multiplexor, a fourth row of the first array of values from the first buffer;

receiving, by the third and fourth processing element, the fourth row from the second multiplexor;

multiplying, by the third processing element, the fourth row with the first column so as to compute a seventh dot product; and multiplying, by the fourth processing element, the fourth row with the second column so as to compute an eighth dot product, wherein the fifth and sixth dot products are computed in the first clock cycle, and the seventh and eighth dot products are computed in the second clock cycle.

11. The method of claim 9, wherein the first and second memory are part of a common memory.

12. The method of claim 9, wherein each of the first and second processing elements includes a plurality of two-input multipliers, and an adder tree configured to sum respective outputs of the plurality of two-input multipliers.

13. The method of claim 12, wherein each of the first and second processing elements includes a storage element configured to store an output of the adder tree.

14. The method of claim 13, wherein the adder tree of each of the first and second processing elements is further configured to receive an output of the storage element.

15. The method of claim 9, wherein the first and second buffer are double buffered.

16. The method of claim 9, further comprising:

storing in a first storage element of the first processing element a value based on the first row of the first array of values from the first memory; and storing in a second storage element of the first processing element distinct from the first storage element a value based on the second row of the first array of values from the first memory.

* * * * *